(12) United States Patent
Iwanami et al.

(10) Patent No.: US 7,287,583 B2
(45) Date of Patent: Oct. 30, 2007

(54) AIR-CONDITIONING APPARATUS INCLUDING MOTOR-DRIVEN COMPRESSOR FOR IDLE STOPPING VEHICLES

(75) Inventors: Shigeki Iwanami, Okazaki (JP); Yasushi Suzuki, Chiryu (JP); Yasushi Yamanaka, Nakashima-gun (JP); Yukio Ogawa, Kariya (JP); Keiichi Uno, Kariya (JP)

(73) Assignee: DENSO CORPORATION, Kariya (JP)

( * ) Notice: Subject to any disclaimer, the term of this patent is extended or adjusted under 35 U.S.C. 154(b) by 431 days.

(21) Appl. No.: 11/029,404

(22) Filed: Jan. 6, 2005

(65) Prior Publication Data

US 2005/0109499 A1  May 26, 2005

Related U.S. Application Data

(62) Division of application No. 10/132,764, filed on Apr. 26, 2002, now Pat. No. 6,981,544.

(30) Foreign Application Priority Data

| Apr. 27, 2001 | (JP) | ............................. 2001-131605 |
| May 30, 2001 | (JP) | ............................. 2001-161921 |
| Jul. 6, 2001 | (JP) | ............................. 2001-206890 |
| Oct. 19, 2001 | (JP) | ............................. 2001-322607 |
| Nov. 9, 2001 | (JP) | ............................. 2001-345038 |
| Jan. 31, 2002 | (JP) | ............................. 2002-22723 |

(51) Int. Cl.
*B60H 1/00* (2006.01)

(52) U.S. Cl. ...................... 165/202; 165/271; 165/244; 62/133; 62/134; 62/244

(58) Field of Classification Search ................ 165/202, 165/244, 253, 254, 271, 278, 299, 42, 43, 165/44; 62/133, 134, 229, 239, 244
See application file for complete search history.

(56) References Cited

U.S. PATENT DOCUMENTS

| 4,494,383 | A | * | 1/1985 | Nagatomo et al. ............. 62/229 |
| 4,748,819 | A | * | 6/1988 | Takahashi ..................... 62/244 |
| 5,818,193 | A | * | 10/1998 | Sasaki ......................... 318/685 |
| 6,073,456 | A | | 6/2000 | Kawai et al. |
| 6,073,689 | A | | 6/2000 | Mizuno et al. |
| 6,148,632 | A | | 11/2000 | Kishita et al. |
| 6,515,448 | B2 | | 2/2003 | Iritani et al. |
| 6,530,426 | B1 | | 3/2003 | Kishita et al. |

(Continued)

FOREIGN PATENT DOCUMENTS

EP          1045144          10/2000

(Continued)

*Primary Examiner*—Ljiljana Ciric
(74) *Attorney, Agent, or Firm*—Posz Law Group, PLC

(57) ABSTRACT

A low-cost vehicle air-conditioning apparatus for idle stopping vehicles is capable of performing both cooling and heating operations throughout the year. The air-conditioning apparatus includes an engine-driven compressor and engine-driven pump for a heating unit. The air-conditioning apparatus includes a motor-driven compressor and pump. A control unit drives the motor such that the motor-driven compressor is operated when there is a need for cooling and the motor-driven pump is operated when there is a need for heating when the engine is stopped. Battery power is conserved through various methods.

13 Claims, 45 Drawing Sheets

U.S. PATENT DOCUMENTS

| | | | |
|---|---|---|---|
| 6,626,001 B2 * | 9/2003 | Hamachi et al. | 165/42 |
| 6,637,230 B2 | 10/2003 | Iwanami et al. | |
| 6,755,033 B2 * | 6/2004 | Iwanami et al. | 165/43 |
| 6,786,058 B2 * | 9/2004 | Sanna | 62/229 |
| 2002/0053212 A1 | 5/2002 | Iwanami et al. | |
| 2002/0084769 A1 | 7/2002 | Iritani et al. | |
| 2002/0157412 A1 | 10/2002 | Iwanami et al. | |
| 2003/0041603 A1 | 3/2003 | Tada et al. | |
| 2003/0068232 A1 | 4/2003 | Iwanami et al. | |
| 2003/0101740 A1 | 6/2003 | Suzuki et al. | |
| 2003/0118450 A1 | 6/2003 | Iwanami et al. | |
| 2003/0133809 A1 | 7/2003 | Iwanami | |
| 2003/0200759 A1 | 10/2003 | Iwanami et al. | |
| 2003/0200760 A1 | 10/2003 | Iwanami et al. | |

FOREIGN PATENT DOCUMENTS

| | | |
|---|---|---|
| JP | A-9-277818 | 10/1997 |
| JP | A-2000-80348 | 3/2000 |
| JP | A-2000-127753 | 5/2000 |

* cited by examiner

FIG. 14A
FIG. 14B
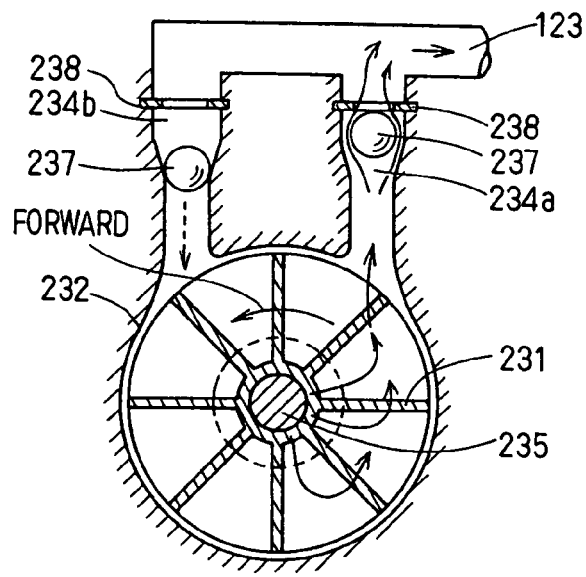
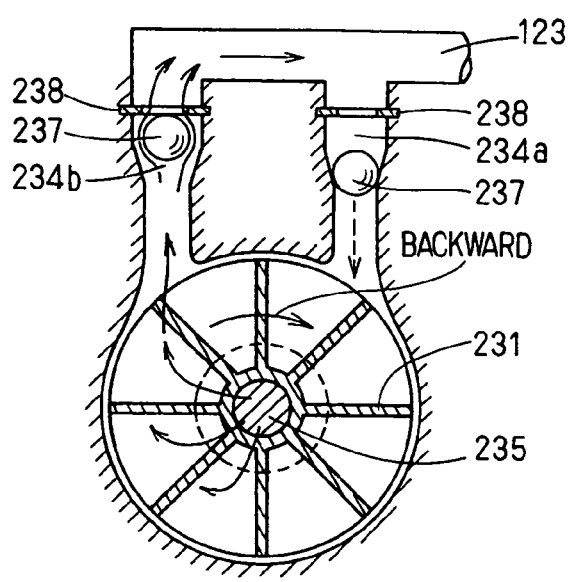
FIG. 15
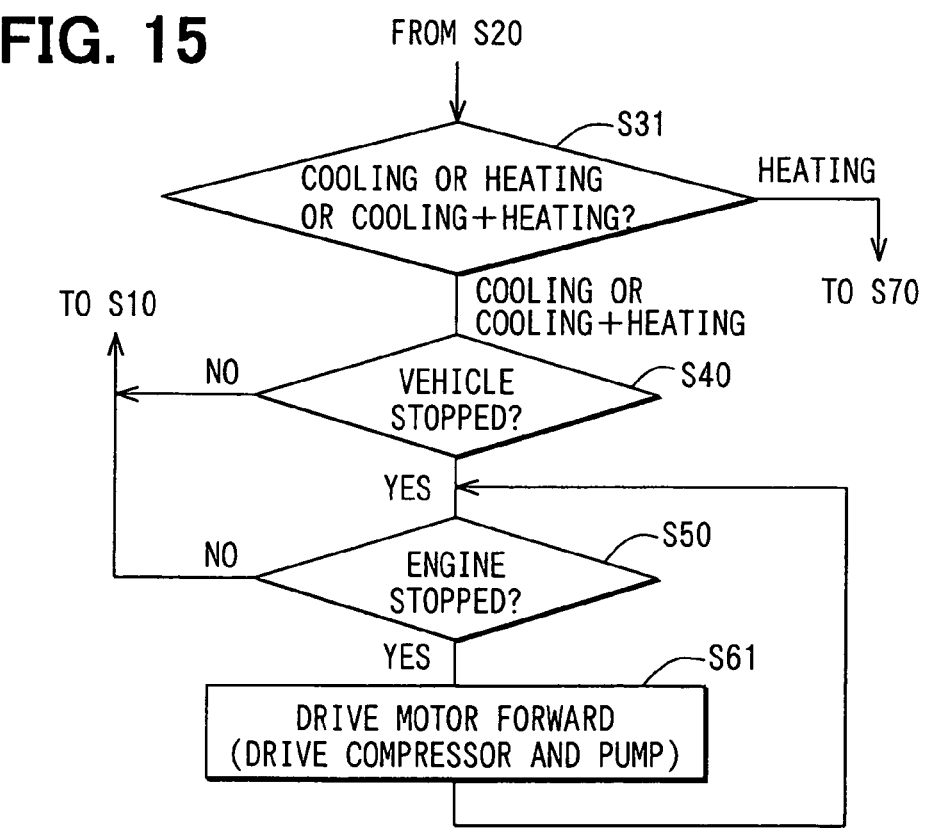

FIG. 18A ENGINE
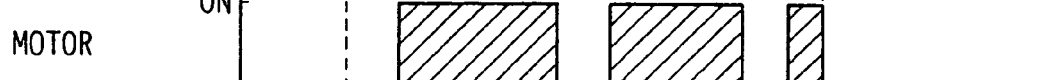
FIG. 18B MOTOR
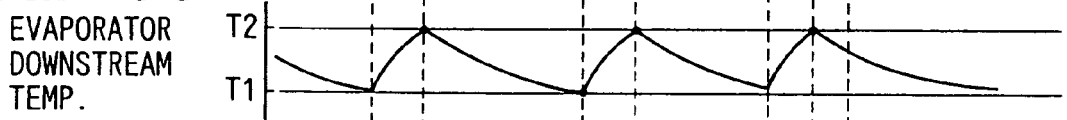
FIG. 18C EVAPORATOR DOWNSTREAM TEMP.
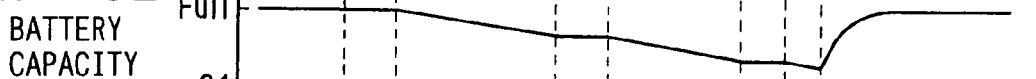
FIG. 18D BATTERY CAPACITY
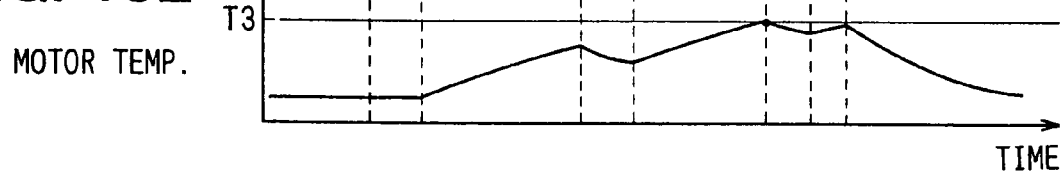
FIG. 18E MOTOR TEMP.
FIG. 19
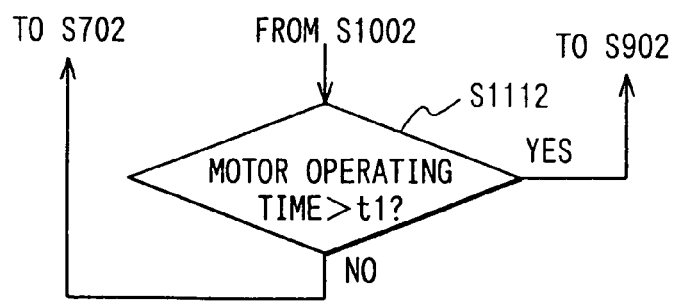

VEHICLE SPEED

FLOW RATE OF EVAPORATOR FAN

EVAPORATOR DOWNSTREAM TEMP.

LEVEL OF LIQUID IN CONDENSER

MOTOR

VEHICLE SPEED

FLOW RATE OF EVAPORATOR FAN

VALVE OPENING

EVAPORATOR DOWNSTREAM TEMP.

LEVEL OF LIQUID IN CONDENSER

MOTOR

VEHICLE SPEED

CONDENSER FAN FLOW RATE

EVAPORATOR DOWNSTREAM TEMP.

MOTOR

VEHICLE SPEED

COMPRESSOR DISPLACEMENT

EVAPORATOR DOWNSTREAM TEMP.

MOTOR

VEHICLE SPEED

COMPRESSOR

EVAPORATOR DOWNSTREAM TEMP.

MOTOR

FIG. 28
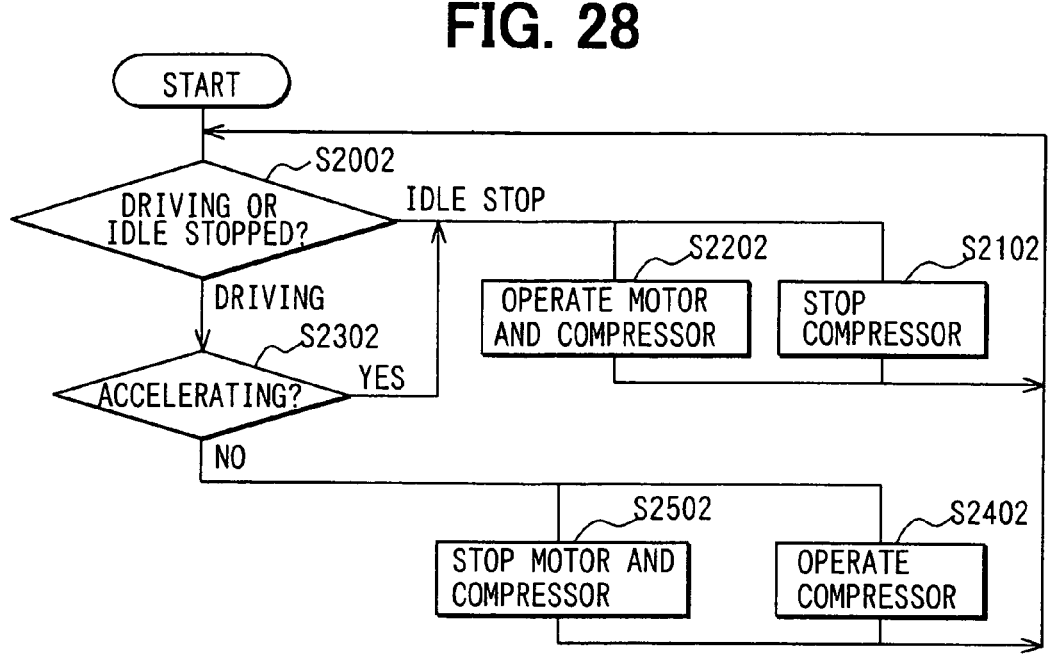
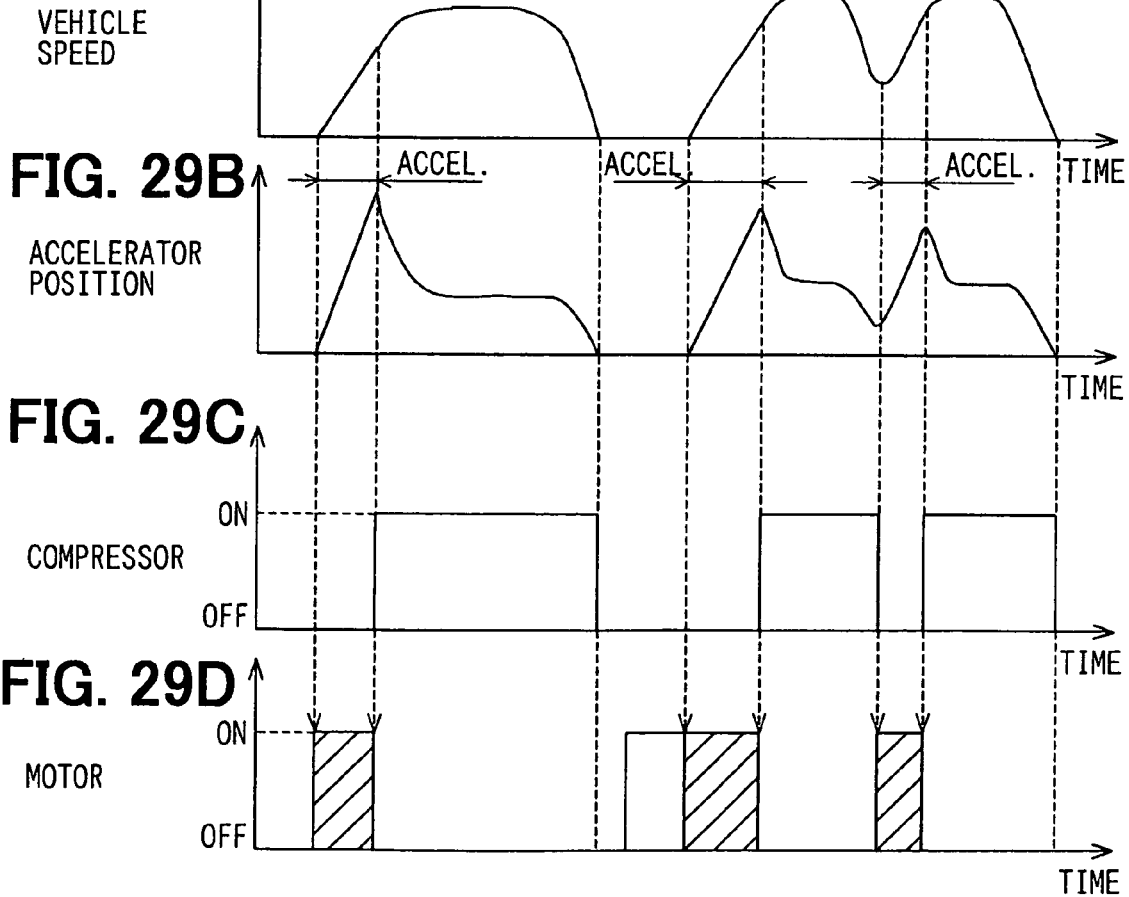

FIG. 30
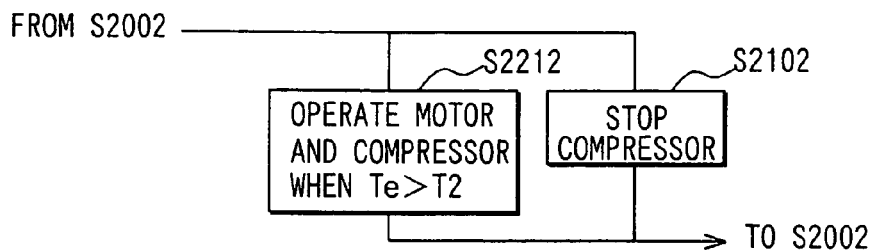
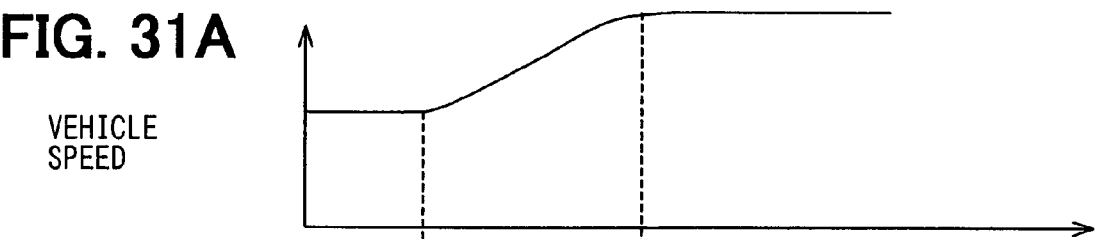
FIG. 31A
VEHICLE SPEED
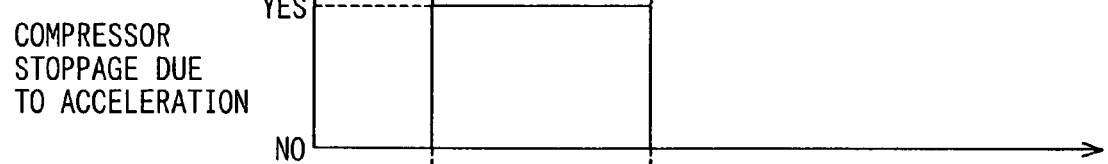
FIG. 31B
COMPRESSOR STOPPAGE DUE TO ACCELERATION
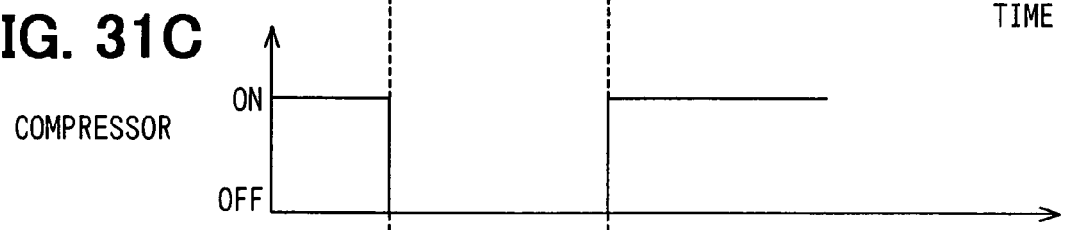
FIG. 31C
COMPRESSOR
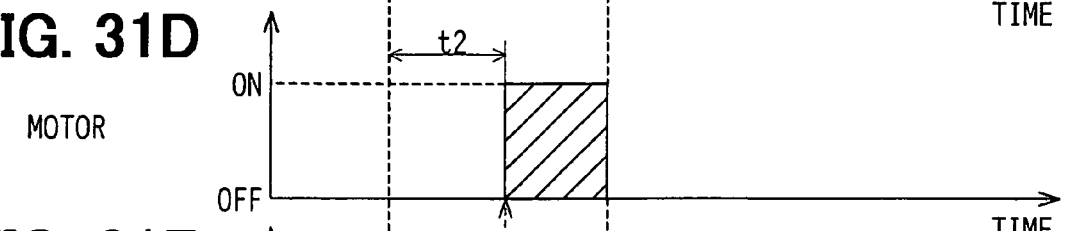
FIG. 31D
MOTOR
FIG. 31E
EVAPORATOR DOWNSTREAM TEMP.

VEHICLE SPEED

COMPRESSOR STOPPAGE DUE TO ACCELERATION

COMPRESSOR

MOTOR

EVAPORATOR DOWNSTREAM TEMP.

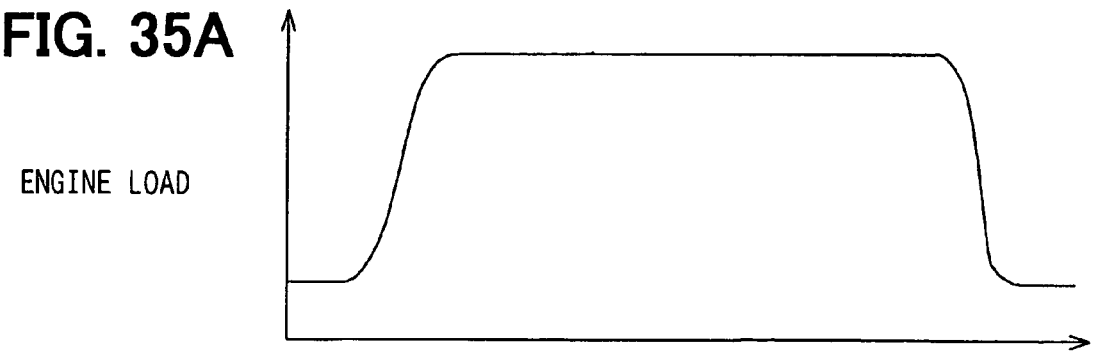
FIG. 35A ENGINE LOAD
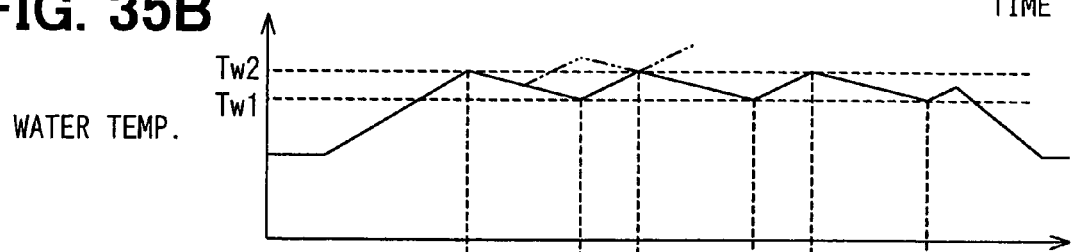
FIG. 35B WATER TEMP.
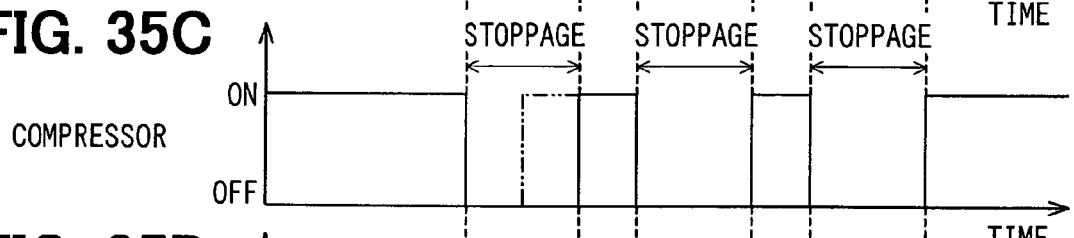
FIG. 35C COMPRESSOR
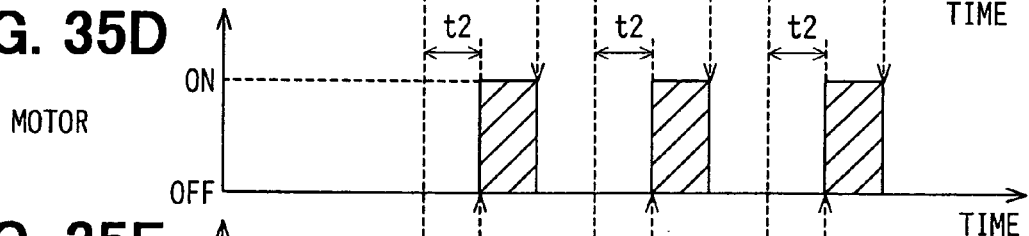
FIG. 35D MOTOR
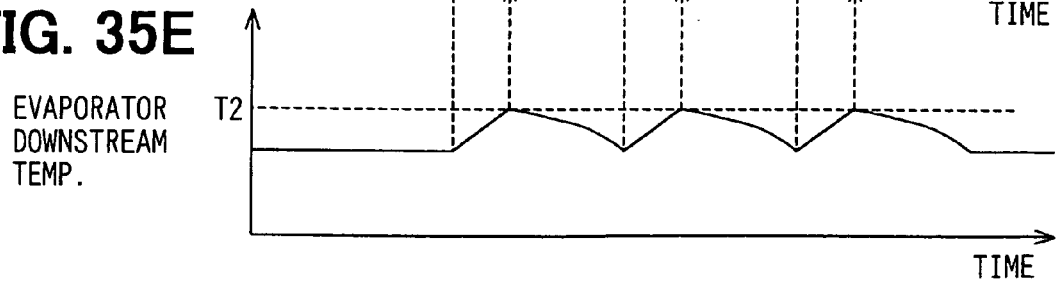
FIG. 35E EVAPORATOR DOWNSTREAM TEMP.

FIG. 37A VEHICLE SPEED
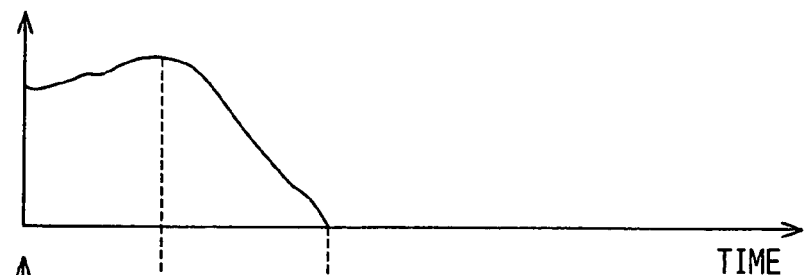
FIG. 37B COMPRESSOR
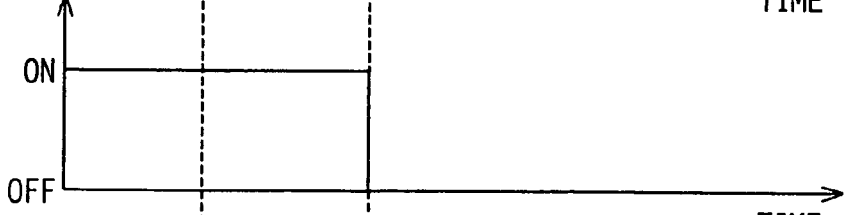
FIG. 37C MOTOR
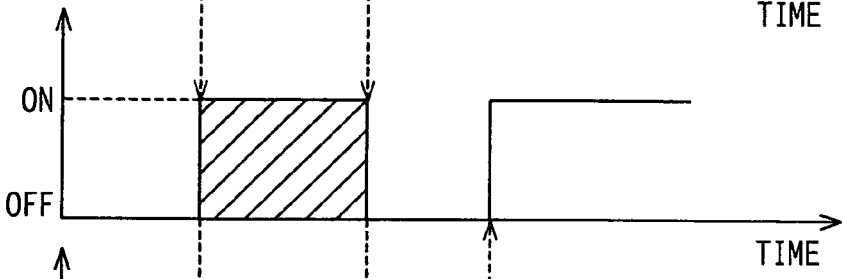
FIG. 37D EVAPORATOR DOWNSTREAM TEMP.
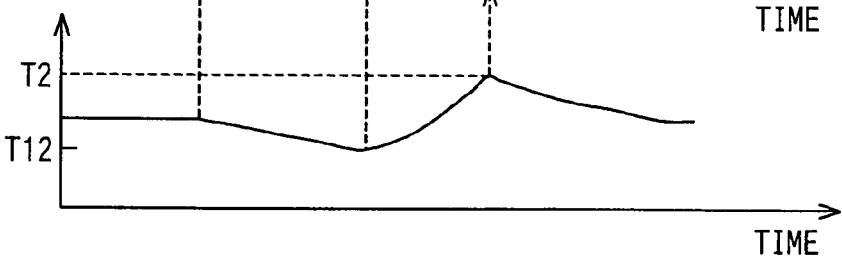
FIG. 38
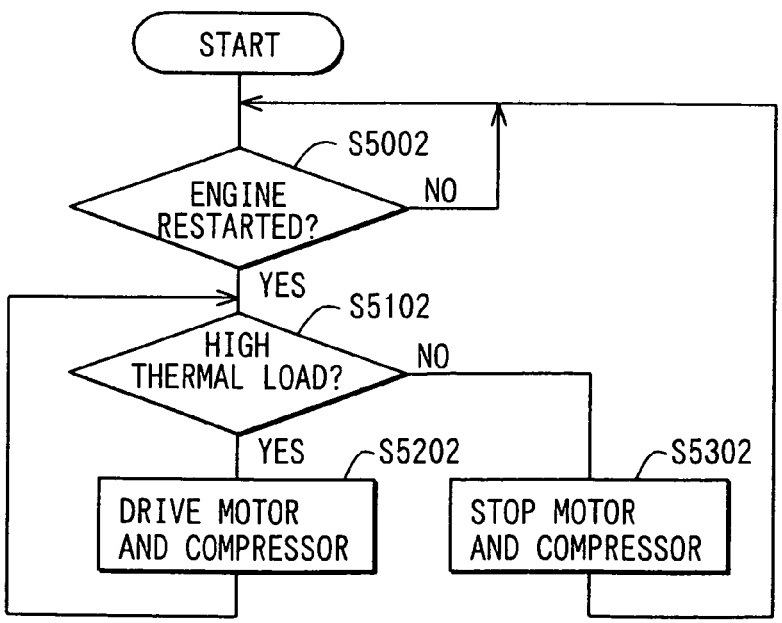

FIG. 39A VEHICLE SPEED
FIG. 39B ENGINE ROTATION
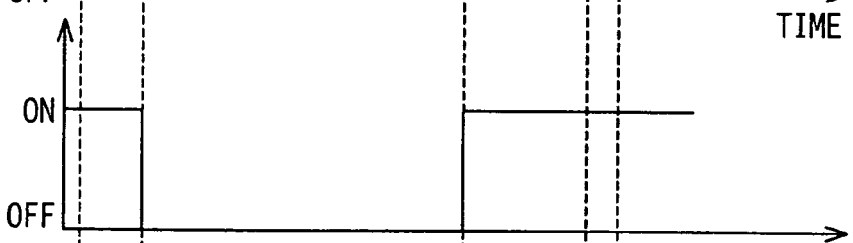
FIG. 39C COMPRESSOR
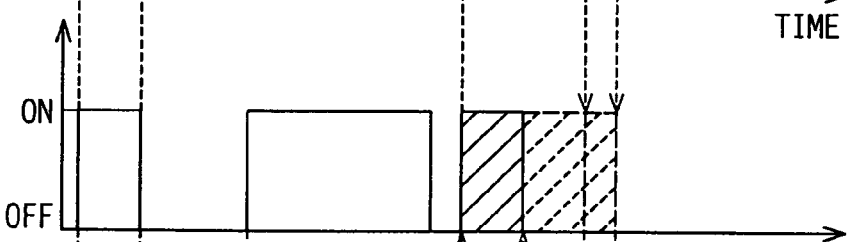
FIG. 39D MOTOR
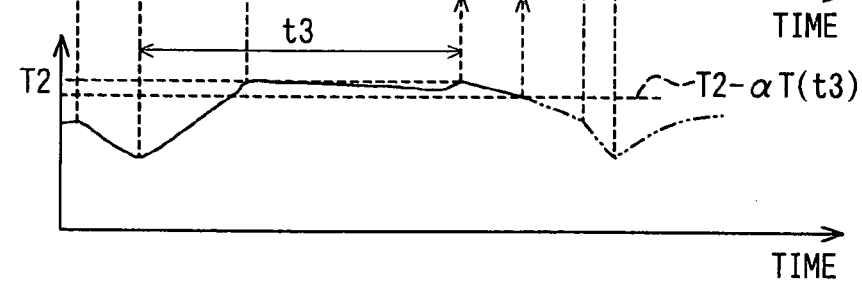
FIG. 39E EVAPORATOR DOWNSTREAM TEMP.

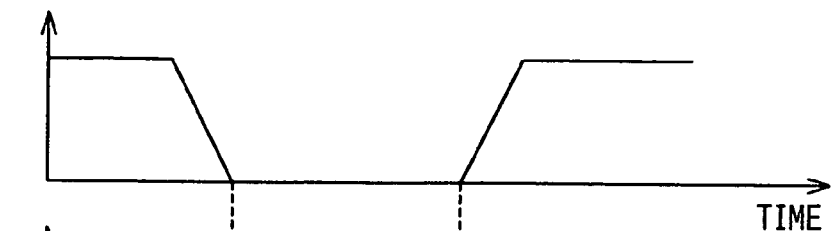
FIG. 45A VEHICLE SPEED
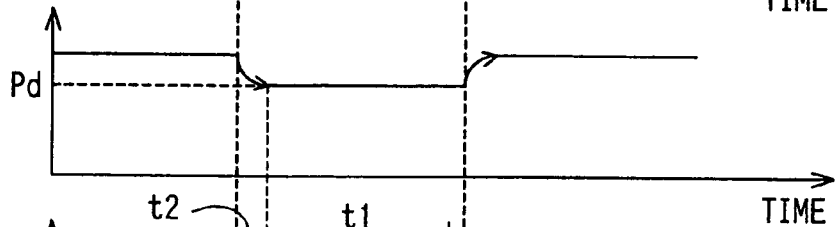
FIG. 45B DISCHARGE PRESSURE
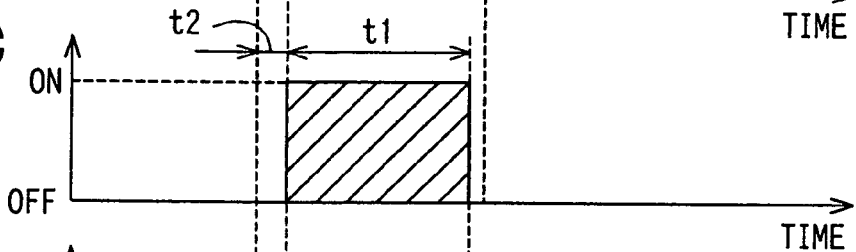
FIG. 45C MOTOR
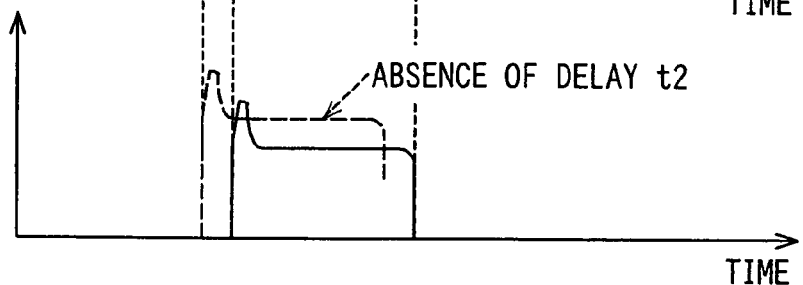
FIG. 45D MOTOR CURRENT LEVEL
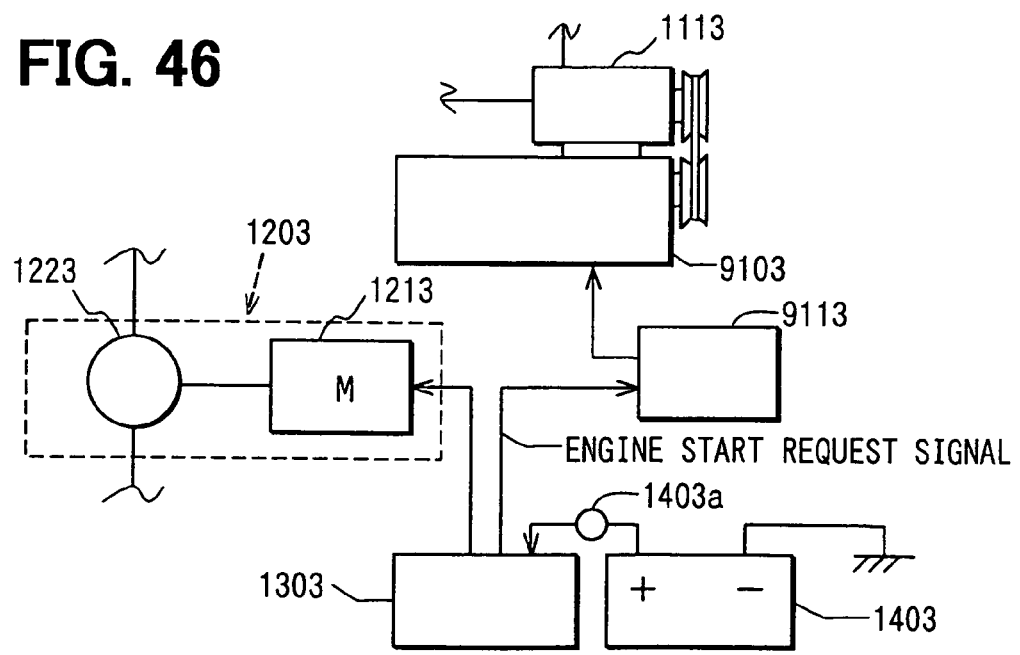
FIG. 46

FIG. 48A VEHICLE SPEED
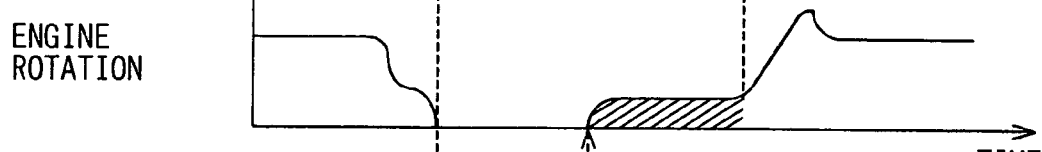
FIG. 48B ENGINE ROTATION
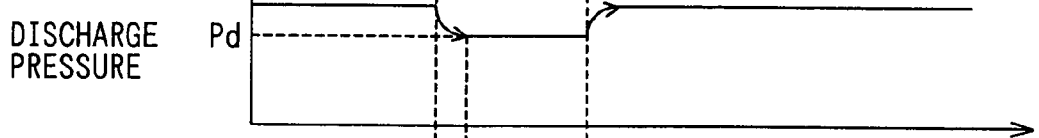
FIG. 48C DISCHARGE PRESSURE
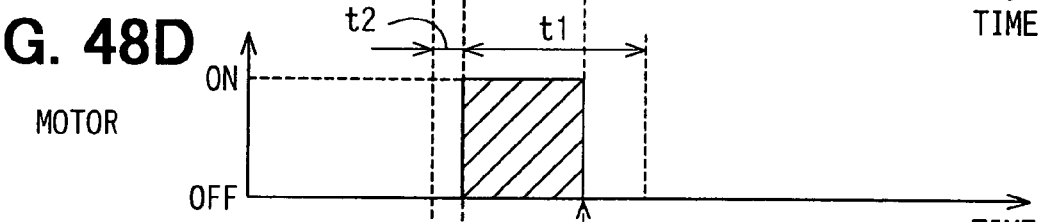
FIG. 48D MOTOR
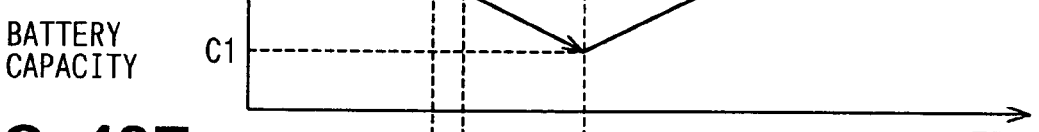
FIG. 48E BATTERY CAPACITY
FIG. 48F EVAPORATOR DOWNSTREAM TEMP.

FIG. 49A  VEHICLE SPEED
FIG. 49B  ENGINE ROTATION
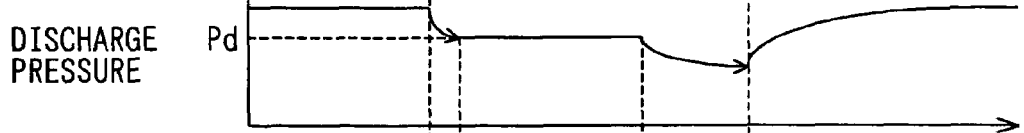
FIG. 49C  DISCHARGE PRESSURE
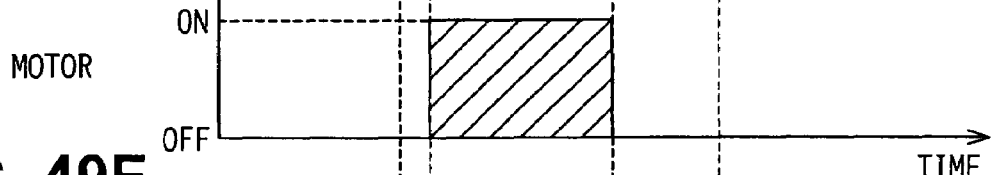
FIG. 49D  MOTOR
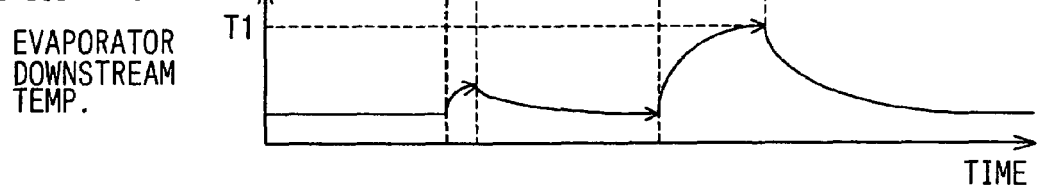
FIG. 49E  EVAPORATOR DOWNSTREAM TEMP.
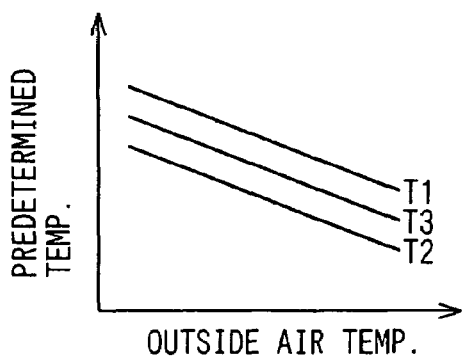
FIG. 50A
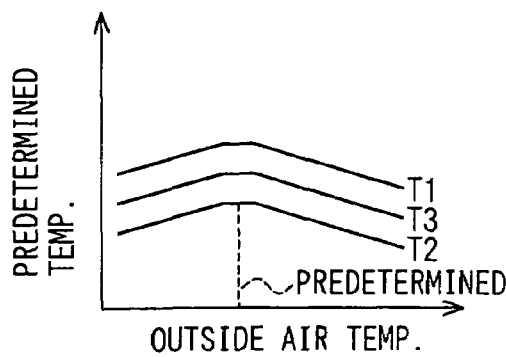
FIG. 50B

VEHICLE SPEED

ENGINE ROTATION

DISCHARGE PRESSURE

MOTOR

EVAPORATOR DOWNSTREAM TEMP.

FIG. 54A VEHICLE SPEED
FIG. 54B ENGINE ROTATION
FIG. 54C DISCHARGE PRESSURE
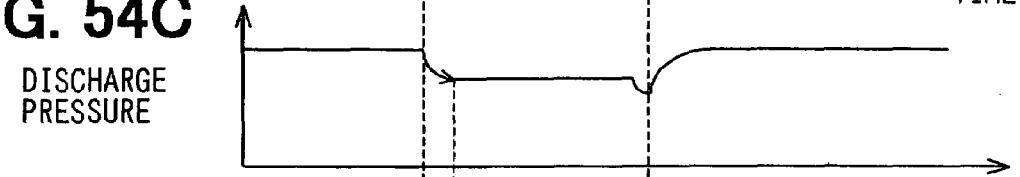
FIG. 54D MOTOR
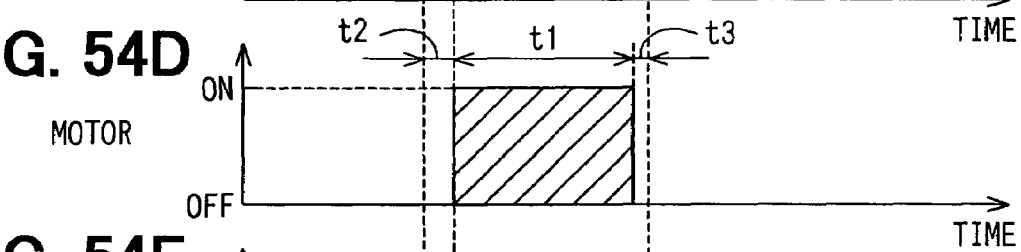
FIG. 54E STARTER MOTOR
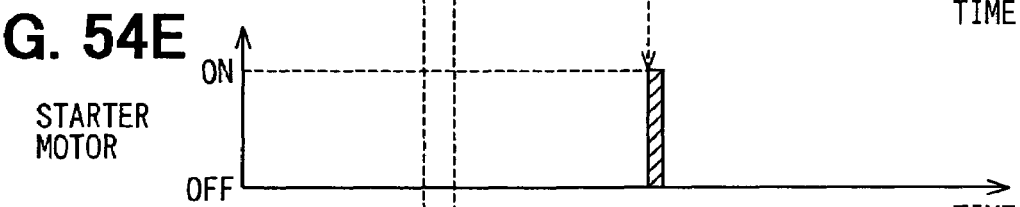
FIG. 54F BATTERY VOLTAGE
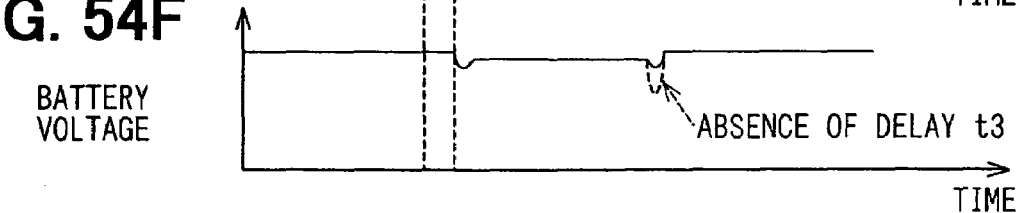

VEHICLE SPEED

DISCHARGE PRESSURE

MOTOR

VEHICLE SPEED

COMPRESSOR

DISCHARGE PRESSURE

MOTOR

VEHICLE SPEED

COMPRESSOR

DISCHARGE PRESSURE

MOTOR

VEHICLE SPEED

FAN FLOW RATE

DISCHARGE PRESSURE

MOTOR

VEHICLE SPEED

ENGINE ROTATION

DISCHARGE PRESSURE

MOTOR

VEHICLE SPEED

ENGINE ROTATION

DISCHARGE PRESSURE

MOTOR

AIR-CONDITIONING APPARATUS INCLUDING MOTOR-DRIVEN COMPRESSOR FOR IDLE STOPPING VEHICLES

CROSS REFERENCES TO RELATED APPLICATIONS

This is a divisional of U.S. application Ser. No. 10/132,764, which was filed on Apr. 26, 2002, now U.S. Pat. No. 6,981,544. This application relates to and incorporates by reference the following Japanese patent applications: 2001-131605, filed on Apr. 27, 2001; 2001-161921, filed on May 30, 2001; 2001-206890, filed on Jul. 6, 2001; 2001-322607, filed on Oct. 19, 2001; 2001-345038, filed on Nov. 9, 2001; and 2002-22723, filed on Jan. 31, 2002.

BACKGROUND OF THE INVENTION

The present invention relates to a vehicle air conditioning system for use in a so-called idle-stop vehicle having an engine stopped when the vehicle in a running state comes to a temporary halt.

So-called idle-stop vehicles have recently been introduced for saving fuel. Since, such an idle-stop vehicle stops the engine when the vehicle comes to a temporary halt, the air-conditioning compressor, which is driven by the engine, and a mechanical pump for a heating unit are stopped, and the air-conditioning system does not operate while the engine is stopped.

To prevent this, Japanese Patent Laid-Open Publication No. 2000-130323 discloses technology associated with a hybrid compressor provided integrally with an electric motor. When the engine is stopped, the compressor is operated by the electric motor to compress refrigerant, thereby operating a cooling unit.

On the other hand, Japanese Patent Laid-Open Publication (JP-A) No. (Hei) 9-277818 discloses the provision of an electric pump and a bypass channel in the cooling water circuit of a heating unit. When the engine is stopped, the heating unit is operated by driving the electric pump.

These devices allow the operation of either the cooling unit or the heating unit when the engine is stopped.

However, the devices disclosed in these publications are insufficient if the air-conditioning system is assumed to perform both cooling and heating functions throughout the year in an idle-stop vehicle.

If the devices are used in combination, both the cooling and heating functions can be performed satisfactorily. However, this increases the number of parts, resulting in a complicated and very costly system.

In another proposed solution to this problem, Japanese Patent Laid-Open Publication (JP-A) No. 2000-127753 discloses the provision of an electric compressor driven by a battery-powered motor in addition to the compressor of a cooling unit. During a stoppage of the engine, the cooling unit is operated by the electric compressor so that cooling is performed, regardless of whether the engine is running or at rest.

The motor is activated when the engine comes to a stop, and continues operating while the engine is stopped. Consequently, the battery may be overtaxed, which may result in insufficient battery strength the next time the engine is started, and the life of the motor may be too short.

In a further proposed solution, as described in Japanese Patent Laid-Open Publication (JP-A) No. 2000-80348, some systems reduce the load on the motor that operates when the vehicle and engine are stopped. Specifically, the operation of the motor is combined with controls such that an air mix door is fixed to a full cool position or fixed in an inside air circulation mode, and an evaporator anti-freezing temperature is raised by a predetermined value.

Also, when a vehicle stops temporarily, since the compressor intended for the cooling unit and the mechanical pump intended for the heating unit are also stopped, the air-conditioning systems do not operate while the engines are stopped.

As means for solving this problem, Japanese unexamined patent publication (JP-A) No. 2000-127753 has disclosed the provision of an electric compressor driven by a battery-powered motor to assist the compressor of a cooling unit. During an engine stoppage, the cooling unit is operated by the electric compressor so that the cooling function is performed regardless of whether the engine is running or at rest.

The motor is activated when the engine comes to a stop, and continues operating while the engine is stopped. Consequently, the battery capacity may fall to the extent that there is insufficient battery capacity the next time the engine is started, and the life of the motor is in doubt.

As described in Japanese Patent Laid-Open Publication No. 2000-80348, some proposals reduce the load on the motor. Specifically, the operation of the motor and the control of other devices is such that, when the motor operates, an air mix door is fixed to a full cool position or fixed in an inside air circulation mode, and such that an evaporator anti-freezing temperature is raised by a predetermined value.

As a consequence, the compressing load is reduced in comparison to that when the engine is running, so that the compressor consumes less power, which reduces the load on the motor. The battery power supply is thus prevented from extraordinary draining.

While such proposals can reduce the power used by the compressor under steady use conditions, variations are naturally expected in the cooling conditions, the frequency of engine stops during moving, and so forth depending on the passengers. Operating the compressor accordingly even under such unsteady conditions as higher cooling loads and longer engine stop times may overtax the battery. In short, the battery may be exhausted.

SUMMARY OF THE INVENTION

In view of the foregoing, it is therefore an object of the present invention to provide a low-cost vehicle air-conditioning system capable of performing both cooling and heating functions throughout the year in an idle-stop vehicle.

It is another object of the present invention to provide a vehicle air-conditioning system capable of providing satisfactory air-conditioning performance during an engine stoppage while avoiding insufficient battery capacity and a short motor life.

It is another object of the present invention to provide a vehicle cooling system that can deliver an average cooling performance at each individual engine stop and thus prevent a dead battery due to excessive motor operations.

In one aspect, the invention is a vehicle air-conditioning apparatus for use in a vehicle in which an engine for driving the vehicle is stopped when the vehicle comes to a temporary halt from a running state. The apparatus includes a cooling unit for cooling air by compressing a refrigerant with a compressor, which is driven by torque from the engine; condensing the compressed refrigerant; expanding the condensed refrigerant; and evaporating the expanded refrigerant. The apparatus further includes a heating unit for heating the air by using, as a heat source, cooling water that is circulated by a mechanical pump, which is driven by torque from the engine. A compression unit compresses the refrigerant. A pump unit circulates the cooling water. A motor drives both the compression unit and the pump unit. The apparatus further includes a control unit for controlling operation of the motor, wherein the control unit causes the motor to operate the compression unit if the engine is stopped when the cooling unit is operating and causes the motor to operate the pump unit if the engine is stopped when the heating unit is operating.

In another aspect, the invention is a vehicle cooling apparatus for use in a vehicle having an engine that is stopped when the vehicle comes to a temporary halt from a running state. The apparatus includes a battery, a motor, a cooling unit, which includes a compressor, which can be driven by the motor when the engine is stopped temporarily to perform air conditioning of a passenger compartment of the vehicle. The apparatus further includes a pump unit for circulating cooling fluid that cools the engine, and the pump unit is driven by the motor. The apparatus further includes means for controlling the operation of the motor such that the pump unit is driven by the motor if there is a demand for heating the passenger compartment and the compressor is driven by the motor if there is a demand for cooling the passenger compartment.

In another aspect, the invention is a vehicle air-conditioning apparatus for use in a vehicle having an engine that is stopped when the vehicle comes to a temporary halt from a running state the apparatus includes an engine-driven apparatus, and the engine-driven apparatus is at least one of a cooling unit for cooling air by compressing a refrigerant with a compressor, which is driven by torque from the engine, and then subjecting the refrigerant to condensation, expansion, and evaporation, and a heating unit for heating air with engine cooling water as a heat source, wherein the cooling water is circulated by a mechanical pump powered by torque from the engine. The apparatus further includes a battery-powered apparatus, wherein the battery-powered apparatus is driven by a motor, which is powered by a battery, and is a compressor unit for compressing the refrigerant if the engine driven apparatus is the cooling unit and is a pump unit for circulating the cooling water if the engine driven apparatus is the heating unit. The apparatus further includes a control unit for controlling the operation of the motor, such that the motor is driven by the control unit to operate the battery-powered apparatus when the engine comes to a stop, while the battery powered apparatus is in operation, and the control unit causes the motor to operate, while the engine is stopped, to maintain, within a predetermined range, an air-conditioning state produced by the engine-driven apparatus prior to the stoppage of the engine.

In another aspect, the invention is essentially a vehicle cooling apparatus for use in a vehicle having an engine that is stopped when the vehicle comes to a temporary halt from a running state. The apparatus includes a refrigeration unit including a compressor apparatus, which can be driven by a battery-powered motor and by torque of the engine, and the compressor apparatus includes a single compressor driven by both the engine and the motor or a first compressor driven by the engine and a second compressor driven by the motor. The apparatus further includes a control unit for controlling the operation of the motor, wherein the motor is operated by the control unit to drive the compressor apparatus when the engine is stopped while the refrigeration unit is in operation.

The control unit operates the motor so that the cumulative operating time of the motor per vehicle halt falls within a predetermined time period.

BRIEF DESCRIPTION OF THE DRAWINGS

These and other objectives and advantages of the invention will become apparent from the following description with reference to the accompanying drawings, wherein:

FIG. 14A is a cross-sectional view showing the operating state of the pump unit shown in FIG. 11 when rotating in the forward direction;

FIG. 14B is a cross-sectional view showing the operating state of the pump unit shown in FIG. 11 when rotating in the rearward direction;

FIG. 15 is a flow chart illustrating part of control over the operation of the electric compressor-pump shown in FIG. 11;

FIGS. 18A-18E are timing charts showing the engine operation, the motor operation, an evaporator downstream temperature Te (the temperature downstream of the evaporator), battery capacity C, and a motor temperature Tm during the control procedure of FIG. 17, respectively;

FIG. 19 is part of a flowchart showing the operation control procedure of an electric compressor-pump according to a sixth embodiment;

FIG. 28 is a flowchart showing the control procedure of the compressor and the electric compressor in FIG. 27;

FIGS. 29A-29D are timing charts for showing the vehicle speed, an accelerator throttle opening, the operation of the compressor, and the operation of the motor during the control procedure of FIG. 28, respectively;

FIG. 30 is a flowchart showing the control procedure of a compressor and an electric compressor according to a twelfth embodiment;

FIGS. 31A-31E are timing charts for showing the vehicle speed, a determination of compressor stoppage due to acceleration, the operation of the compressor, the operation of the motor, and the evaporator downstream temperature during the control procedure of FIG. 30, respectively;

FIGS. 35A-35E are timing charts for showing the working load on the engine, a cooling water temperature, the operation of the compressor, the operation of the motor, and the evaporator downstream temperature during the control procedure according to the thirteenth embodiment, respectively;

FIGS. 37A-37D are timing charts for showing the vehicle speed, the operation of the compressor, the operation of the motor, and the evaporator downstream temperature during the control procedure according to the fourteenth embodiment, respectively;

FIG. 38 is a flowchart showing the control procedure of an electric compressor according to a fifteenth embodiment;

FIGS. 39A-39E are timing charts for showing the vehicle speed, the engine speed, the operation of the compressor, the operation of the motor, and the evaporator downstream temperature during the control procedure according to the fifteenth embodiment, respectively;

FIGS. 45A-45D are timing charts showing vehicle speed, discharge pressure, the ON/OFF state of the motor, and a motor current under the control procedure of FIG. 41, respectively;

FIG. 46 is a schematic diagram showing the partial configuration of a seventeenth embodiment of the present invention;

FIGS. 48A-48F are timing charts showing vehicle speed, engine speed, discharge pressure, the ON/OFF state of the motor, battery capacity, and an evaporator temperature under the control procedure of FIG. 46, respectively;

FIGS. 49A-49E are timing charts showing vehicle speed, the engine speed, the discharge pressure, the ON/OFF state of the motor, and the evaporator temperature under the control procedure of a eighteenth embodiment of the present invention, respectively;

FIGS. 50A and 50B are graphs showing the relationship between the outside air temperature and first, second, and third predetermined temperatures in a first pattern and a second pattern, respectively;

FIGS. 54A-54F are timing charts showing vehicle speed, the engine speed, the discharge pressure, the ON/OFF state of the motor, the ON/OFF state of a starter, and a battery voltage of the twentieth embodiment, respectively;

DETAILED DESCRIPTION OF THE PREFERRED EMBODIMENTS

First Embodiment

Figure 1:
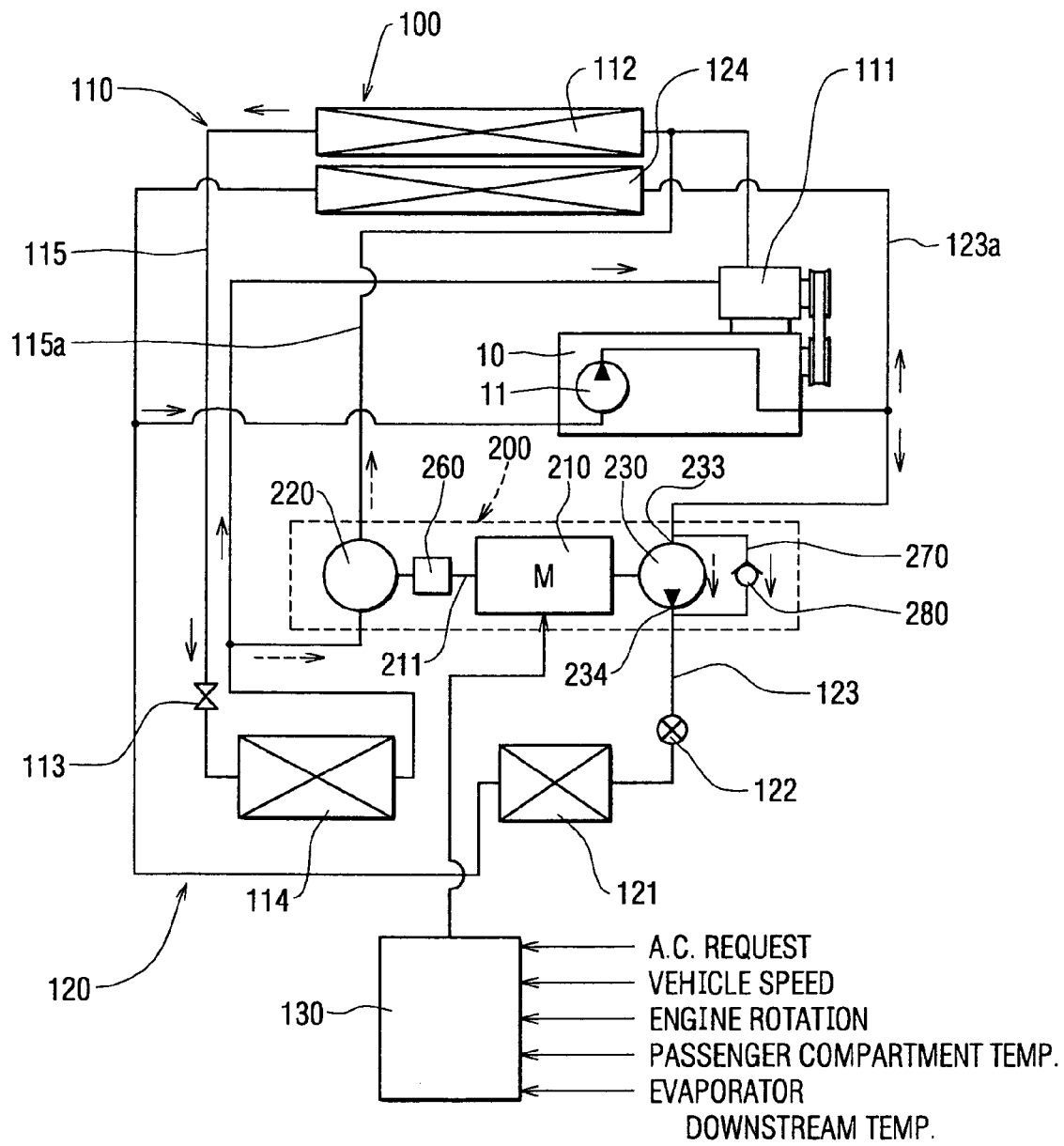
FIG. 1 is a schematic view showing an overall structure of a first embodiment according to the present invention.

A specific structure of a first embodiment according to the present invention will be described herein below with reference to FIGS. 1 to 4. A vehicle air-conditioning system 100 is for use in a so-called idle-stop vehicle having an engine 10 stopped when the vehicle in a running state comes to a temporary halt. The air-conditioning system 100 is composed of a cooling unit 110, a heating unit 120, a control unit 130, and an electric compressor-pump 200.

The cooling unit 110 forms a known refrigerating cycle in which a compressor 111 for compressing a refrigerant under high-temperature and high-pressure conditions, a condenser 112 for condensing and liquefying the compressed refrigerant, an expansion valve 113 for adiabatically expanding the liquefied refrigerant, and an evaporator 114 for evaporating the expanded refrigerant and for cooling air by using latent heat resulting from evaporation are connected in succession with a refrigerant pipe 115.

The compressor 111 is configured to be operated upon receiving a driving force from the engine 10 transmitted via a pulley and a pulley belt.

The heating unit 120 is a known unit in which a mechanical pump 11 provided in the engine 11 and a heater 121 for heating air by using cooling water for cooling the engine 10 as a heat source are connected to each other with a cooling water pipe 123. A water valve 122 for adjusting the flow rate of the cooling water is provided on the cooling-water in-coming side of the heater 121.

The mechanical pump 11 is operated upon receiving the driving force of the engine 10 and circulates the cooling water in the heater 121.

The cooling water for the engine 10 is cooled by a radiator 124 provided in the cooling water pipe 123a to perform temperature control.

The control unit 130 controls the operation of the motor 210 of an electric compressor-pump 200, which will be described later. The control unit 130 operates the motor 210 based on signals from various sensors not shown, i.e., a vehicle speed signal, an engine speed signal, an evaporator rear temperature signal, an in-car temperature, and an A/C request signal, and the control unit 130 controls the direction of rotation of the motor 210.

Figure 2:
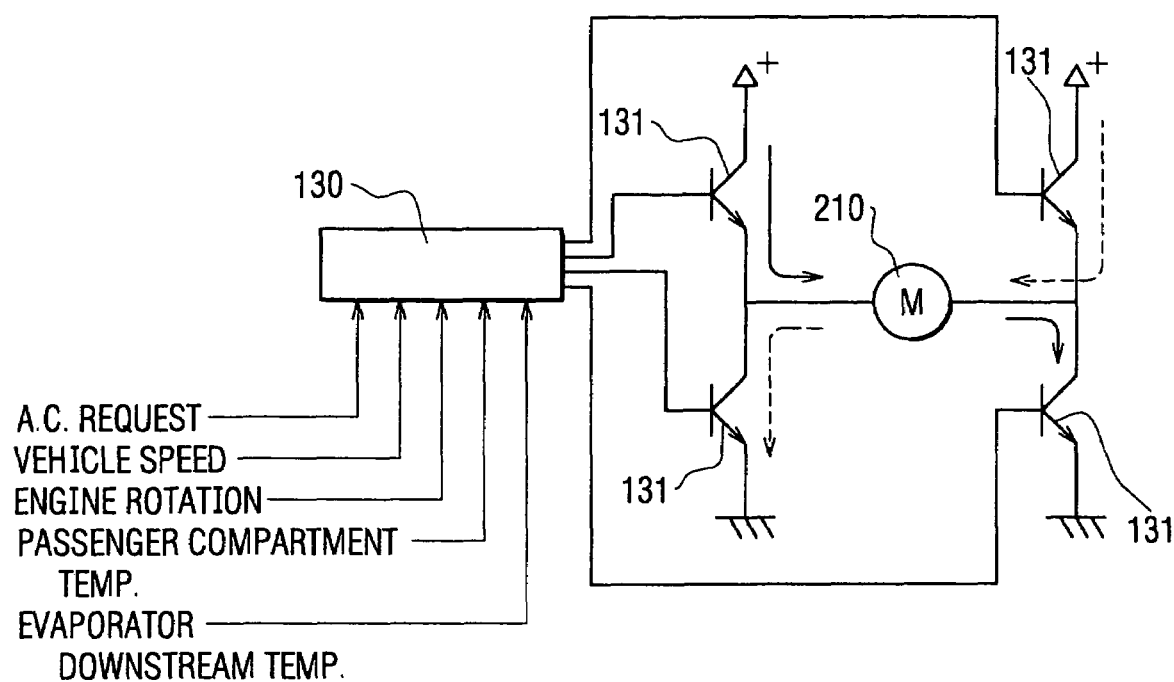
FIG. 2 is a diagram of a circuit connecting a control unit to a motor shown in FIG. 1.

Specifically, as shown in FIG. 2, a circuit connecting the control unit 130 to the motor 210 by using a transistor 131 is provided. The circuit has an energization pattern indicated by the solid or broken lines to effect control of the rotation of the motor 210 in one direction or in the opposite direction.

Figure 3:
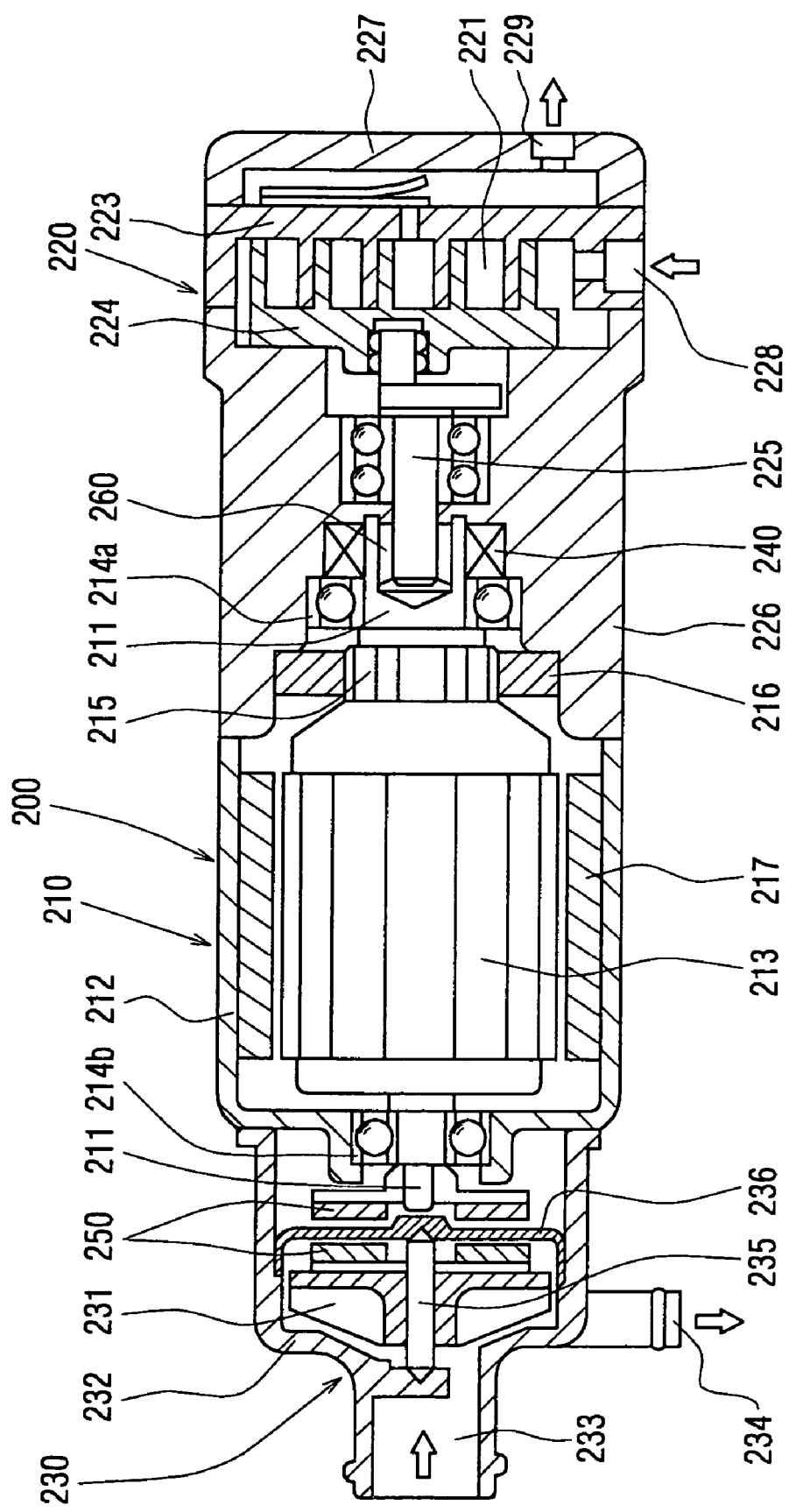
FIG. 3 is a cross-sectional view of a whole electric compressor-pump shown in FIG. 1.
Figure 4:
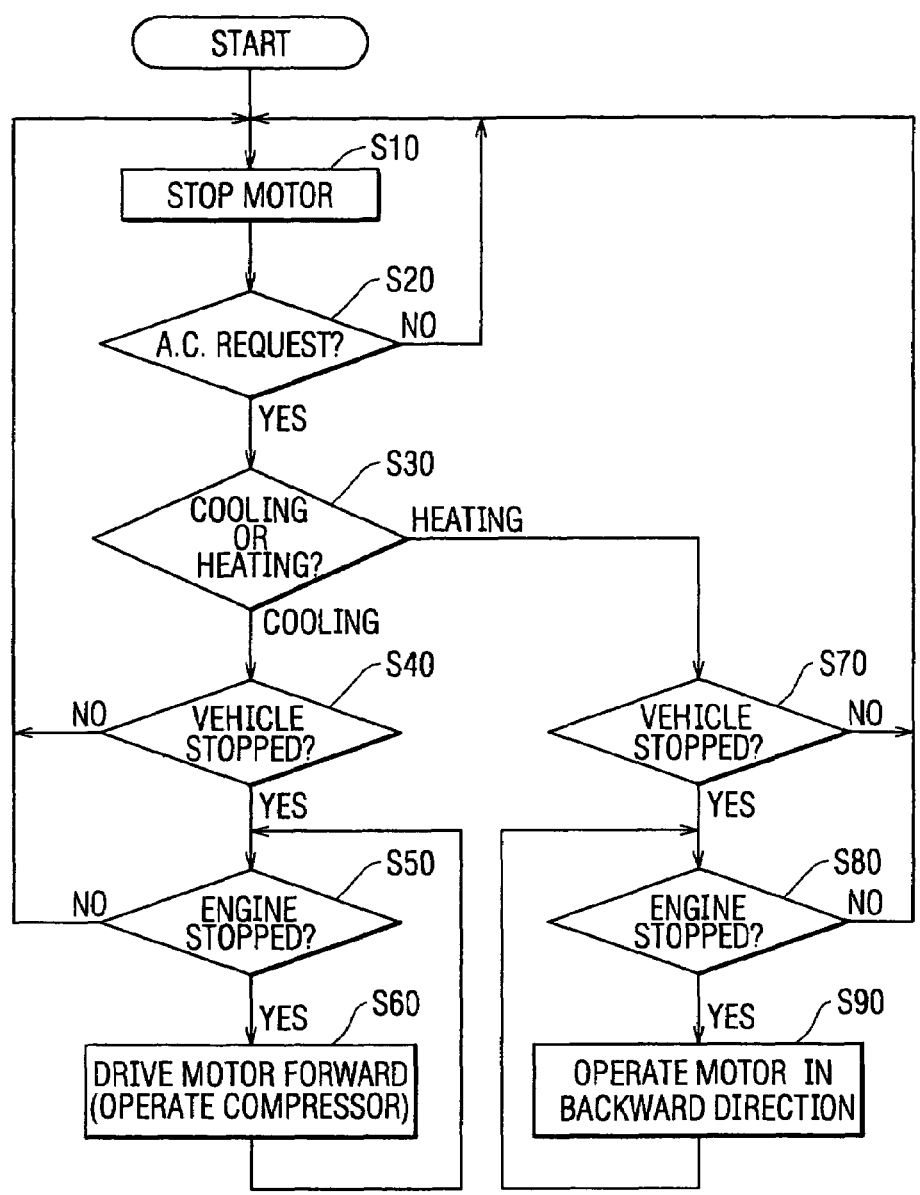
FIG. 4 is a flow chart illustrating control over the operation of the electric compressor-pump.

Referring to FIG. 3, a structure of the electric compressor-pump 200 as a principal portion of the present invention will be described.

The electric compressor-pump 200 is composed of a compression unit 220 and a pump unit 230 provided integrally on both end portions of the rotating shaft 211 of the motor 210.

The motor 210 is a known DC motor having a rotor 213 and a stator 217 provided within a motor housing 212 such that the rotating shaft 211 extending through the rotor 213 is supported by bearings 214a and 214b. The motor 210 is driven to rotate with power supplied from a brush 216 to a commutator 215.

The compression unit 220 is formed as a rotary compression unit which performs a normal compressing operation only during rotation in one direction (hereinafter referred to as a forward direction). More specifically, the compression unit 220 is formed as a scroll compression unit in the present embodiment.

The compression unit 220 is composed of a fixed scroll 223, a movable scroll 224, and an eccentric shaft 225 provided in a front housing 226 and a rear housing 227. The eccentric shaft 225 is configured to be connected to one end portion of the rotating shaft 211 of the motor 210 via a unidirectional clutch 260. The unidirectional clutch 260 allows the forward torque of the motor 210 to be transmitted and used to drive the movable scroll 224, while preventing the torque from being transmitted during rotation in the rearward direction.

When the motor 210 is rotating in the forward direction, therefore, the movable scroll 224 revolves by the unidirectional clutch 260 and the eccentric shaft 225 such that the refrigerant flowing, through an inlet 228, into a compression chamber 221 formed between itself and the opposing fixed scroll 223 is compressed (hereinafter referred to as the normal compressing operation) and discharged through an outlet 229. On the other hand, the movable scroll 224 does not revolve when the motor 210 is rotating in the rearward direction so that the compressing operation is not performed (hereinafter referred to as a non-operating state).

To prevent the refrigerant in the compression unit 220 from leaking toward the motor 210, a shaft sealing unit 240 is provided between the motor 210 and the compression unit 220, specifically between the rotating shaft 211 and the eccentric shaft 225.

The pump unit 230 is composed of a centrifugal impeller 231 provided in a pump housing 232 formed with an inlet 233 and an outlet 234 each for the cooling water. The pump unit 230 is configured to be located at the other end of the rotating shaft 211 of the motor 210.

The shaft 235 of the impeller 231 and the rotating shaft 211 of the motor 210 are provided with respective magnetic couplings 250 so that the torque of the motor 210 is transmitted by the magnetic couplings 250 to the shaft 235 to rotate the impeller 231.

The blade of the impeller 231 and the pump housing 232 are configured to pump the cooling water (hereinafter referred to as a normal pumping operation) during rotation in the direction opposite to the forward direction in which the unidirectional clutch 260 causes the compression unit 220 to perform the normal compressing operation. Due to the configurations of the blade and the pump housing 232, the impeller 231 is designed to rotate idly (hereinafter referred to as the non-operating state) during rotation in the forward direction.

A separator 236 is provided between the magnetic couplings 250 to prevent the cooling water in the pump unit 230 from flowing toward the motor 210.

The motor 210, the compression unit 220, and the pump unit 230 constitute the integral electric compressor pump 200 with the respective housings 212, 226, 227, and 232 thereof being connected to each other.

As shown in FIG. 1, the compression unit 220 of the electric compressor-pump 200 is located in the cooling unit 110 such that the compression unit 220 is connected parallel to the compressor 111 via the refrigerant pipe 115a, specifically, such that the compression unit 220 is connected between the upstream side of the condenser 112 and the downstream side of the evaporator 114.

The pump unit 230 is located in the heating unit 120 such that the pump unit 230 is in series with the mechanical pump 11, specifically, such that the pump unit 230 is positioned between the mechanical pump 11 and the water valve 122.

The cooling water pipe 123 is provided with a bypass channel 270 along which the cooling water from the mechanical pump 11 passes through the pump unit 230 when the motor 210 and the pump unit 230 are in the non-operating state. The bypass channel 270 is provided with a check valve 280 for preventing a short circuit from the outlet 234 to the inlet 233 during the normal operation of the pump unit 230.

A description will of the operation of the air-conditioning system follows. When the vehicle is running, i.e., when the engine 10 is operated, the cooling unit 110 and the heating unit 120 operate like those of prior art systems. In the cooling unit 110, the compressor 111 operates upon receiving torque from the engine 10 and compresses the refrigerant. The compressed refrigerant is condensed to be liquefied in the condenser 112, adiabatically expanded in the expansion valve 113, and then evaporated in the evaporator 114. By using latent heat resulting from evaporation, the air passing through the evaporator 114 is cooled.

In the heating unit 120, the mechanical pump 11 is operated upon receiving the driving force from the engine 10 to open the water valve 122 and circulate the cooling water in the heater 121. By using the cooling water as a heat source, the air passing through the heater 121 is heated.

Since the air-conditioning system is used in an idle-stop vehicle, the engine 10 is stopped when the vehicle comes to a temporary halt so that the compressor 111 and the mechanical pump 11, each using the engine 10 as a driving source, do not operate. The electric compressor-pump 200 is configured to be operated at this time.

The electric compressor-pump 200 is controlled by the control unit 130. The control operation will be described in detail with reference to the flow chart of FIG. 4.

First, in step S10, the motor 210 is halted. In step S20, it is determined whether or not there is a request for a cooling or heating operation based on an A.C. request signal. If there is no request, the process returns to step S10 and the halted state of the motor 210 is maintained. If there is a request for a cooling or heating operation, it is determined in step S30 whether the request is for a cooling operation or a heating operation.

If it is determined in step S30 that the request is for a cooling operation, the whole process advances to step S40 where it is determined whether or not the vehicle is halted based on a vehicle speed signal. If the vehicle is halted, it is determined in step S50 whether or not the engine 10 is stopped. If it is determined that the engine 10 is stopped, the motor 210 is operated to rotate in the forward direction (the direction of rotation which operates the unidirectional clutch 260) in step S60 such that the compression unit 220 performs the normal compressing operation (at this time, the pump 230 is in the non-operating state). Thereafter, step S60 is sustained while the engine 10 is halted so that the compression unit 220 is operated continuously.

If it is determined in step S40 that the vehicle is not halted (is running) or if it is determined in step S50 that the engine 10 is not stopped (is rotating), the process returns to step S10 so that the motor 210 is halted and the compression unit 220 is halted.

If it is determined in step S30 that the request is for a heating operation, it is determined in steps S70 and S80 whether or not the vehicle and the engine 10 are halted, respectively, as in steps S40 and S50. If the vehicle is at a halt and the engine 10 is at a stop, the motor 210 is operated in step S90 in the direction (the direction of rotation which brings the unidirectional clutch 260 into the non-operating state) opposite to the forward direction so that the pump unit 230 performs the normal pumping operation (at this time, the compression unit 220 is in the non-operating state). Thereafter, step S90 is sustained while the engine 10 is stopped so that the pump unit 230 is operated continuously.

If it is determined in step S70 or S80 that the vehicle is not halted (is running) or that the engine 10 is not stopped (is rotating), the process returns to step S10 so that the motor 210 is halted and the pump 230 is halted.

A description of the effects of the invention follows. If the engine 10 is stopped while the cooling unit 110 is operating, the motor 210 is controlled to rotate in the forward direction such that the compression unit 220 performs the normal compressing operation. This allows the compression unit 220 to compress the refrigerant in place of the compressor 111 used originally to compress the refrigerant and allows the cooling function to be performed continuously.

If the engine 10 is stopped while the heating unit 120 is operating, the motor 210 is controlled to rotate in the rearward direction such that the pump unit 230 performs the normal pumping operation. This allows the pump unit 230 to circulate the cooling water in place of the mechanical pump 11 used originally to circulate the cooling water and allows the heating operation to be performed continuously. In short, both the cooling and heating functions can be performed reliably throughout the year even when the engine 10 is stopped.

What results is a compact and low-cost air-conditioning system that can be used selectively for the heating and cooling operations by selecting the compression unit 220 or the pump unit 230 by changing the direction of the single motor 210.

Since the compression unit 220 is located in the cooling unit 110 in parallel relation to the compressor 111, the compression unit 220 and the compressor 111 do not allow the refrigerant condensed under a high pressure to flow from one to the other. This obviates the need to excessively increase the pressure strength of the inlet port of each of the compression unit 220 and the compressor 111, thereby preventing increased cost.

Since the pump unit 230 is located in the heating device 120 in series relation to the mechanical pump 11, the piping is not complicated by incorporating the pump unit 230 into the cooling water pipe 123 of the heating unit 120. This provides a constant supply of cooling water flowing in the engine 10 to the heater 121 and prevents a reduction in heating ability.

Since the compression unit 220 and the pump unit 230 can be used selectively for cooling and heating operations by changing the direction of rotation of the motor 210, a low-cost air-conditioning system is provided.

Since the compression unit 220 and the pump unit 230 are provided at the both ends of the rotating shaft 211 of the motor 210, the number of the shaft sealing units 240 for preventing the refrigerant and the cooling water from leaking through the rotating shaft 211 can be minimized. In short, it is sufficient to provide the shaft sealing unit 123 for the refrigerant between the compression unit 220 and the motor 210 and to provide the shaft sealing unit 241 for the cooling water between the pump unit 230 and the motor 210. In particular, the shaft sealing unit 241 between the pump unit 230 and the motor 210 can be omitted in the present embodiment since the pump unit 230 is operated to rotate by the motor 210 via the magnetic couplings 250.

Since the unidirectional clutch 260 is provided between the compression unit 220 and the motor 210, the normal operation performed by the compression unit 220 or the pump unit 230 when the motor 210 is rotating in the forward or rearward direction can be used selectively.

Figure 5:
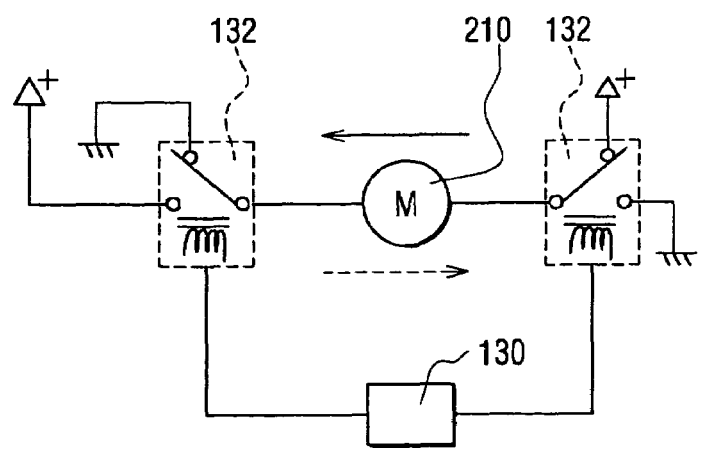
FIG. 5 is a circuit diagram showing a variation of the electric compressor-pump shown in FIG. 2.

The circuit for connecting the control unit 130 to the motor 210 may use a relay 132 as shown in FIG. 5 instead of using the transistor 131 shown in FIG. 2. The direction of rotation of the motor 210 can be controlled as indicated by the solid lines and the broken lines in the drawings.

The provision of the bypass channel 270 may be omitted depending on the load (resistance of water flow) received by the mechanical pump 11 when the pump 230 is in the non-operating state.

Second Embodiment

A second embodiment of the present invention shows variations of the structure using, as the compression unit 220, the rotary compression unit 220 which performs the normal compressing operation only during rotation in the forward direction. The second embodiment omits the provision of the unidirectional clutch 260.

Figure 6:
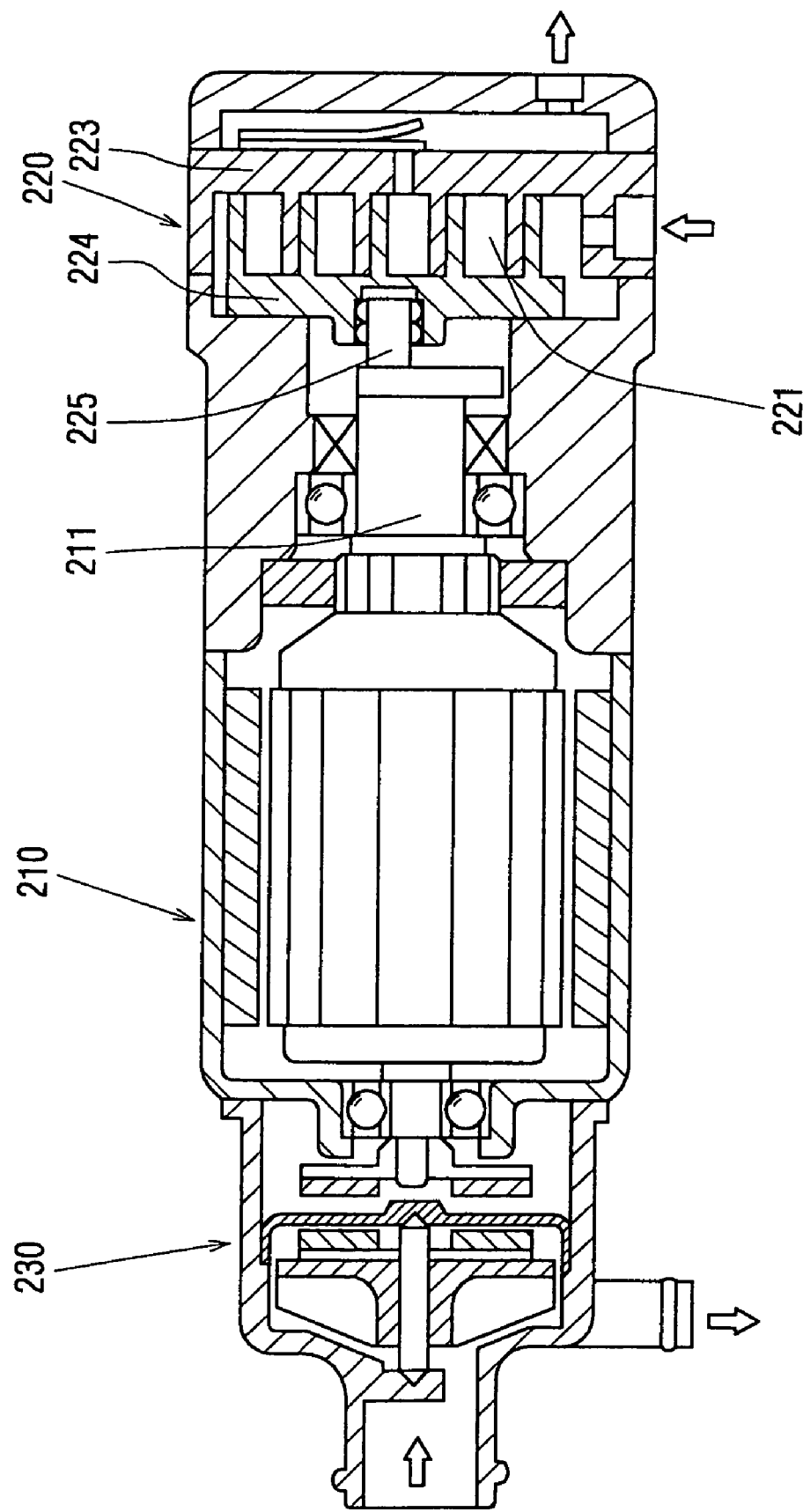
FIG. 6 is a cross-sectional view of a compression unit according to a first variation of a second embodiment of the present invention.

Specifically, as shown in FIG. 6, the second embodiment is obtained by taking the unidirectional clutch 260 away from the scroll compression unit 220 described in the first embodiment. The second embodiment operates the movable scroll 224 of the compression unit 220 via the rotational shaft 211 and the eccentric shaft 225.

In the present embodiment, the compression unit 220 performs the normal compressing operation when the motor 210 is rotating in the forward direction, while the pump 230 is in the non-operating state. When the motor 210 is rotating in the rearward direction, the pump unit 230 performs the normal pumping operation, while the compression unit 220 is in the non-operating state. Specifically, even if the rotary compression unit 220 having no suction valve is operated to rotate in the rearward direction, it does not perform the refrigerant compressing operation, and a vacuum pump effect is exerted in the compression chamber 221 so that the power consumed by the motor 210 is significantly reduced. This allows selective use of the normal compressing operation performed by the compression unit 220 during rotation in the forward direction and the non-operating state of the compression unit 220 during rotation in the rearward direction and obviates the necessity to use the unidirectional clutch 260.

Figure 7A:
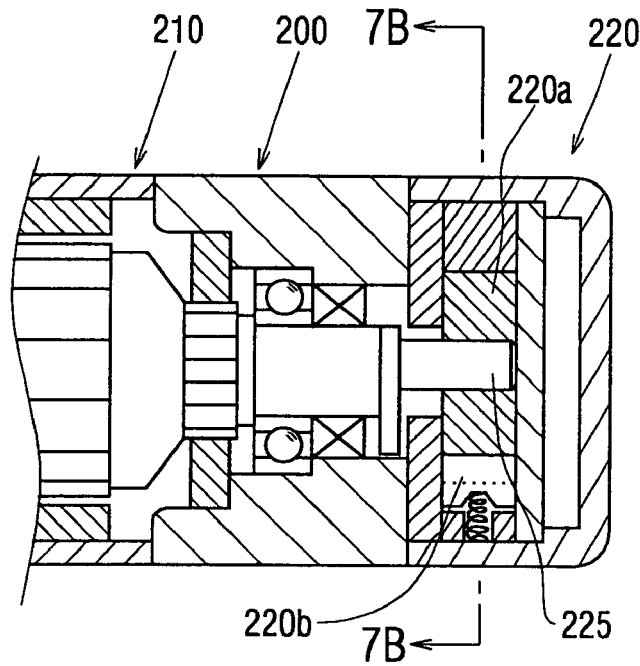
FIG. 7A is a cross-sectional view of a compression unit according to a second variation of the second embodiment.
Figure 7B:
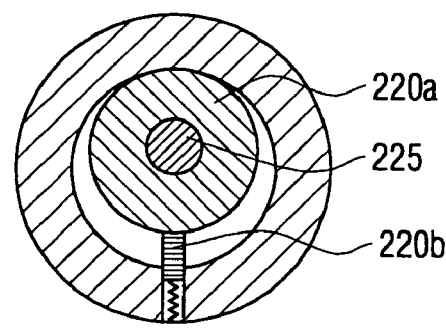
FIG. 7B is a cross sectional view taken along the line 7B-7B in FIG. 7A.
Figure 8A:
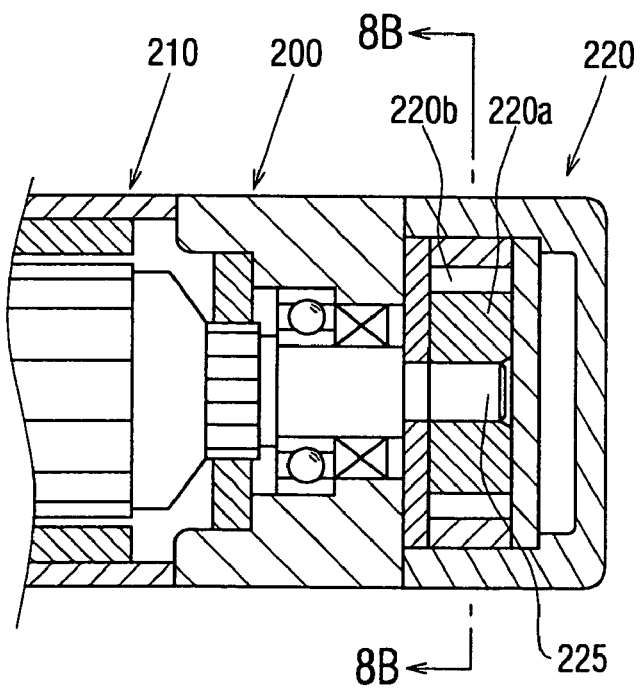
FIG. 8A is a cross-sectional view of a compression unit according to a third variation of the second embodiment.
Figure 8B:
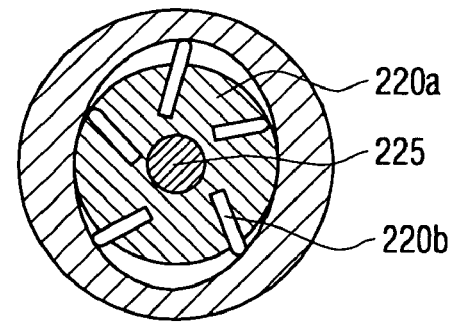
FIG. 8B is a cross-sectional view taken along the line 8B-8B of FIG. 8A.

Likewise, a structure using a rolling piston compression unit 220 in which the refrigerant is compressed by using a revolving rotor 220a and a vane 220b as shown in FIG. 7 and a structure using a rotary vane compression unit 220 having a rotor 220a and a plurality of vanes 220b as shown in FIG. 8 may also be used as other variations of the structure using the rotary compression unit 220.

Figure 9:
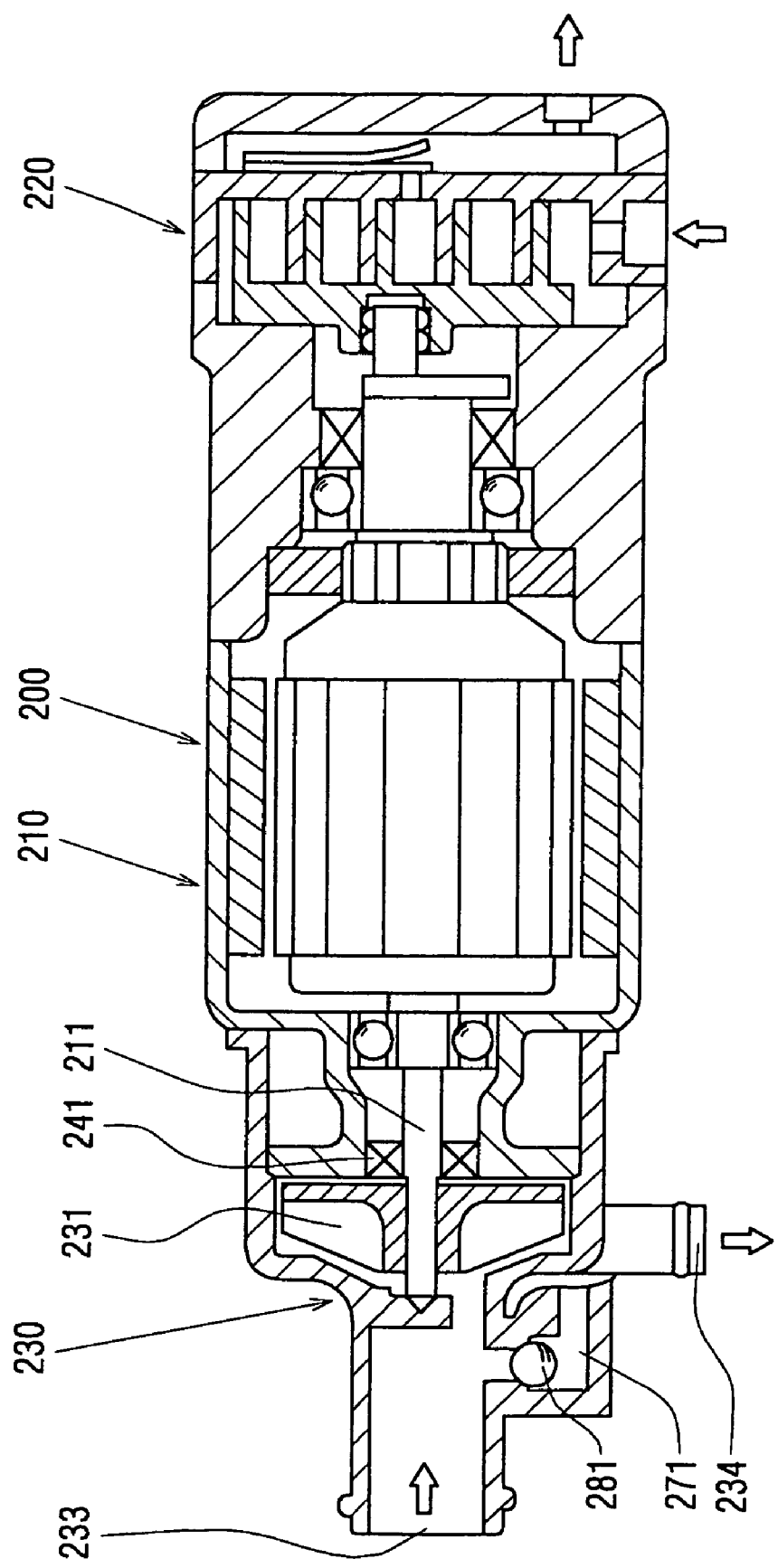
FIG. 9 is a cross-sectional view of a compression unit according to a fourth variation of the second embodiment.

In the pump unit 230 also, the impeller 231 may be connected directly to the shaft 211 of the motor 210 with the shaft sealing unit 241 located as shown in FIG. 9.

The bypass channel 270 extending through the pump unit 230 may also be formed integrally with the pump unit 230 as a bypass channel 271 provided with a bypass valve 281.

Third Embodiment

Figure 10A:
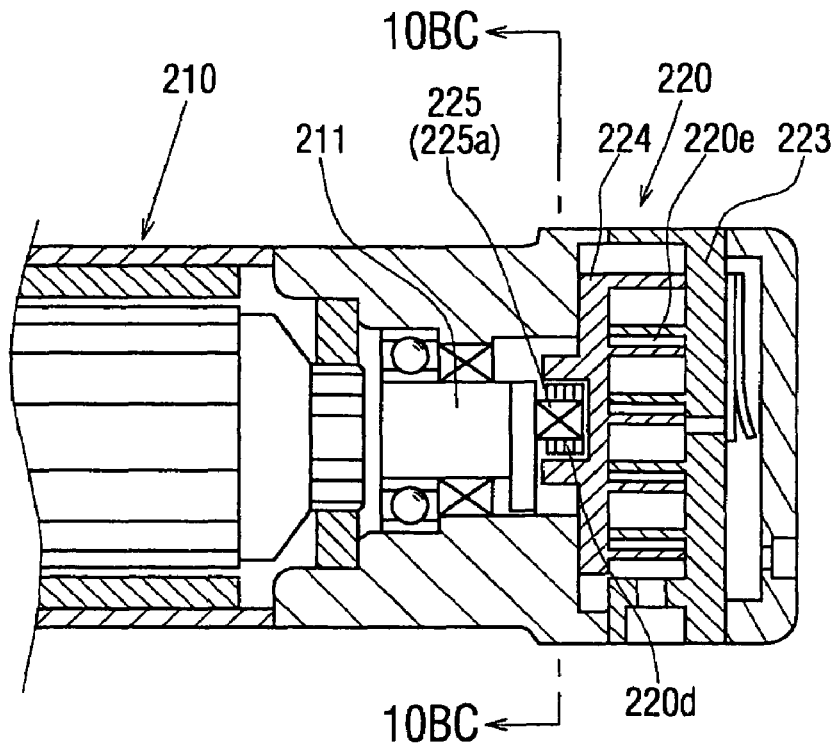
FIG. 10A is a cross-sectional view of a compression unit according to a fifth variation of a third embodiment.

FIG. 10 shows a third embodiment of the present invention. The third embodiment is obtained by providing the scroll compression unit 220 according to the second embodiment shown in FIG. 6 with a releasing mechanism for releasing the compression chamber 221 when the motor 210 is rotating in the rearward direction, i.e., a radius compensating mechanism 222.

Figure 10B:
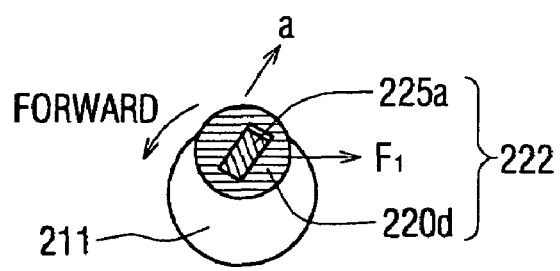
FIG. 10B is a cross-sectional view taken along the line 10BC-10BC of FIG. 10A during rotation in a forward direction.

The radius compensating mechanism 222 is obtained by forming a tip portion of the eccentric shaft 225 into a plate having a width across flat with intervention of a bush 220d. When the motor 210 is rotating in the forward direction, the radius compensating mechanism 222 functions to increase the radius of revolution of the movable scroll 224 in the direction a of the width across flat under a counterforce F1 resulting from the compression of the refrigerant, as shown in FIG. 10B, thereby improving the seal with respect to the fixed scroll 223.

Figure 10C:
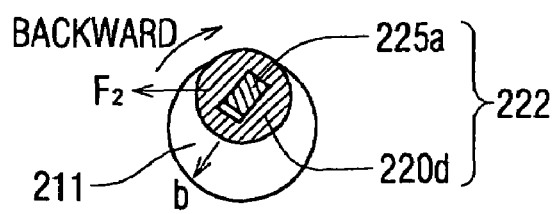
FIG. 10C is a cross-sectional view taken along the line 10BC-10BC of FIG. 10A during rotation in a rearward direction.

When the motor 210 is rotating in the rearward direction, however, the radius compensating mechanism functions to reduce the radius of revolution of the movable scroll 224 in the direction b under a frictional force F2 resulting from the revolution of the movable scroll 224, as shown in FIG. 10c, thereby forming an interscroll space 220e between the movable scroll 224 and the fixed scroll 223. This further reduces a loss in the compression unit 220 when the motor 210 is rotating in the rearward direction.

If either one of the fixed scroll 223 and the movable scroll 224 of the scroll compression unit 220 is made of a resin, vibration between the fixed and movable scrolls 223 and 224 during rotation in the rearward direction and noise resulting from the interference between the scrolls is prevented.

Fourth Embodiment

FIGS. 11 to 15 show a fourth embodiment of the present invention. In contrast to the first embodiment, the fourth embodiment brings each of the compression unit 220 and the pump unit 230 into the operating state when each of the cooling unit 110 and the heating unit 120 is operating, thereby performing a dehumidifying heating function. In addition, the fourth embodiment has changed the position of the shaft sealing unit 240 to reduce power consumed by the motor 210.

Figure 11:
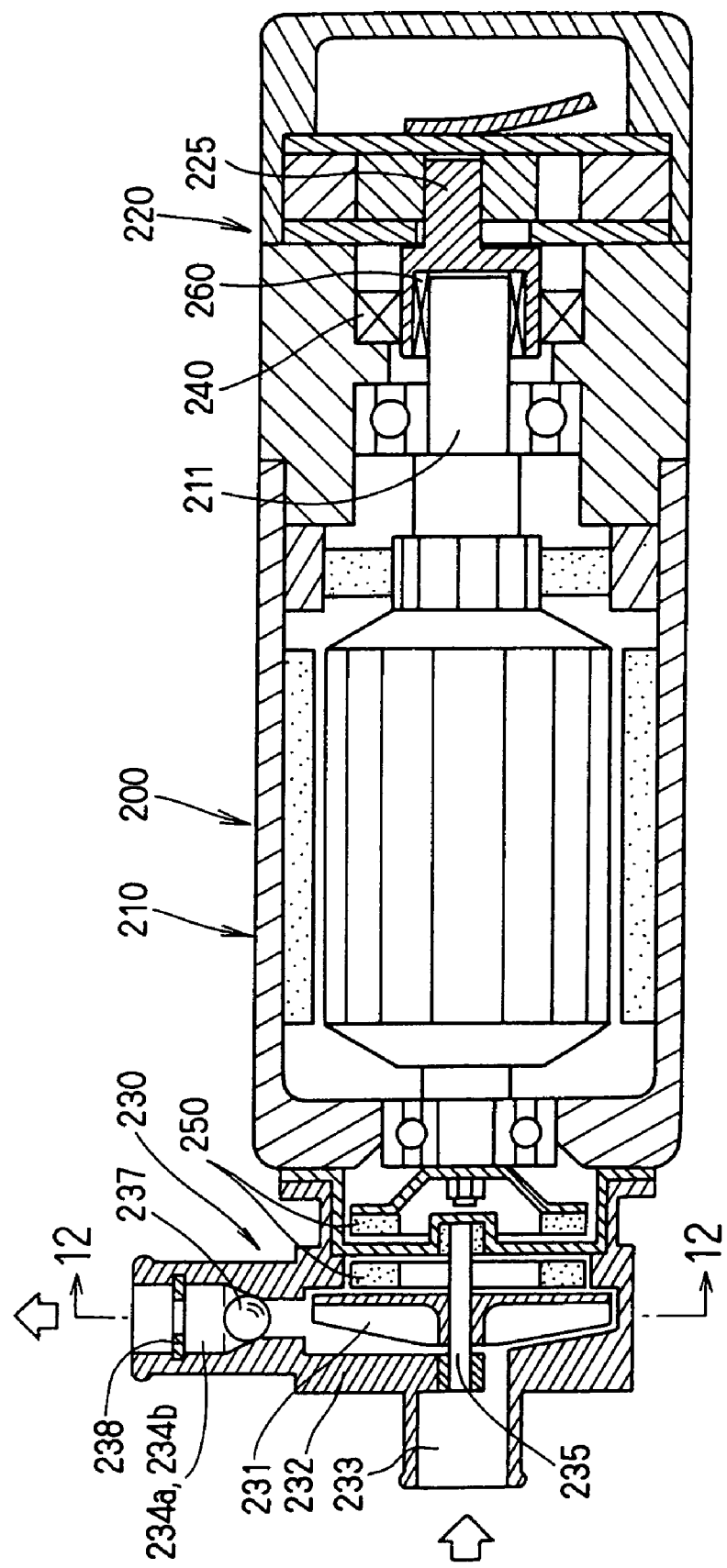
FIG. 11 is a cross-sectional view of an electric compressor-pump according to a fourth embodiment of the present invention.
Figure 12:
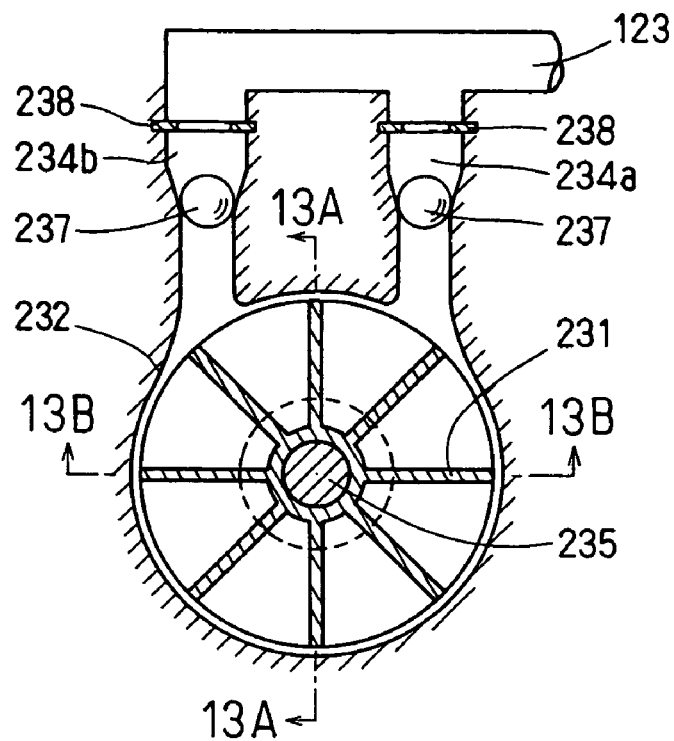
FIG. 12 is a cross-sectional view taken along the line 12-12 of FIG. 11.
Figure 13A:
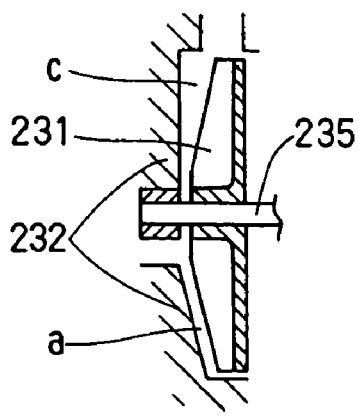
FIG. 13A is a cross-sectional view taken along the line 13A-13A of FIG. 12.
Figure 13B:
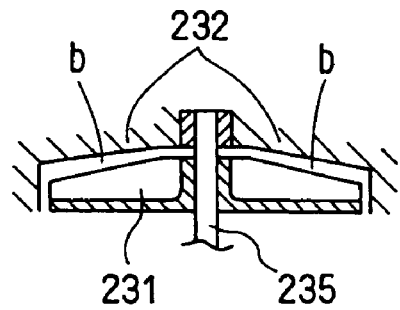
FIG. 13B is a cross-sectional view taken along the line 13B-13B of FIG. 12.

First, as shown in FIGS. 11 and 12, the pump unit 230 of the electric compressor-pump 200 is configured to perform the normal ejecting operation when the motor 210 is rotating in each of the forward and rearward directions. Specifically, the pump housing 232 is formed with two outlets 234a and 234b. A contra-flow preventing ball 237 and a stopper 238 having a hole for stopping the movement of the ball 237 in the direction in which the cooling water flows and allowing the passage of the cooling water are located in each of the outlets 234a and 234b. In the pump housing 232, the radial clearance between the housing 232 and the impeller 231 is circumferentially uniform, while the axial clearance between the housing and the impeller 231 gradually increases in a direction from the counter-outlet side toward the outlet side as shown by a, b, and c in FIGS. 13A and 13B, so that the cooling water flows more smoothly from the counter-outlet side toward the outlet side.

When the motor 210 is rotating in the forward direction, as shown in FIG. 14A, the ball 237 shown on the right-hand portion of the drawing is pressed toward the stopper 238 under positive pressure (ejection pressure) of the flowing cooling water, while the ball 237 on the left-hand portion of the drawing is attracted toward the impeller 231 under negative pressure indicated by the broken line to block the outlet 234b, so that the cooling water is ejected from the outlet 234a. When the motor 210 is rotating in the rearward direction, the direction in which the cooling water flows is reversed so that the cooling water is ejected from the outlet 234b. Thus, the pump unit 230 is configured to perform the normal pumping operation when the motor 210 is rotating in each of the forward and rearward directions. Alternatively, the outlet 234 of the pump housing 232 may also be composed of one outlet 234 extending radially from the center of the impeller 231, allowing a reduction in pump efficiency without providing the balls 237 and the stoppers 238.

On the other hand, the unidirectional clutch 260 is located between the motor 210 and the compression unit 220 (shown herein as a rolling piston compression unit), similarly to the first embodiment, so that the compression unit 220 performs the normal compressing operation when the motor 210 is rotating only in the forward direction (the compression unit 220 is in the non-operating state when the motor 210 is rotating in the rearward direction). The shaft sealing unit 240 for preventing the leakage of the refrigerant is provided at a position closer to the compression unit 220, specifically on the eccentric shaft 225 of the compression unit 220.

The operation of the electric compressor-pump 200 is controlled based on the flow chart shown in FIG. 15. The flow chart shown in FIG. 15 is basically the same as that (FIG. 4) described in the first embodiment except that step S31 is provided in place of step S30 and step 61 is provided in place of step S60. Specifically, conditions for determination when each of the cooling unit 110 and the heating unit 120 is operating are added in step S31. If each of the cooling and heating units 110 and 120 is operating, the motor 210 is controlled to rotate in the forward direction in step S61 such that each of the compression unit 220 and the pump unit 230 performs the normal operation.

By changing the direction of rotation of the motor 210, the compression unit 220 and the pump unit 230 can be used selectively for each of the cooling and heating operations. When each of the cooling unit 110 and the heating unit 120 is operating, the motor 210 is controlled to operate in the forward direction, thereby allowing each of the compression unit 220 and the pump unit 230 to operate. What results is an air-conditioning system capable of performing a dehumidifying heating operation.

Since the shaft sealing unit 240 is provided at the position closer to the compressor unit 220 (on the eccentric shaft 225) in the structure having the unidirectional clutch 260 provided between the compressor unit 220 and the motor 210, the unidirectional clutch 260 is disconnected to bring the compression unit 220 into the non-operating state. When the pump unit 230 is to be operated, the motor 210 is not subjected to the sliding resistance of the shaft sealing unit 240, so that power consumed by the motor 210 is reduced.

Other Variations

Although, in each of the first to fourth embodiments, the operations of the compression unit 220 and the pump unit 230 are used selectively by controlling the direction of rotation of the motor 210, it is also possible to selectively use the operations of the compression unit 220 and the pump unit 230 by providing respective clutch mechanisms between the compression unit 220 and the motor 210 and between the pump unit 230 and the motor 210 and intermittently controlling the clutch mechanisms by using the control unit 130. In this variation, the motor 210 need not rotate in two directions; one direction is sufficient.

This ensures selective use of the compression unit 220 and the pump unit 230. It is also possible to simultaneously operate the compression unit 220 and the pump unit 230 when each of the cooling unit 110 and the heating unit 120 is operating. The result is an air-conditioning system capable of performing a dehumidifying heating operation.

Each of the compression unit 220 and the pump unit 230 may be provided at the same end of the rotating shaft 211 of the motor 210.

Fifth Embodiment

FIGS. 16-18E show a fifth embodiment of the present invention.

Figure 16:
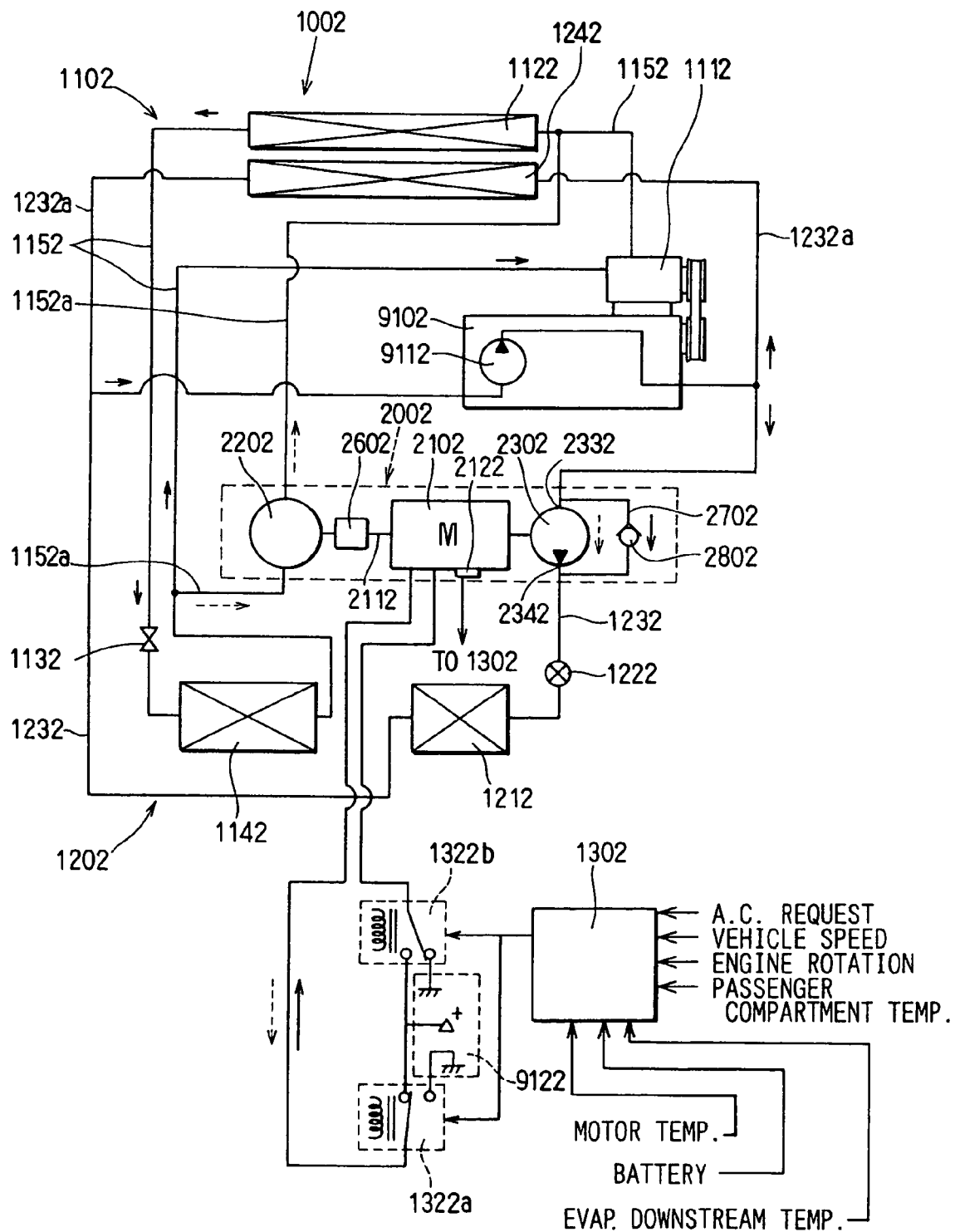
FIG. 16 is a schematic diagram showing the overall configuration of a fifth embodiment of the present invention.
Figure 17:
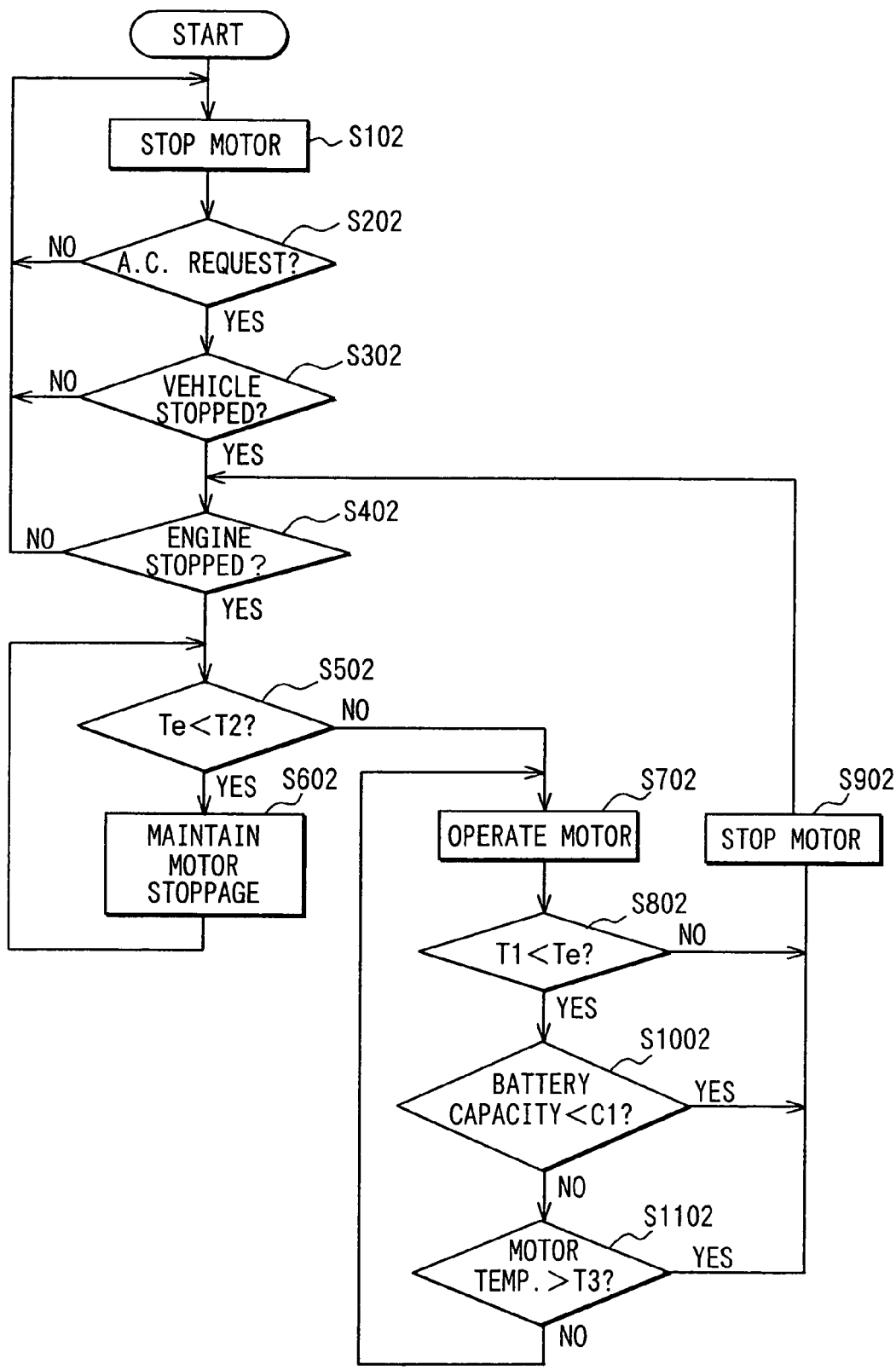
FIG. 17 is a flowchart showing the operation control of the electric compressor-pump in FIG. 16.

With reference to FIG. 16, a vehicle air-conditioning system 1002 is used in a so-called idle-stop vehicle, which has an engine 9102 that is stopped when the vehicle comes to a temporary halt. The vehicle air-conditioning system 1002 includes a cooling unit 1102, a heating unit 1202, an electric compressor-pump 2002, and a control unit 130.

The cooling unit 1102 performs a known refrigeration cycle. The cooling unit 1102 includes a compressor 1112, a condenser 1122, an expansion valve 1132, and an evaporator 1142 connected in series by refrigerant piping 1152. The first compressor 1112 compresses a refrigerant in the refrigeration cycle to high temperature and high pressure. The condenser 1122 condenses and liquefies the compressed refrigerant. The expansion valve 1132 expands the liquefied refrigerant adiabatically. The evaporator 1142 evaporates the expanded refrigerant so that air passing through the evaporator 1142 is cooled by the latent heat of vaporization.

The first compressor 1112 is powered by the engine 9102 via pulleys and a pulley belt.

The heating unit 1202 is well-known and includes a mechanical pump 9112 and a heater 1212, which are connected by cooling water piping 1232. The mechanical pump 9112 is arranged in the engine 9102. The heater 1212 heats air and employs the engine cooling water as a heat source. The heater 1212 is provided with an upstream water valve 1222 for adjusting the flow rate of the cooling water.

The mechanical pump 9112 is powered by the engine 9102 and circulates the cooling water through the heater 1212.

Note that a radiator 1242 is arranged on cooling water piping 1232a so that the cooling water of the engine 9102 is cooled, for temperature control.

The electric compressor-pump 2002 includes a motor 2102, a second compressor 2202, and a pump unit 2302. The motor 2102 has a rotating shaft 2112, on both ends of which the second compressor 2202 and the pump unit 2302 are integrally arranged, respectively. A unidirectional clutch 2602 is located between the motor 2102 and the second compressor 2202.

The motor 2102 is a well-known known direct current motor that is powered with a battery 9122. The operation of the motor 2102 is controlled by the control unit 1302, which is described later. The motor 2102 and the battery 9122 are connected to each other with two relays 1322a and 1322b located between them, so that the control circuit 1302 can exercise ON/OFF control and unidirectional (hereinafter, referred to as forward) or reverse rotation control over the motor 2102, the details of which will be given later.

The motor 2102 also has a motor temperature sensor 2122 arranged on a predetermined portion thereof, e.g., on the outside of the motor housing. The motor temperature sensor 2122 detects changes in the temperature of the motor 2102 during operation and produces a signal accordingly. The temperature signal is input to the control unit 1302.

The second compressor 2202 compresses and discharges the refrigerant when forward torque is transmitted from the motor 2102 through the unidirectional clutch 2602. Reverse-rotating torque from the motor 2102 is not transmitted by the clutch 2602, which renders the second compressor 2202 non-operational.

The pump unit 2302 is arranged on the other end of the rotating shaft 2112 of the motor 2102. The pump unit 2302 includes a pump housing, which has a cooling water inlet 2332 and outlet 2342, and an unillustrated centrifugal impeller. The impeller is directly connected to the rotating shaft 2112 of the motor 2102, and the impeller is rotated by torque transmitted from the motor 2102.

The blades of the impeller and the pump housing are configured so that the impeller discharges the cooling water (hereinafter, referred to as a normal discharging operation) while rotating opposite to the forward direction, in which the unidirectional clutch 2602 causes the second compressor 2202 to perform the normal compressing operation. In forward rotation, the impeller rotates in an idle mode (hereinafter, referred to as non-operation) due to the configuration of its blades and the pump housing.

The motor 2102, second compressor 2202, and pump unit 2302 are all accommodated in a housing to constitute the integral electric compressor-pump 2002.

The second compressor 2202 of the electric compressor-pump 2002 is connected in the cooling unit 1102 in a manner parallel with the first compressor 1112 with refrigerant piping 1152a. Specifically, the second compressor 2202 is located between the upstream side of the condenser 1122 and the downstream side of the evaporator 1142.

The pump unit 2302 is arranged in the heating unit 1202 to be in series with the mechanical pump 9112. Specifically, the pump unit 2302 is located between the mechanical pump 9112 and the water valve 1222.

Note that the cooling water piping 1232 has a bypass channel 2702, through which the cooling water from the mechanical pump 9112 bypasses the pump unit 2302 when the motor 2102 and the pump unit 2302 are not in operation. A check valve 2802 is arranged on the bypass channel 2702 to avoid a short circuit between the outlet 2342 and the inlet 2332 during the normal discharging operation of the pump unit 2302.

Now, description will be given of the control unit 1302 which is an essential part of the present invention.

The control unit 1302 is intended to control the operation of the motor 2102 in the electric compressor-pump 2002 described above. The control unit 1302 turns the motor 2102 on and off and controls the direction of rotation of the motor 2102 based on signals from various sensors which are not shown. The signals indicate vehicle speed, engine speed, the evaporator downstream temperature Te, the passenger compartment temperature Tr, the motor temperature Tm, the battery capacity C, and an A.C. request signal.

Specifically, the motor 2102 is driven or stopped depending on the signals, i.e., the A.C. request signal, an air-conditioning state signal (the evaporator downstream temperature Te and the passenger compartment temperature Tr), a battery capacity C signal, and a motor temperature Tm signal when the vehicle speed signal is zero (vehicle is halted) and the engine speed signal is zero (engine is stopped).

The A.C. request signal is for activating either the cooling unit 1102 or the heating unit 1202. When cooling is requested, the relay 1322a is closed and the relay 1322b is opened so that a current flows in the direction of the solid-lined arrow. This rotates the motor 2102 in the forward direction, thereby putting the second compressor 2202 in the normal compressing operation (here, the pump unit 2302 is not in operation). When heating is requested, the relay 1322a is opened and the relay 1322b is closed so that a current flows in the direction of the broken-lined arrow. This rotates the motor 2102 in the reverse direction, thereby putting the pump unit 2302 in the normal discharging operation (here, the second compressor 2202 is not in operation). To stop the motor 2102, the relays 1322a and 1322b are both opened.

In cooling, the air-conditioning state signal is represented by the characteristics of the evaporator downstream temperature Te. The predetermined range shall cover the temperatures between a minimum allowable temperature T1 and a maximum allowable temperature T2 (T1<T2) established in advance. In heating, the air-conditioning state signal is represented by the characteristic of the passenger compartment temperature Tr. The predetermined range shall cover the temperatures between a temperature T10 and a temperature T20 (T10<T20) established in advance.

Then, in cooling, the motor 2102 is activated in the forward direction when the evaporator downstream temperature Te exceeds the maximum allowable temperature T2 of the predetermined range. The motor 2102 is stopped when the temperature Te falls below the minimum allowable temperature T1 of the predetermined range. Similarly, in heating, the motor 2102 is activated in the reverse direction when the passenger compartment temperature Tr falls below the minimum temperature T10 of the predetermined range. The motor 2102 is stopped when the temperature Tr exceeds the maximum temperature T20 of the predetermined range.

With regard to the battery capacity C signal to be input from the battery 9122, the minimum capacity required to restart the engine 10 after a stoppage is determined in advance as a predetermined capacity C1. The motor 2102 is stopped when the battery capacity C falls below the predetermined capacity C1.

With regard to the motor temperature Tm signal, a predetermined temperature (first predetermined temperature) T3 at a representative location (here, the external housing as mentioned above) during operation is determined in advance in consideration of the life of the motor 2102. When the predetermined temperature T3 is exceeded, the motor 2102 is stopped.

Having described the configuration, description will now be given of the operation of the present embodiment.

When the vehicle is moving, i.e., the engine 9102 is running, the cooling unit 1102 and the heating unit 1202 operate in a well known manner. More specifically, in the cooling unit 1102, the first compressor 1112 is driven by the engine 9102 to compress refrigerant. The compressed refrigerant is subsequently passed through the condenser 1122, the expansion valve 1132, and the evaporator 1142 for condensation, adiabatic expansion, and evaporation in succession, to cool the air passing through the evaporator 1142 by the latent heat of vaporization.

In the heating unit 1202, the mechanical pump 9112 is driven by the engine 9102. The water valve 1222 is opened to circulate the cooling water through the heater 1212 (in the pump unit 2302, water passes through the bypass channel 2702). With the cooling water as the heat source, the air passing through the heater 1212 is heated.

Nevertheless, since the air-conditioning system is employed in an idle-stop vehicle, the engine 9102 is stopped when the vehicle comes to a temporary halt. The first compressor 1112 and the mechanical pump 9112 are powered by the engine 9102 and thus quit operating. The electric compressor-pump 2002 is activated at this time.

The electric compressor-pump 2002 is controlled by the control unit 1302 as mentioned above. Hereinafter, the control procedure will be detailed with reference to a flowchart shown in FIG. 17.

For the sake of simplicity, the following description will deal with the case where the A.C. request signal for cooling is given. That is, to drive the motor 2102, the relay 1322a is closed and the relay 1322b is opened. It follows that a current flows in the direction of the solid-lined arrow in FIG. 16 to rotate the motor 2102 in the forward direction, thereby putting the second compressor 2202 into the normal compressing operation through the unidirectional clutch 2602 (at this time, the pump unit 2302 becomes non-operational).

Initially, at step S102, the motor 2102 is stopped. At step S202, the presence or absence of a request for A.C. (cooling) is determined from the A.C. request signal. If none, the process returns to step S102 so that the motor 2102 remains stopped. If there is a request for cooling, the process moves to step S302 to determine from the vehicle speed signal whether the vehicle is halted or not. If the vehicle is halted, the process moves to step S402 to determine from the engine speed signal whether the engine 9102 is stopped or not. Incidentally, in the case of a negative result at step S302, the process returns to step S102.

If it is determined at step S402 that the engine 9102 is stopped, the process moves to step S502 to determine whether or not the air-conditioning state is within the predetermined range. More specifically, it is determined whether or not the evaporator downstream temperature Te falls within the predetermined temperatures T1 to T2 as mentioned above.

If the evaporator downstream temperature Te is determined to fall within the predetermined temperatures T1 to T2, the motor 2102 is maintained in the initial stopped state at step S602. The process is then repeated from step S502.

In other words, the motor 2102 is not operated because the temperature of the air originally cooled by the first compressor 1112 (evaporator downstream temperature Te) when the engine 9102 was operating can be maintained within the predetermined temperature range (T1-T2) without activating the second compressor 2202 immediately after the stoppage of the engine.

Subsequently, if the result is negative at step S502, or equivalently, if the evaporator downstream temperature Te has increased gradually to exceed the predetermined range T1-T2, or the maximum allowable temperature T2 in this case, the process moves to step S702. The motor 2102 is activated so that the second compressor 2202 performs the normal compressing operation.

Then, at step S802, whether or not the evaporator downstream temperature Te falls below the predetermined range is determined again. If the result is negative, the process moves to step S902 to stoppage the motor 2102. That is, after the motor 2102 is activated at step S702, the evaporator downstream temperature Te decreases toward the minimum allowable temperature T1 by the action of the second compressor 2202. Consequently, falling below the minimum allowable temperature T1 is considered to indicate excessive cooling, and the motor 2102 is thus stopped to conserve power. Then, the process returns to step S402.

On the other hand, if it is determined at step S802 that the evaporator downstream temperature Te falls within the range of T1-T2 (in the process of falling from T2 to T1), the process moves to step S1002. Here, whether or not the battery capacity C is below the predetermined capacity C1 is determined. If the result is negative, the process moves to step S1102 to determine whether or not the motor temperature Tm exceeds the predetermined temperature T3. If the result is negative, the process returns to step S702 to keep the motor 2102 operating.

On the contrary, if the battery capacity C falls below the predetermined capacity C1 at step S1020 or if the motor temperature Tm exceeds the predetermined temperature T3 at step S1102, the motor 2102 is stopped at step S902 for the sake of battery capacity and motor life, respectively.

If the engine 9102 is running at step S402, the process returns to step S102 so that the motor 2102 is stopped.

For heating control of the motor 2102, the following modifications are made to the control flow described above. That is, the passenger compartment temperature Tr is used as the air-conditioning state. The predetermined range is replaced with the temperature range T10-T20. If the passenger compartment temperature Tr falls below the minimum temperature T10 at step S502, the motor 2102 is driven in the reverse direction at step S702. If the passenger compartment temperature Tr exceeds the maximum temperature T20 at step S802, the motor 2102 is stopped at step S902.

Having described the configuration and operation, description will now be given of the effects of the present embodiment.

Unlike the prior art, the motor 2102 is neither activated concurrently with the stoppage of the engine 9102 nor kept operated. Instead, as described above, the control flow is provided with the determination flow of steps S502 and S802 for motor activation and motor stoppage. The motor 2102 is thus activated just as much as needed to maintain the air-conditioning state within the predetermined range (T1-T2) as shown in timing charts of FIGS. 18A-18E. Consequently, the air-conditioning performance can be ensured while the operating time of the motor 2102 is reduced to prevent overtaxing the battery 9122 and wear on the motor 2102.

Since the control flow includes the determination flow of step S502, the air-conditioning state at the start of the engine 9102 can be maintained within the predetermined range (T1-T2) immediately after the stoppage of the engine 9102. This eliminates the need for the operation of the motor 2102, which reduces the operating time of the motor 2102.

With regard to the air-conditioning state, the predetermined range (T1-T2 or T10-T20) is judged based on the air temperature at a predetermined location (here, the evaporator downstream temperature Te or the passenger compartment temperature Tr). Consequently, temperature signals typically used in controlling an air-conditioning system can be utilized as is, without modification, which facilitates the control of the motor 2102.

Moreover, even after the motor 2102 is driven, the motor 2102 can be stopped when the battery capacity C falls below the predetermined capacity C1 or the motor temperature Tm at a predetermined portion of the motor 2102 exceeds the predetermined temperature T3. It is therefore possible to reliably prevent overtaxing the battery 9122 and a wear on the motor 2102.

Sixth Embodiment

FIG. 19 shows a sixth embodiment of the present invention. The sixth embodiment differs from the fifth embodiment in that step S1102 of the control flow is changed to step S1112.

Here, instead of the motor temperature sensor 2122 arranged on the motor 2102, the control unit 1302 is provided with a timer function for keeping the operating time tm of the motor 2102. For a predetermined time period (first predetermined time period) t1, the maximum operating time per activation is previously calculated from the operating life of the motor 2102. When the operating time tm of the motor 2102 exceeds the predetermined time t1, the motor 2102 is stopped at step S902. This provides the same effects as in the fifth embodiment.

Seventh Embodiment

Figure 20:
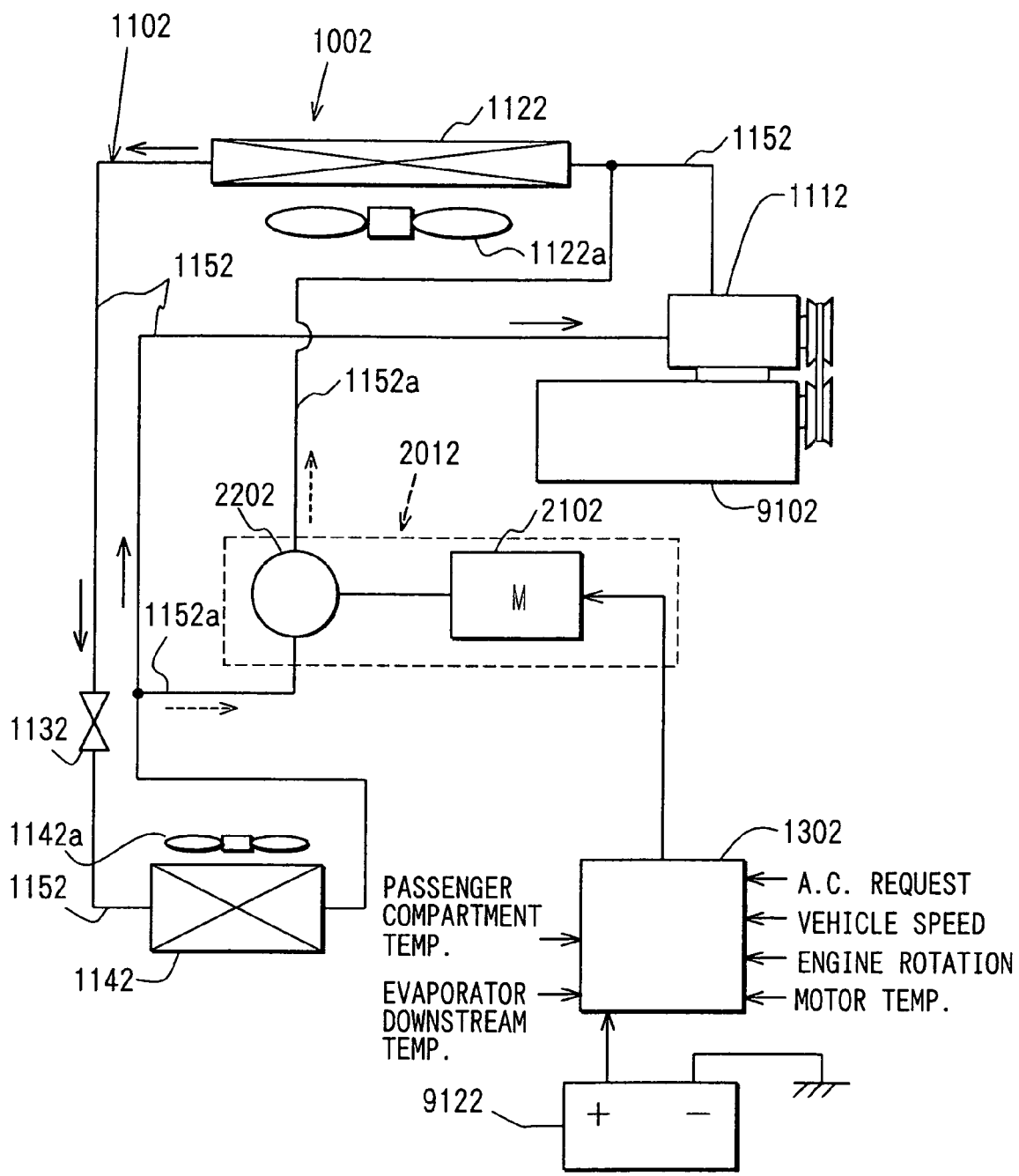
FIG. 20 is a schematic diagram showing the overall configuration of a seventh embodiment.

FIGS. 20-22E show a seventh embodiment of the present invention. The seventh embodiment is based chiefly on the cooling unit 1102. Before the stoppage of the engine 9102, the temperature of the evaporator 1142 is reduced in a temperature down mode, so that the evaporator 1142, when the engine 9102 is stopped, performs cooling while less power is consumed by the motor 2102. In FIG. 20, as compared to the fifth embodiment, the heating unit 1202 is omitted and the electric compressor-pump 2002 is replaced with an electric compressor 2012.

FIG. 20 shows the overall configuration of the vehicle air-conditioning system 1002, in which a fan 1142a for sending air to the evaporator 1142 is provided. The air flow rate of the fan 1142a can be adjusted by the control unit 1302.

The control unit 1302 also has an engine stoppage predicting function for predicting whether the engine 9102 will stop while the vehicle is moving. Specifically, this function is based on the vehicle speed signal during deceleration. The engine 9102 is predicted (determined) to come to a stop when the vehicle speed signal falls below a predetermined vehicle speed V1, which is established in advance. If the stoppage of the engine 9102 is predicted, the flow rate of the fan 1142a is reduced in comparison to the time immediately before the prediction.

Figure 21:
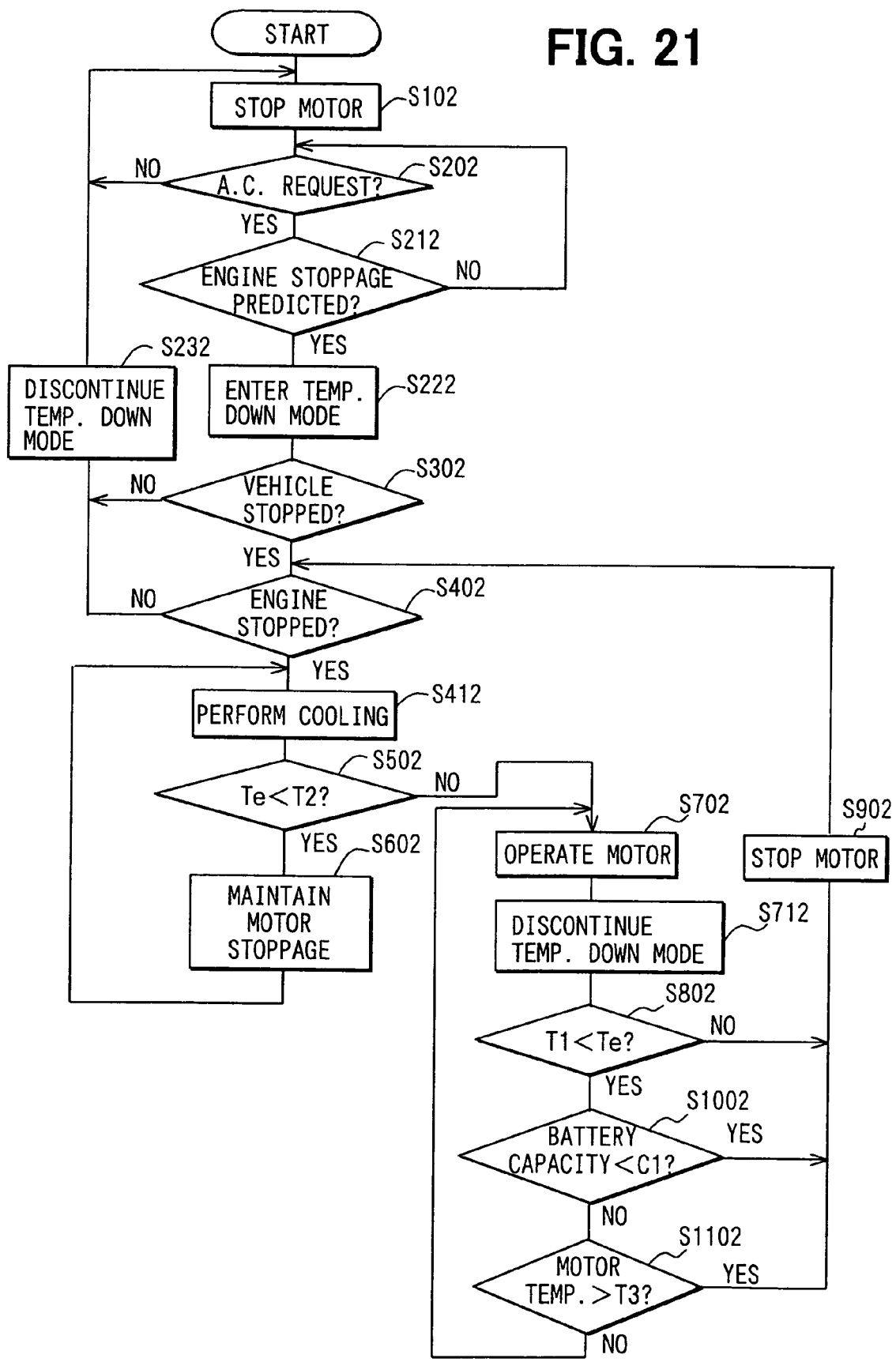
FIG. 21 is a flowchart showing the control procedure of the electric compressor of FIG. 20.

Now, the control performed by the control unit 1302 over the fan 1142a and the motor 2102 will be described with reference to a flowchart shown in FIG. 21 and timing charts shown in FIGS. 22A-22E. The flowchart shown in FIG. 21 is that of the fifth embodiment shown in FIG. 17 to which steps S212-S232, S412, and S712 are added. Hereinafter, description will be given with particular emphasis on these additional steps.

Figure 22A:
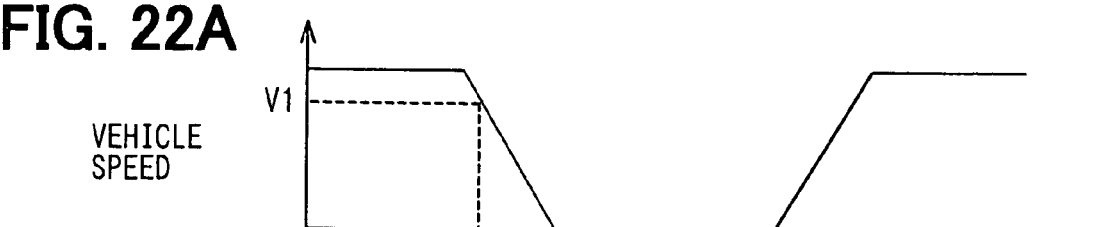
FIGS. 22A-22E are timing charts for showing a vehicle speed, an evaporator air flow rate, the evaporator downstream temperature Te, the amount of the refrigerant in the condenser, and the operation of the motor during the control procedure of the seventh embodiment, respectively.
Figure 22B:
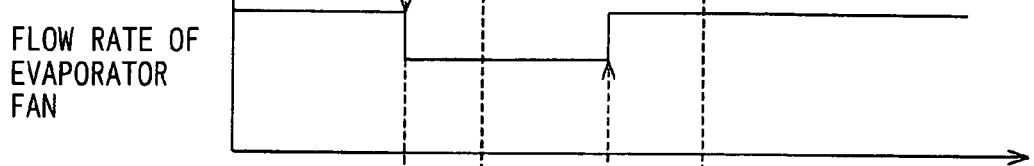
Figure 22C:
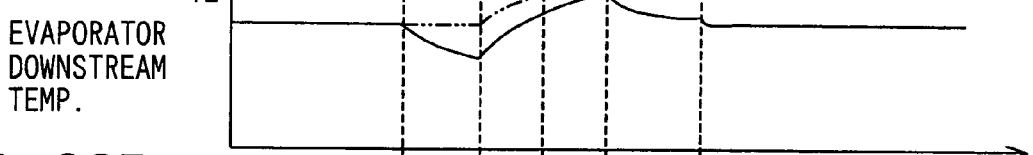
Figure 22D:

Initially, the presence of an A.C. request is determined at step S202. If the stoppage of the engine 9102 is predicted at step S212 from the vehicle speed signal of the vehicle moving under deceleration, the process moves to step S222 to enter the temperature down mode. That is, the flow rate of the fan 1142a is reduced in comparison to the time immediately before the prediction (FIG. 22B). As the air flow rate is reduced, the thermal load on the evaporator 1142 decreases. As a result, the temperature of the evaporator 1142, or equivalently, the evaporator downstream temperature Te of the air cooled by the evaporator 1142, drops further (FIG. 22C). Then, the amount of evaporation of the refrigerant in the evaporator 1142 decreases with the decreasing thermal load. Accordingly, the refrigerant is accumulated in the condenser 1122 and the level of liquid refrigerant increases due to the condensation (FIG. 22D). Here, since the evaporator downstream temperature Te drops according to the reduction in the air flow rate of the fan 1142a, the level of cooling experienced by the occupants is maintained.

After the engine 9102 is stopped, cooling is effected at step S412 by means of the air from the lower temperature evaporator 1142. At steps S502 and S602, the cooling is continued with the motor 2102 stopped, until the evaporator downstream temperature Te reaches the maximum allowable temperature T2.

Figure 22E:
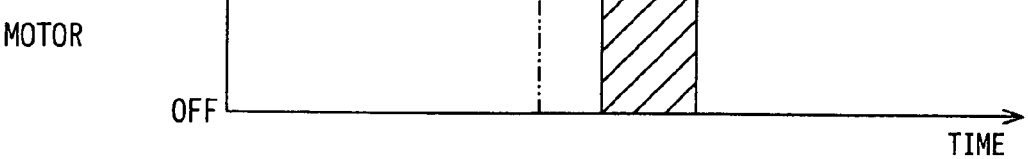

When the evaporator downstream temperature Te exceeds the maximum allowable temperature T2 at step S502 and the motor 2102 is activated at step S702 (FIG. 22E), the temperature down mode of step S222 is discontinued at step S712. That is, the air flow rate of the fan 1142a is restored to the level immediately before the prediction of stoppage of the engine 9102 (FIG. 22B). Additionally, the liquid refrigerant accumulated in the condenser 1122 and the refrigerant compressed by the operation of the motor 2102 (the operation of the second compressor 2202) are used for air cooling (FIGS. 22C, 22D, and 22E).

If the result is negative at either of steps S302 and S402, i.e., if the vehicle is not halted and the engine 9102 is not stopped, the temperature down mode of step S222 is discontinued at step S232.

As a result, the time that elapses before the evaporator downstream temperature Te reaches the maximum allowable temperature T2 of the predetermined range (T1-T2) can be extended, with a further reduction in the operating time of the motor 2102. Specifically, the time can be extended by Δt as compared to the case where the temperature down mode is not employed as shown by the double-dashed line in FIG. 22C. The operating time of the motor 2102 can thus be made shorter than shown by the dotted and dashed line in FIG. 22E.

Additionally, the reduced thermal load decreases the amount of evaporation of the refrigerant, so that a greater amount of liquid refrigerant can be accumulated in the condenser 1122. When the motor 2102 is operated, the liquid refrigerant accumulated can be used to reduce the work of the motor 2102. Consequently, aside from the effect that the stop time of the motor 2102 is extended by the cooling from the cooler evaporator 1142, the load reducing effect during the operation of the motor 2102 allows a further reduction in the power consumption of the motor 2102. It is therefore possible to avoid overtaxing the battery 9122 and to reduce wear on the motor 2102.

Eighth Embodiment

FIGS. 20, 21, and 23A-23F show an eighth embodiment of the present invention. The eighth embodiment is a modified variation of the seventh embodiment, in which the temperature down mode of the evaporator 1142 includes a valve opening control of the expansion valve 1132 aside from the air flow rate control of the fan 1142a.

Figure 23A:
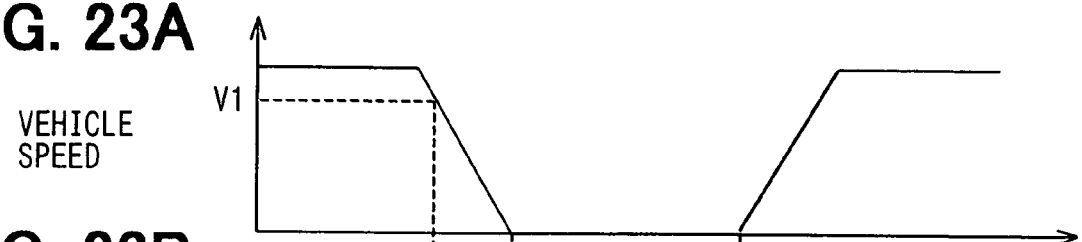
FIGS. 23A-23F are timing charts for showing the vehicle speed, the evaporator air flow rate, a valve opening degree, the evaporator downstream temperature Te, the amount of the refrigerant in the condenser, and the operation of the motor during the control procedure according to an eighth embodiment, respectively.
Figure 23B:
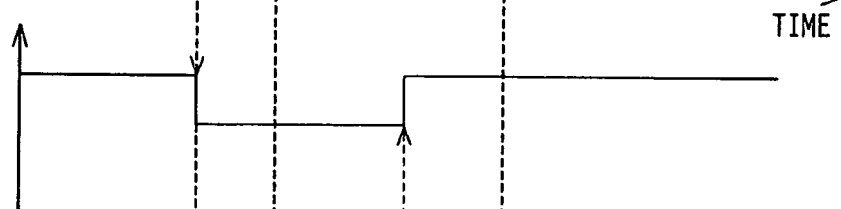
Figure 23C:
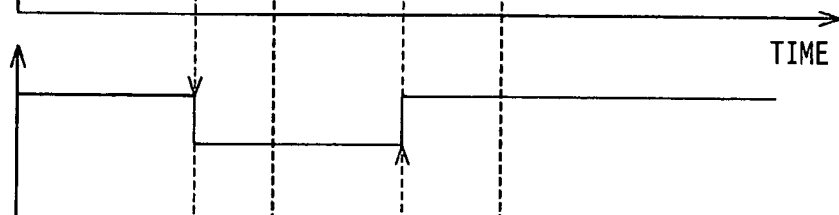
Figure 23D:
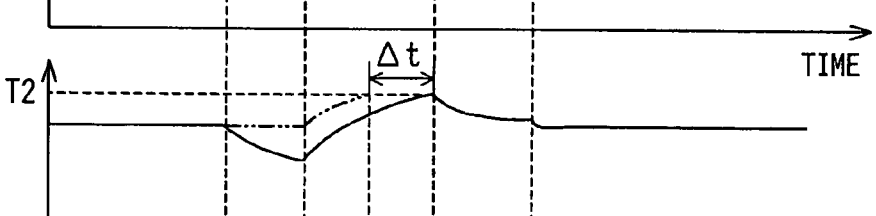
Figure 23E:
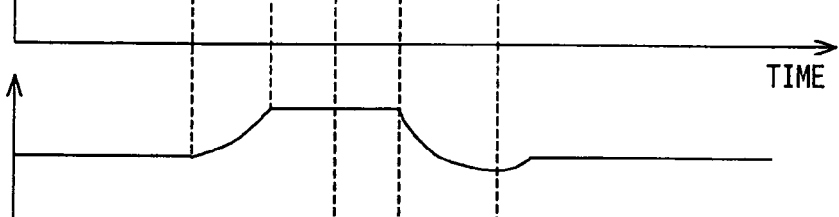
Figure 23F:
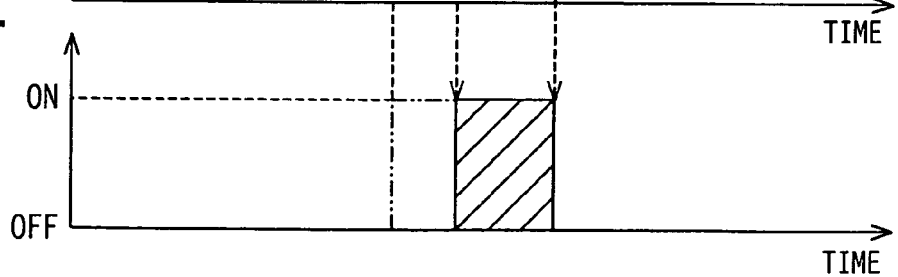

The expansion valve 1132 in FIG. 20 is a solenoid valve that can be adjusted in valve opening by the control unit 1302. If the stoppage of the engine 9102 is predicted, the process moves to step S222 of FIG. 21 to enter the temperature down mode. Here, the air flow rate of the fan 1142a is reduced to lower the evaporator downstream temperature Te as in the seventh embodiment (FIGS. 22B and 22D). At the same time, the valve opening is reduced (FIG. 22C) so that the refrigerant flows to the evaporator 1142 at a flow rate smaller than immediately before the prediction of stoppage of the engine 9102. Incidentally, when the motor 2102 is operated, the temperature down mode is discontinued at step S712 so that the air flow rate and the valve opening are restored to the respective values immediately before the prediction of stoppage of the engine 9102 (FIGS. 23B and 23C).

Consequently, the amount of evaporation of the refrigerant in the evaporator 1142 decreases, and a greater amount of liquid refrigerant can be accumulated to the condenser 1122 (FIG. 23E) than in the seventh embodiment. This allows a further reduction in the power consumption during the operation of the motor 2102. Note that while the condenser 1122 accumulates a greater amount of liquid refrigerant, the flow rate of the refrigerant to the evaporator 1142 decreases, which decreases the temperature drop in the evaporator downstream temperature Te. It is thus desirable to determine the size, or degree, of the valve opening to balance these considerations.

Ninth Embodiment

FIGS. 20, 21, and 24A-24D show a ninth embodiment of the present invention. The ninth embodiment is a second variation of the seventh embodiment, in which the temperature down mode of the evaporator 1142 includes control of the air flow rate of a cooling fan 1122a of the condenser 1122.

As shown in FIG. 20, the condenser 1122 has the cooling fan 1122a for promoting condensation/liquefaction. The cooling fan 1122a is adjusted in the cooling air flow rate by the control unit 1302.

Figure 24A:
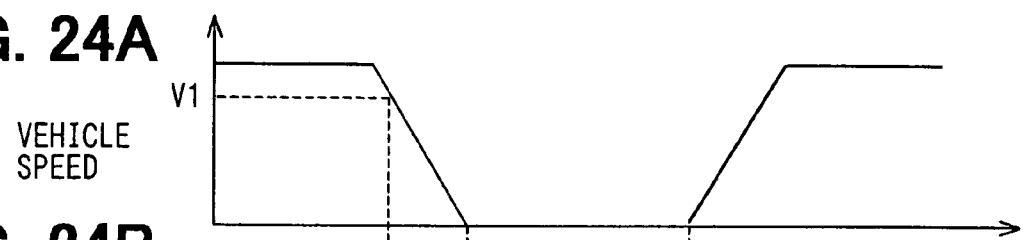
FIGS. 24A-24D are timing charts for showing the vehicle speed, a condenser air flow rate, the evaporator downstream temperature Te, and the operation of the motor during the control procedure according to a ninth embodiment, respectively.
Figure 24B:
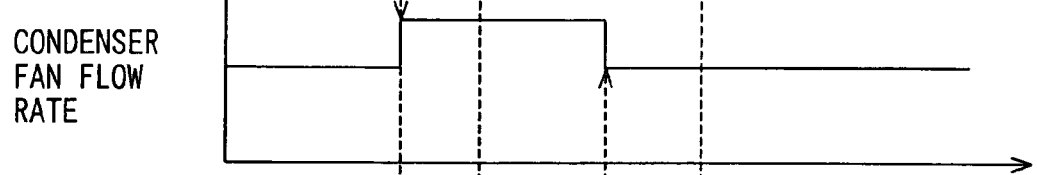

In FIG. 21, if the control unit 1302 predicts the stoppage of the engine 9102 at step 21, the process moves to step S222 to enter the temperature down mode. Here, the flow rate of the cooling fan 1122a is increased in comparison to the time immediately before the prediction of stoppage of the engine 9102 (FIG. 24B). When the motor 2102 is operated, the temperature down mode is discontinued at step S712 so that the cooling air flow rate is restored to the level that existed immediately before the prediction of stoppage of the engine 9102 (FIG. 24B).

Figure 24C:
Figure 24D:
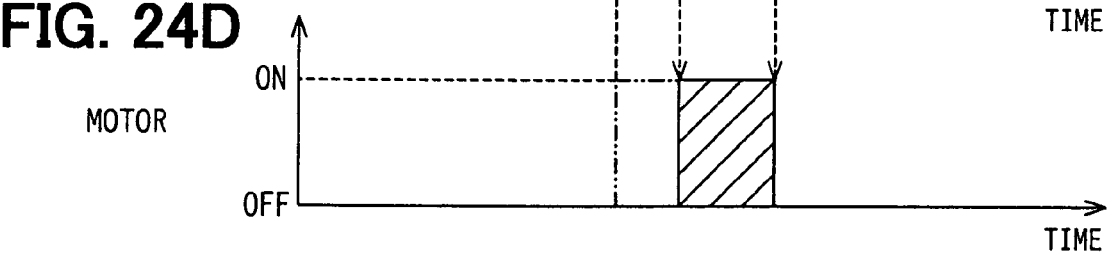

Consequently, the condensation in the condenser 1122 is promoted, which lowers the discharge-side pressure of the first compressor 1112. This increases the enthalpy difference across the evaporator 1142, which improves the cooling performance and lowers the evaporator downstream temperature Te (FIG. 24C). As a result, the stop time of the motor 2102 at step S602 after the stop of the engine 9102 is extended, which reduces the power consumption of the motor 2102.

Tenth Embodiment

FIGS. 20, 21, and 25A-25D show a tenth embodiment of the present invention. The tenth embodiment is a modified variation of the seventh embodiment, in which the temperature down mode of the evaporator 1142 includes control of the discharge of the condenser 1112.

Figure 25A:
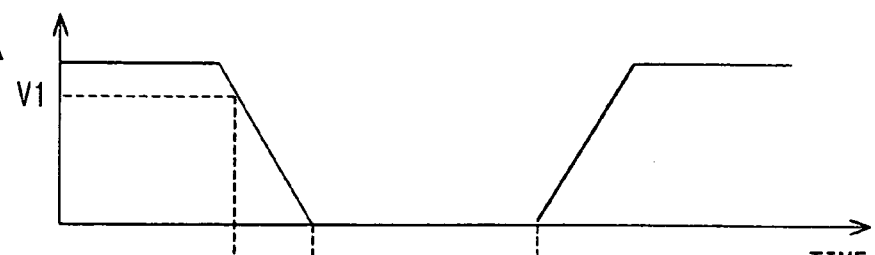
FIGS. 25A-25D are timing charts for showing the vehicle speed, a displacement, the evaporator downstream temperature Te, and the operation of the motor during the control procedure of a variable displacement type compressor according to a tenth embodiment, respectively.
Figure 25B:

The first compressor 1112 employed here is of variable displacement type (for example, a known swash plate type variable displacement compressor) the displacement per rotation of which can be adjusted by the control unit 1302 as the thermal load on the cooling unit 1102 increases. In FIG. 21, if the stoppage of the engine 9102 is predicted at step 21, the process moves to step S222 to enter the temperature down mode. Here, the displacement is increased, considering that the thermal load at this time has a higher value (FIG. 25B).

Figure 25C:
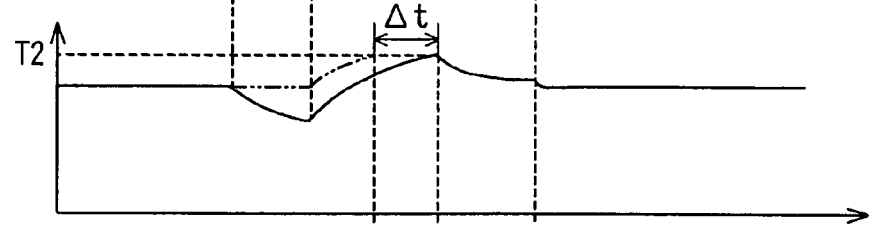
Figure 25D:
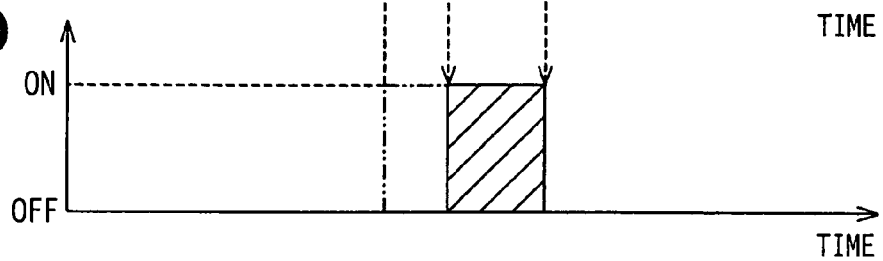

As a result, the increased displacement improves the cooling performance and lowers the evaporator downstream temperature Te (FIG. 25C). The stop time of the motor 2102 after the stoppage of the engine 9102 can thus be extended, which reduces the power consumption of the motor 2102.

Figure 26A:
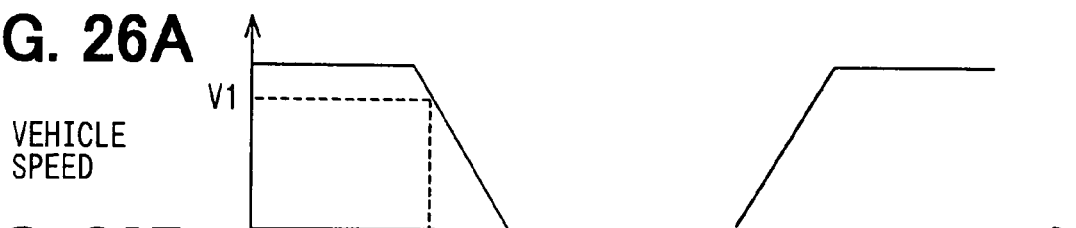
FIGS. 26A-26D are timing charts for showing the vehicle speed, the displacement, the evaporator downstream temperature Te, and the operation of the motor during the control procedure of an ON/OFF control type compressor according to the tenth embodiment, respectively.
Figure 26B:
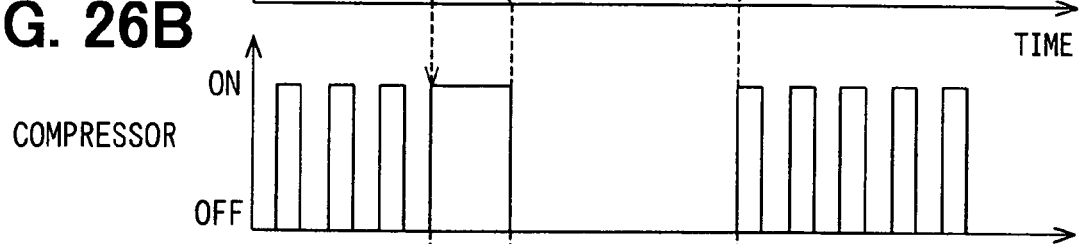
Figure 26C:
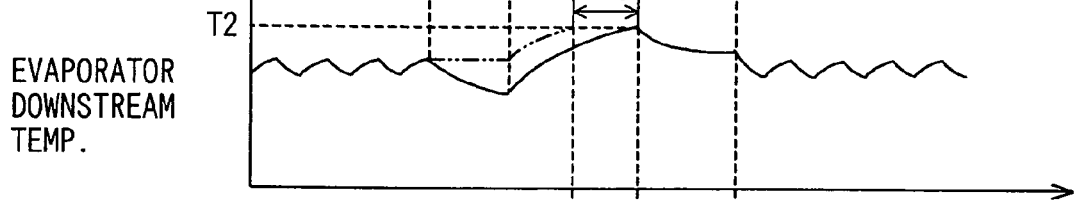
Figure 26D:
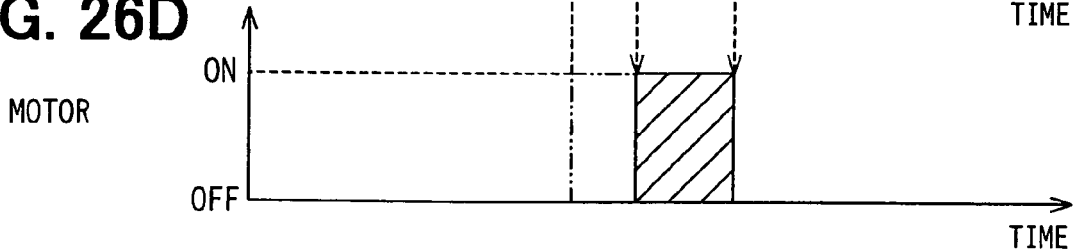

The first compressor 1112 is not limited to a variable displacement type compressor. It is also possible to use a compressor that is controlled by on and off switching, which is performed by the control unit 1302. That is, the control unit 1302 turns the compressor on when the air temperature at a predetermined location of the cooling unit 1102 (for example, the evaporator downstream temperature Te) is higher than or equal to a predetermined temperature (second predetermined temperature). In this case, as shown in FIG. 26B, the predetermined temperature has only to be varied to a lower value when the stoppage of the engine 9102 is predicted, so that the entire operation time is extended with an increase in discharge.

Moreover, the control of the discharge of the first compressor 1112 may be combined with the control of reducing the air flow rate of the fan 1142a described in the seventh embodiment. By so doing, the amount of the liquid refrigerant accumulated in the condenser 1122 can be increased for a further reduction in the power consumption upon the activation of the motor 2102.

Eleventh Embodiment

FIGS. 27-29D show an eleventh embodiment of the present invention. The eleventh embodiment is based primarily on the cooling unit 1102 of the fifth embodiment. This embodiment has an additional function of stopping the first compressor 1112 depending on the working load on the engine 9102, so that the power performance, or acceleration performance, of the engine 9102 improves, without impairing the cooling performance of the cooling unit 1102.

Figure 27:
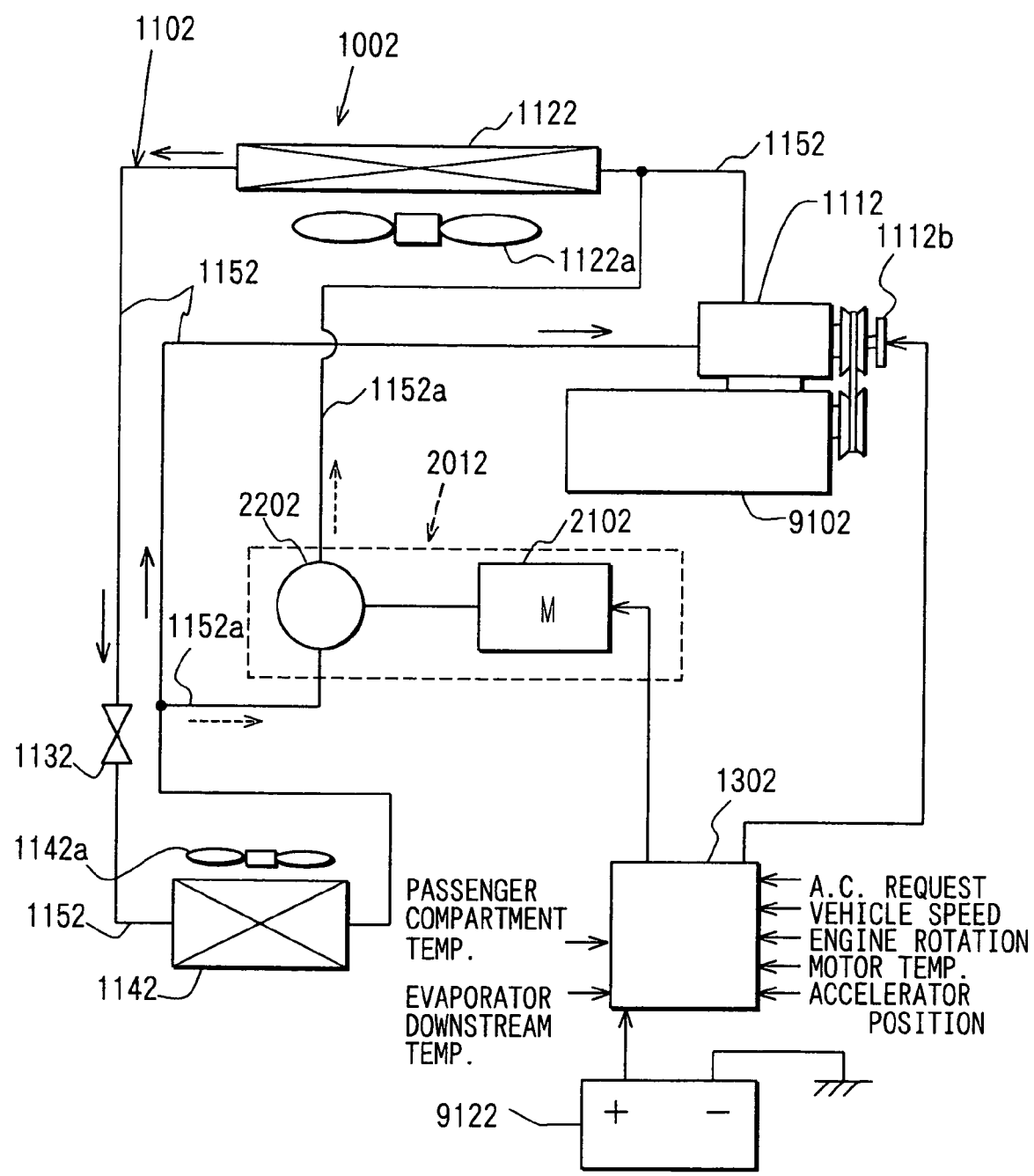
FIG. 27 is a schematic diagram showing the overall configuration of an eleventh embodiment of the present invention.

FIG. 27 shows the basic configuration of the present embodiment. As compared to the fifth embodiment shown in FIG. 16, the heating unit 1202 is omitted and the electric compressor-pump 2002 is replaced with an electric compressor 2012. In addition, a signal of an accelerator throttle opening is input to the control unit 1302 in order to grasp the working load on the engine 9102. If the accelerator throttle opening is operated to increase, the vehicle is determined as accelerating.

The pulley of the first compressor 1112 is provided with an electromagnetic clutch 1112b, which is engaged or disengaged by the control unit 1302. As is well known, engaging the clutch 1112b transmits the torque of the engine 9102 to the first compressor 1112. When the electromagnetic clutch 1112b is disengaged, the first compressor 1112 stops even if the engine 9102 is running.

The operation under the configuration will be described with reference to a control flowchart shown in FIG. 28 and timing charts shown in FIGS. 29A-29D. Initially, at step S2002, it is determined whether the vehicle is moving or in an idle-stop state. If the vehicle is in the idle-stop state, the first compressor 1112 stops, at step S2102, when the engine 9102 is stopped. At step S2202, the motor 2102 drives the second compressor 2202.

On the other hand, if the vehicle is determined to be moving at step S2002, then it is determined at step S2302 whether or not the vehicle is accelerating. If not accelerating, the first compressor 1112 is powered by the torque of the engine 9102 at step S2402. At step S2502, the motor 2102 is stopped. That is, the second compressor 2202 is stopped.

If it is determined at step S2302 that the vehicle is accelerating, and more specifically, if it is determined that the accelerator throttle opening is increased, as shown in FIG. 29B, then the process advances to steps S2102 and S2202. The electromagnetic clutch 1112b is disengaged to stop the first compressor 1112, and the motor 2102 is driven to operate the second compressor 2202 (the operation of the motor 2102 is shown by shading in FIG. 29D).

Consequently, the power of the engine 9102 is conserved, since the first compressor 1112 is not operated. This allows improved power performance for situations where higher working loads are needed, such as acceleration. The motor 2102 is driven to operate the second compressor 2202, which allows the cooling unit 1102 to continue functioning.

Whether the engine 9102 is accelerating or not is determined from the accelerator throttle opening of the engine 9102. Existing control data used in controlling the engine 9102 can be used for this purpose.

Otherwise, the determination that the vehicle is accelerating may be given when the accelerator throttle opening is greater than or equal to a predetermined opening and is being increased. Aside from the accelerator throttle opening, the signals available to determine acceleration include the engine intake pressure, the engine speed, the engine cooling water temperature, and changes in the vehicle speed. The first compressor 1112 may be a variable displacement type compressor, in which case the stoppage of the first compressor 1112 may be replaced with a near-zero-discharge control by the control unit 1302.

Twelfth Embodiment

FIGS. 30 and 31A-31E show a twelfth embodiment of the present invention. The twelfth embodiment differs from the eleventh embodiment in that the motor 2102 remains stopped after the first compressor 1112 is stopped during acceleration of the vehicle, and that the motor 2102 is driven at a point when the air-conditioning state of the cooling unit 1102 exceeds a predetermined level (the maximum allowable temperature T2).

The present embodiment has the same basic configuration as that of the eleventh embodiment. During acceleration, the first compressor 1112 is stopped, and the motor 2102 is driven to operate the second compressor 2202 at a point when the air-conditioning state of the cooling unit 1102, or the evaporator downstream temperature Te, exceeds the maximum allowable temperature T2 of the predetermined range.

As shown in FIG. 30, the control flowchart is like that of the eleventh embodiment, shown in FIG. 28, except that step S2202 is changed to step S2212. (If a stoppage of the compressor due to acceleration is determined, the motor 2102 is driven at a point when the evaporator downstream temperature Te exceeds the maximum allowable temperature T2 (See FIGS. 31D and 31E).

In the prior art, stoppage of the compressor due to acceleration has caused a rise in the evaporator downstream temperature Te as shown by the double-dashed line in FIG. 31E, with a deterioration in the comfort of the passenger compartment. However, the operation of the compressor unit 2102 can improve the acceleration performance of the engine 9102 with no deterioration in passenger comfort. A motor stop time of t2 is used as shown in FIG. 31D after the stoppage of the first compressor 1112. The power consumption of the motor 2102 is reduced accordingly.

Figure 32A:
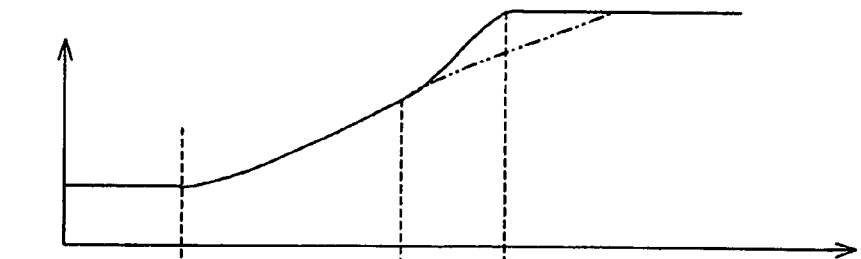
FIGS. 32A-32E are timing charts for showing the vehicle speed, the determination of a compressor stoppage due to acceleration, the operation of the compressor, the operation of the motor, and the evaporator downstream temperature during the control procedure according to a modified example of the twelfth embodiment, respectively.
Figure 32B:
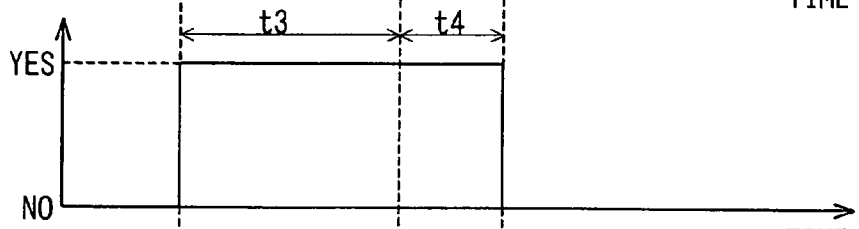
Figure 32C:
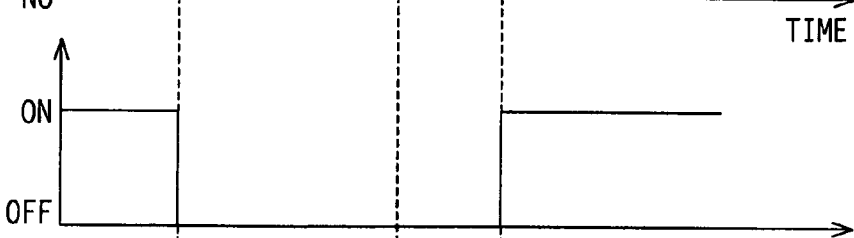
Figure 32D:
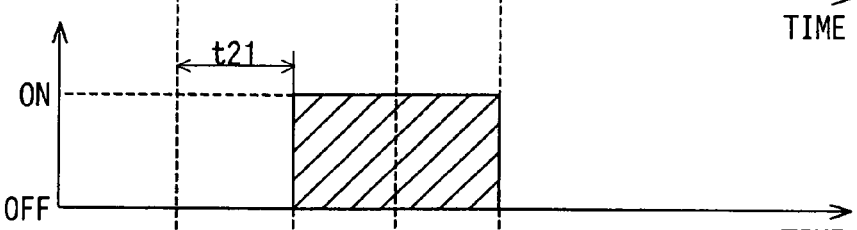
Figure 32E:
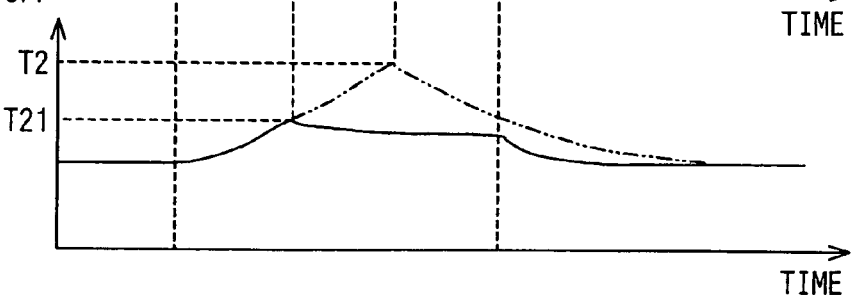

In a variation of the twelfth embodiment, as shown in FIGS. 32A-32E, the evaporator downstream temperature Te, at which the motor 2102 is driven after the stoppage of the first compressor 1112, may be changed to a temperature T21, which is lower than the maximum allowable temperature T2 (here, the stop time of the motor 2102 decreases to t21). As a result, the stoppage time due to acceleration, which was limited to t3 in the prior art, can be extended by t4 as shown in FIG. 32B. This permits a further improvement in acceleration capability as compared to the prior art shown by the double-dashed line in FIG. 32A.

Otherwise, the timing for driving the motor 2102 to operate the second compressor 2202 may be determined from the time that elapses after the stoppage of the first compressor 1112. To be more specific, the time that elapses before the evaporator downstream temperature Te reaches the maximum allowable temperature T2 (or a level lower than that) since the stoppage of the first compressor 1112 is determined in advance as a predetermined time (second predetermined time) t2, and the motor 2102 is driven after a lapse of the predetermined time period t2.

This alternative can eliminate the possibility of a delayed response in detecting temperature and improve the precision of the controls (accelerating ability, cooling performance, motor power consumption) as compared to the control procedure based on the temperature (evaporator downstream temperature Te).

Thirteenth Embodiment

FIGS. 33-35E show a thirteenth embodiment of the present invention. The thirteenth embodiment differs from the twelfth embodiment in that, when a cooling water temperature Tw, or the working load on the engine 9102 in the vehicle, exceeds a maximum allowable cooling water temperature Tw2, which is predetermined, the first compressor 1112 is stopped (high-cooling water-temperature compressor stoppage) and the motor 2102 is driven. In this connection, when the cooling water temperature Tw falls to a minimum allowable cooling water temperature Tw1 which is set below the maximum allowable cooling water temperature Tw2, the stoppage of the first compressor 1112 is discontinued.

Figure 33:
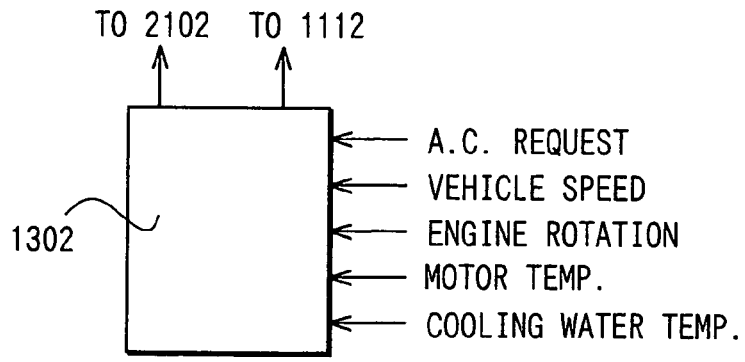
FIG. 33 is a schematic diagram showing a control unit according to a thirteenth embodiment.

With regard to the basic configuration, a signal of the engine cooling water temperature is input to the control unit 1302 as shown in FIG. 33. Based on the engine cooling water temperature signal, the first compressor 1112 and the motor 2102 are controlled while the vehicle is moving.

Figure 34:
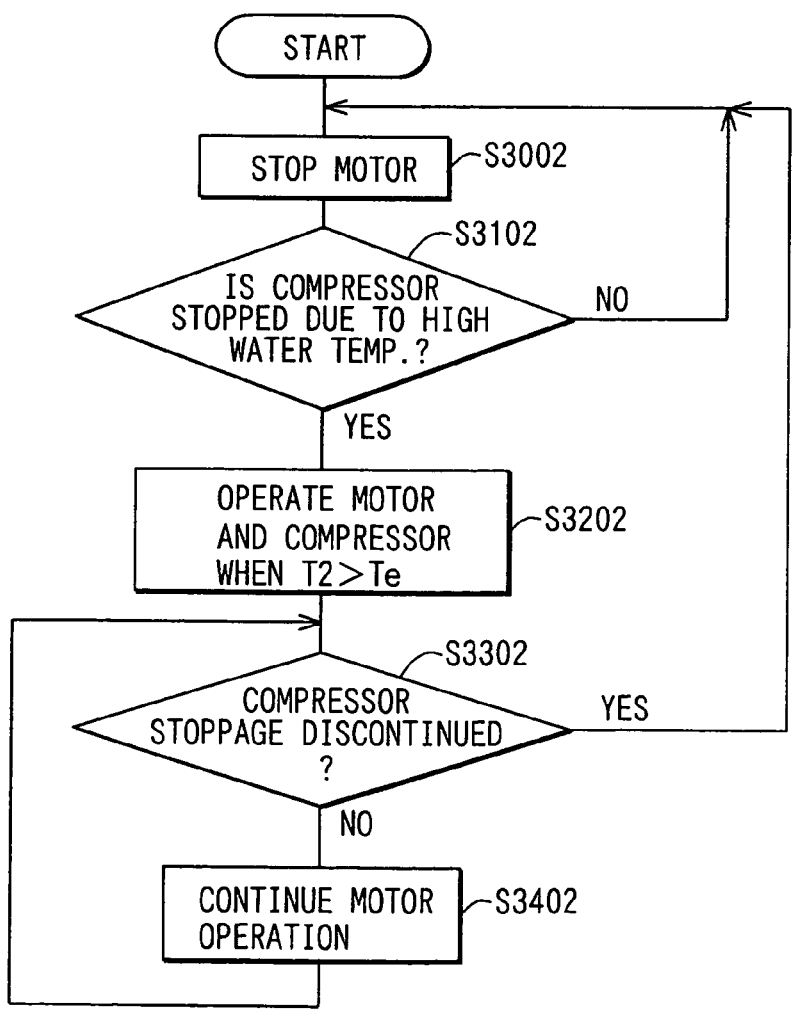
FIG. 34 is a flowchart showing the control procedure of the electric compressor according to the thirteenth embodiment.

The control procedure appears in a flowchart shown in FIG. 34. Initially, at step S3002, the motor is stopped. At step S3102, whether the compressor is stopped due to high-cooling water is determined. If in the high-cooling water-temperature state, the process moves to step S3202. The motor 2102 is driven to operate the second compressor 2012 at a point when the evaporator downstream temperature Te exceeds the maximum allowable temperature T2. Here, the motor 2102 is stopped for a time t2 from the starting point of the compressor stoppage (due to high-cooling water-temperature). In the case of a negative result at step S3102, the process returns to step S3002 to repeat the process.

At step S3302, it is determined whether or not the compressor stoppage has been discontinued as a result of the reduced working load on the engine 9102 (due to the stoppage of the first compressor), which lowers the cooling water temperature Tw to below the minimum allowable cooling water temperature Tw1. If the stoppage is discontinued, the process returns to step S3002 to stop the motor 2102. If not, the process moves to step S3402 to keep the motor 2102 operating.

In the prior art, guaranteeing the performance of the cooling unit 1102 (the evaporator downstream temperature Te) during the stoppage due to high-cooling water-temperature has caused an increase in the frequency of operations of the first compressor 1112 as shown by the double-dashed lines in FIG. 35C. A gradual increase has also occurred in the cooling water temperature Tw of the engine 9102 as shown by the double-dashed lines in FIG. 35B. In contrast, according to the present embodiment, the operation of the second compressor 2202 by the motor 2102 can guarantee the cooling performance during the stoppage caused by high-cooling water-temperature and reduce the working load on the engine 9102 as, thus stabilizing the cooling water temperature Tw and preventing overheating.

Here, the motor 2102 is kept from activation during the time t2 before the evaporator downstream temperature Te reaches the maximum allowable temperature T2. This reduces the power consumption of the motor 2102.

Fourteenth Embodiment

FIGS. 36 and 37A-37D show a fourteenth embodiment of the present invention. The fourteenth embodiment is the eleventh embodiment provided with an additional function for driving the motor 2102 to operate the compressor unit 2102 depending on the thermal load on the cooling unit 1102 while the vehicle is under deceleration.

The present embodiment has the same basic configuration as in FIG. 27 (the eleventh embodiment); however, modifications are made in the control of the motor 2102.

Figure 36:
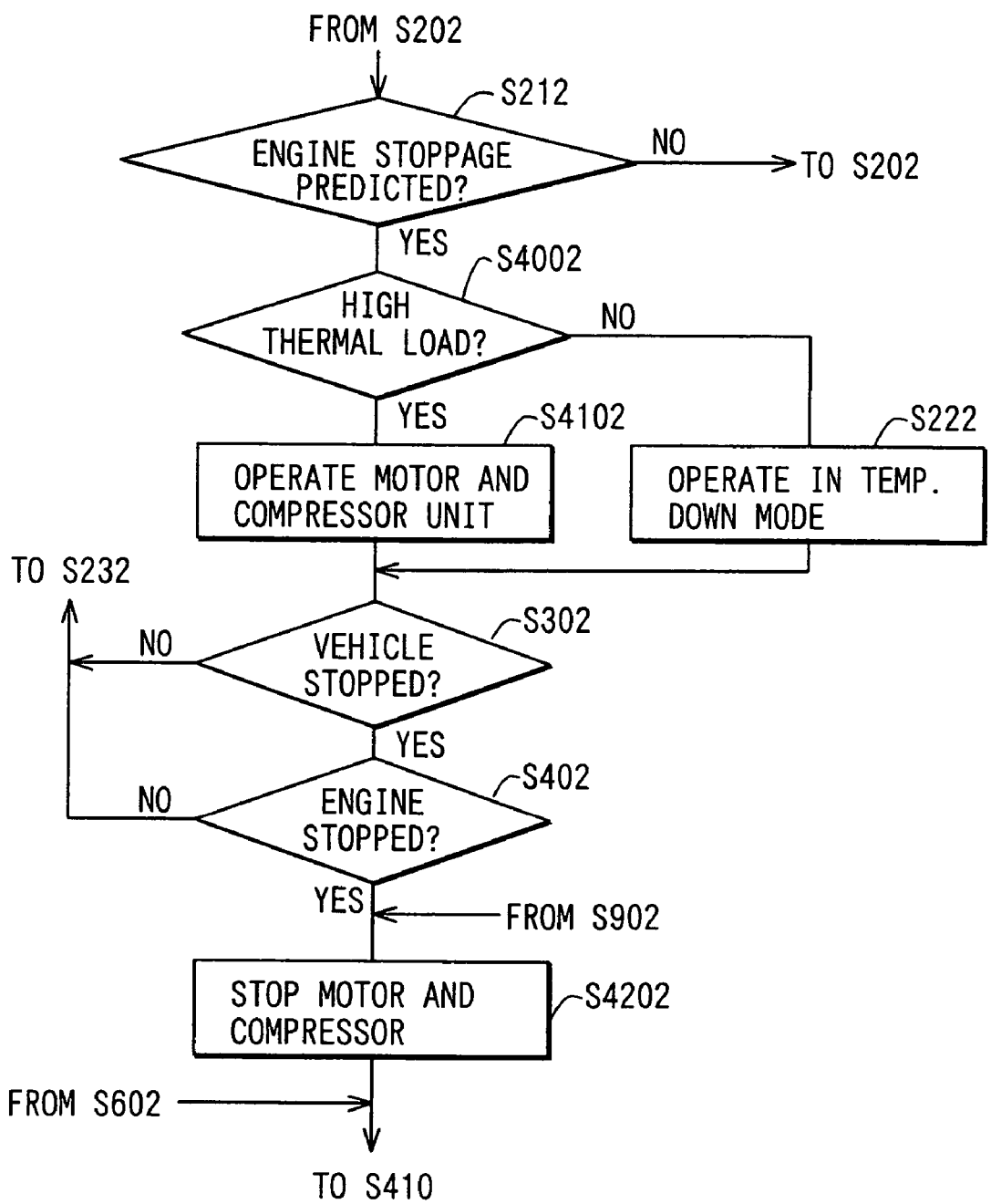
FIG. 36 is a flowchart showing the control procedure of an electric compressor according to a fourteenth embodiment.

The control flow appears in the flowchart of the seventh embodiment shown in FIG. 21, to which FIG. 36 is connected. That is, having predicted an engine stoppage during the deceleration of the vehicle at step S212 of FIG. 21, the process moves to step S4002 of FIG. 36 to determine whether or not the thermal load on the cooling unit 1102 is high. Specifically, it is determined if the first compressor 1112 is in full operation and the evaporator downstream temperature Te is higher than or equal to a predetermined value T12.

If so, the process moves to step S4102 in which the motor 2102 is driven to operate the compressor unit 2102. If it is determined at step S4002 that the thermal load is low, or that the evaporator downstream temperature Te is higher than or equal to the predetermined value T12 but the first compressor 1112 is not in full operation (the electromagnetic clutch 1112b is engaged/disengaged repeatedly), the process moves to step S222 to enter the temperature down mode. The temperature down mode may be those described in the seventh through tenth embodiments. For example, the discharge of the first compressor 1112 is increased (the electromagnetic clutch 1112b is kept engaged).

When it is determined at steps S302 and S402 that the vehicle comes to a temporary halt and the engine 9102 is stopped, the motor 2102 is temporarily stopped at step S4202 (the compressor unit 2102 is stopped). The process advances to steps S412 and later so that the motor 2102 is subjected to the control after the stoppage of the engine 9102.

Consequently, when the vehicle is under deceleration or the stoppage of the engine 9102 is predicted from the deceleration state, the operation of the first compressor 1112 is combined with the operation of the second compressor 2202 by the motor 2102. Since the flow rate of the refrigerant in the cooling unit 1102 can thus be increased to improve the cooling performance (FIG. 37D), a cooling effect can be given with a further reduction in the required operation time of the motor 2102. As a result, it is possible to reduce the power consumption of the motor 2102, which avoids overtaxing the battery 9122 and extends the life of the motor 2102. Incidentally, the power of the motor 2102 consumed during the deceleration can be concurrently generated from the deceleration energy (through regeneration) without additional fuel consumption.

Eleventh Embodiment

FIGS. 38 and 39A-39E show an eleventh embodiment of the present invention. The eleventh embodiment differs from the tenth embodiment in that the motor 2102 is also driven depending on the thermal load on the cooling unit 1102 when the engine 9102 is restarted after a stoppage.

Here, the control procedure of the motor 2102 for restarting the engine 9102 after a stoppage is added, as shown in FIG. 38. That is, at step S5002, whether the engine 9102 has been restarted or not is determined. If restarted, the process moves to step S5102 to determine whether or not the thermal load on the cooling unit 1102 is high. Specifically, it is determined whether the evaporator downstream temperature Te is higher than or equal to the maximum allowable temperature T2.

If it is determined at step S5102 that the thermal load is high, the process moves to step S5202 so that the motor 2102 is driven to operate the second compressor 2202. On the other hand, if the result is negative at step S5102, the process moves to step S5302, in which the motor 2102 is stopped to stop the second compressor 2202. At step S5102, the determination of whether the thermal load is not high is based on a temperature determined by the function $\alpha T(t3)$, which is a increasing monotone increasing function of the stop time period $t3$ of the engine 9102 ($\alpha$ is a constant). More specifically, with the evaporator downstream temperature $Te=T2-\alpha T(t3)$ as the criterion, the motor 2102 is stopped when the criterion is not reached (FIGS. 39D and 39E).

Consequently, the operation of the first compressor 1112 after the restart of the engine 9102 is combined with the operation of the second compressor 2202 by the motor 2102. Since the flow rate of the refrigerant in the cooling unit 1102 can be increased to improve the cooling performance, passenger comfort (the expected level of cooling) can be restored in a shorter time than when the minimum necessary cooling has been performed by the second compressor 2202 while the engine 9102 is stopped.

A case where the test for determining whether to stop the motor 2102 is whether the evaporator downstream temperature satisfies the equation $Te=T2-\alpha T(t3)$, which includes a function of the stop time period $t3$ of the engine 9102, has been described. The criterion is not so limited, however. As shown in FIG. 39D, the motor may be stopped when the vehicle speed increases and when the vehicle accelerates with an increase in the discharge of the first compressor 1112.

Other Modifications

The embodiments have dealt with cases where the air-conditioning state is determined from the evaporator downstream temperature Te or the passenger compartment temperature Tr. The factors for determining the air-conditioning state are not so limited, however, and the air conditioning state may be determined, among other methods, by the pressure of the refrigerant, or the temperature of the cooling water that is circulating through the heater 1212.

The seventh through tenth embodiments illustrate cases where the stoppage of the engine 9102 is predicted from the vehicle speed (V1) under deceleration. The prediction may however be based on the engine speed or the braking state or by other operating characteristics. In any case, the stoppage of the engine 9102 can be predicted easily.

Figure 40:
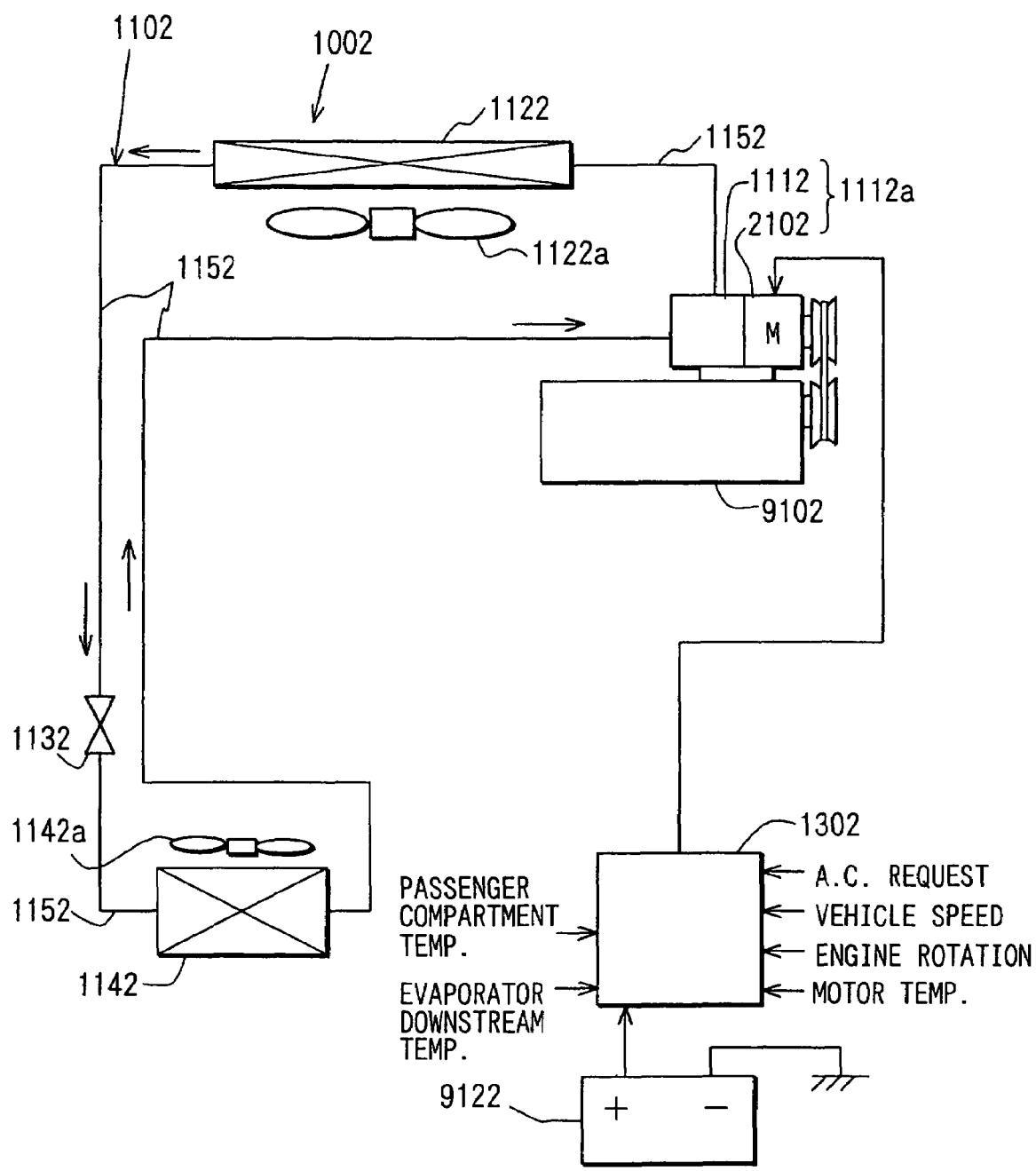
FIG. 40 is a schematic diagram showing the overall configuration of a further embodiment.
Figure 41:
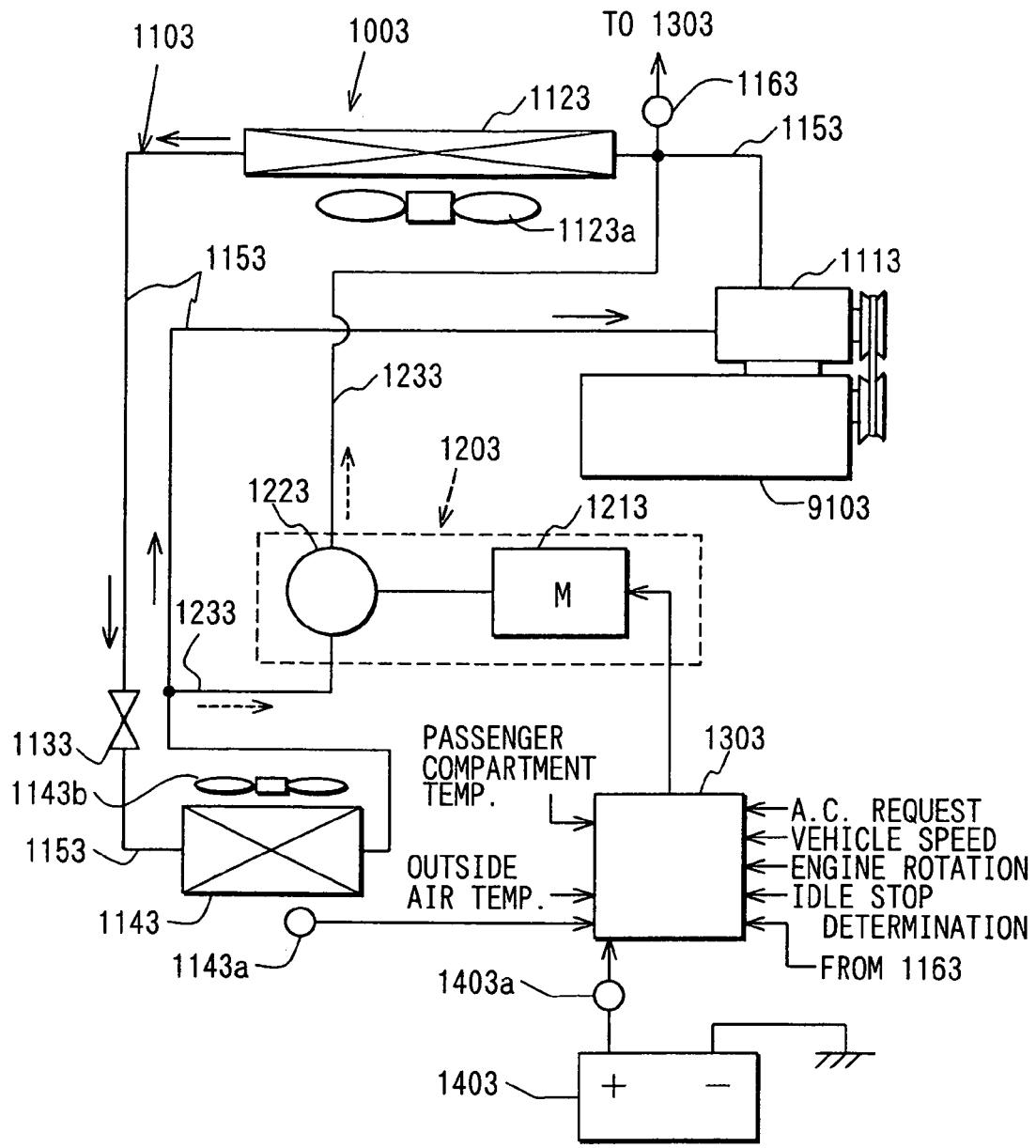
FIG. 41 is a schematic diagram showing the overall configuration of a sixteenth embodiment of the present invention.

Furthermore, the fifth through thirteenth embodiments may be modified as shown in FIG. 40. That is, the second compressor 2202 may be integrated with the first compressor 1112, in which case the compressor 1112 is configured as a hybrid compressor 1112a to be selectively powered by the engine 9102 and the motor 2102.

Sixteenth Embodiment

Referring to FIGS. 41-45D, a vehicle cooling system 1003 is used in a so-called idle-stop vehicle which has an engine 9103, which is stopped when the vehicle comes to a temporary halt while moving. The vehicle cooling system 1003 comprises a refrigeration cycle unit 1103, a control unit 1303, and a battery 1403.

The refrigeration cycle unit 1103, which performs a known refrigeration cycle, has two compressors 1113 and 1223. A first compressor 1113 is connected to a condenser 1123, an expansion valve 1133, and an evaporator 1143 in series by refrigerant piping 1153. The first compressor 1113 compresses a refrigerant to a high temperature and high pressure. The condenser 1123 condenses and liquefies the compressed refrigerant. The expansion valve 1133 expands the liquefied refrigerant adiabatically. The evaporator 1143 evaporates the expanded refrigerant so that passing air is cooled by the latent heat of vaporization. The first compressor 1113 is powered by torque from the vehicle engine 9103 through pulleys and a belt.

The condenser 1123 has a fan 1123a, which sends air to the condenser 1123 to promote the liquefaction/condensation of the refrigerant.

The evaporator 1143 also has a fan 1143b. The fan 1143b forces air through the evaporator 1143, which cools the air, and the conditioned air is sent to the passenger compartment. An evaporator temperature sensor 1143a for detecting the temperature of the cooled air (evaporator downstream temperature) is located on the downstream side of the evaporator 1143.

A second compressor 1223 is arranged in parallel with the first compressor 1113. Specifically, the second compressor 1223 is connected between the upstream side of the condenser 1123 and the downstream side of the evaporator 1143 by refrigerant piping 1233. The second compressor 1223 is powered by a motor 1213, which is powered by the battery 1403. The motor 1213 and the second compressor 1223 constitute an electric compressor 1203. The second compressor 1223 is driven when the engine 9103 is stopped and the first compressor 1113 is stopped.

A current sensor 1403a for detecting the electric current during the operation of the motor 1213 is located on a lead, which extends from the battery 1403 to the control unit 1303. A pressure sensor 1163 for detecting a discharge pressure P is arranged on the discharge side of the first and second compressors 1113 and 1223.

The configuration of the control unit 1303, which is an essential part of the present invention, will be described with reference to the figures. The control unit 1303 is intended to operate the electric compressor 1203. The control unit 1303 receives detection signals from the evaporator temperature sensor 1143a, pressure sensor 1163, and current sensor 1403a, among other signals from various unillustrated sensors, including a vehicle speed signal, an engine speed signal, an idle-stop determination signal, an inside air temperature signal, an outside air temperature signal, and an A/C request signal. According to the signals, the control unit 1303 controls the motor 1213, which drives the second compressor 1223.

For normal operations of the refrigeration unit 1103, the control unit 1303 performs, as might be expected, on and off control of the compressor 1113 and actuation and air flow rate control of the fans 1123a and 1143b in accordance with the signals.

In the present embodiment, a control program for operating the motor 1213 such that the battery power is conserved is stored for use by the control unit 1303.

Initially, a cumulative operating period, during which the motor 1213 is operated while the vehicle is halted and the engine 9103 is stopped (idle-stopped), is determined as a first predetermined time period t1. The first predetermined time period t1 is determined, for example, from the frequency of idling occurrences, which is estimated by simulations of the vehicle moving conditions, and the depth of discharge (use time) obtained from the number of times the battery 1403 is used. In other words, while variations in length are naturally expected of repetitive idling periods, an average value is used as the cumulative operating time (first predetermined time period t1) of the motor 1213 per idling in consideration of the battery life time.

Figure 42A:
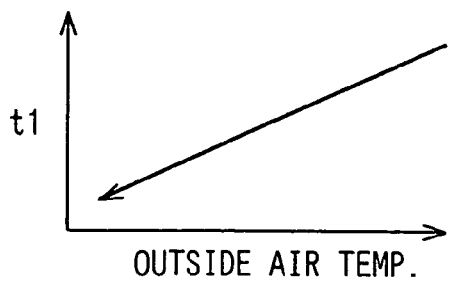
FIGS. 42A and 42B are graphs showing the relationship between outside air temperature and a first predetermined time in a first pattern and a second pattern, respectively.

As shown in FIG. 42A, the first predetermined time period t1 is determined according to the outside air temperature. The relationship of FIG. 42A is stored in the control unit 1303. Specifically, the first predetermined time period t1 decreases when the outside air temperature decreases. That is, since lower outside air temperatures naturally require less work from the second compressor 1223, the operating time of the motor 1213 is reduced.

The motor 1213 is operated after the lapse of a second predetermined time t2, or delay time, from the point when the vehicle comes to a halt and the engine 9103 is stopped. The delay time t2 is set such that the discharge pressure P of the refrigerant that has been compressed by the first compressor 1113 drops to a predetermined value (discharge pressure Pd) within the second predetermined time t2 from the time the engine 9103 is stopped (the time the first compressor 1113 is stopped). The motor 1213, when operated, activates the second compressor 1223 at the reduced discharge pressure Pd.

Figure 43A:
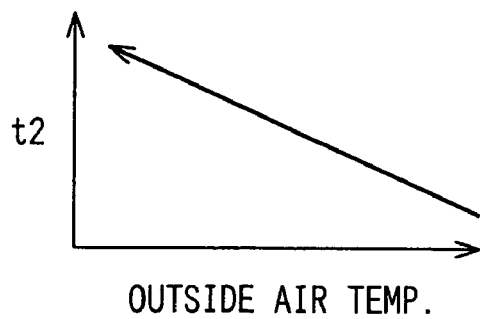
FIGS. 43A and 43B are graphs showing the relationship between the outside air temperature and a second predetermined time in a first pattern and a second pattern, respectively.

As shown in FIG. 43A, the second predetermined time t2 is determined according to the outside air temperature. The relationship of FIG. 43A is stored in the control unit 1303. Specifically, the second predetermined time t2 increases when the outside air temperature decreases. That is, since lower outside air temperatures naturally have less influence on the cooling performance, even with larger drops in the discharge pressure P, the delay time is increased for lower outside air temperatures.

The first and second predetermined times t1 and t2 are incorporated into the stored control program so that the operation of the motor 1213 is controlled accordingly.

When the vehicle is moving, i.e., when the engine 9103 is running, the refrigeration unit 1103 performs normal operations. More specifically, the compressor 1113 is driven by the engine 9103 and compresses refrigerant. The compressed refrigerant is subsequently passed through the condenser 1123, the expansion valve 1133, and the evaporator 1143 for condensation, adiabatic expansion, and evaporation in succession, to cool the air passing through the evaporator 1143.

Since the cooling system is applied to an idle-stop vehicle, the engine 9103 is stopped when the vehicle comes to a temporary halt. The compressor 1113 then quits operating, and the electric compressor 1203, i.e., the motor 1213 is operated.

The control of the motor 1213 by the control unit 1303 will be described with reference to the flowchart shown in FIG. 44 and the timing charts shown in FIGS. 45A-45D in the following.

Initially, after the engine 9103 is stopped, the motor 1213 is stopped at step S103. Next, at step S203, the first and second predetermined times t1 and t2 are determined. More specifically, as shown in FIGS. 42A and 43A, the first and second predetermined time periods t1 and t2 are determined from the respective graphs of the predetermined time periods t1 and t2 stored with respect to the outside air temperature. Then, the elapse of time is measured for determining whether time period t2 has elapsed.

Next, at step S303, whether the second predetermined time t2 has elapsed or not is determined. If elapsed, the process moves to step S403. If not, step S303 is repeated.

Next, at step S403, the motor 1213 is operated. Here, as mentioned above, the second compressor 1223 operates at the discharge pressure Pd to which the discharge pressure fell during the second predetermined time t2. At this point, elapsed time is measured to determine whether the first predetermined time period t1 has elapsed.

Next, at step S503, whether the first predetermined time period t1 has elapsed or not is determined. If elapsed, the process moves to step S603 to stop the motor 1213. If not, step S503 is repeated.

Having described the configuration and operation, the advantages and effects of the illustrated embodiment will be described. According to the present embodiment, the motor 1213 is precluded from operating beyond the first predetermined time period t1, which is established in advance. Overtaxing, or over-draining, the battery 1403 is thus reliably prevented. Since the first predetermined time period t1 is set at an average value for repetitive idling occurrences, an average cooling performance can be secured during the idling times.

The first predetermined time period t1 is a function of the outside air temperature. This avoids unnecessary consumption of electric power, which reduces the power consumption of the motor 1213.

Moreover, the operation of the motor 1213 is preceded by the second predetermined time t2, or delay time. The result is that the discharge pressure Pd decreases during the second predetermined time t2. Since the motor 1213 of the second compressor 1223 is activated at the reduced discharge pressure Pd, the second compressor 1223 consumes less power than it would if activated to operate at the discharge pressure Pd produced when the engine 9103 is running. The power consumption of the motor 1213 is therefore relatively low. The rush current at the activation of the motor 1213 is reduced accordingly. As a result, it is possible to prevent the rush current from reducing the life of parts and to suppress the voltage drop of the battery 1403, which will prevent auxiliaries from malfunctioning.

The second predetermined time t2 is a function of the outside air temperature. This also avoids unnecessary consumption of electric power and reduces motor rush current.

Figure 42B:
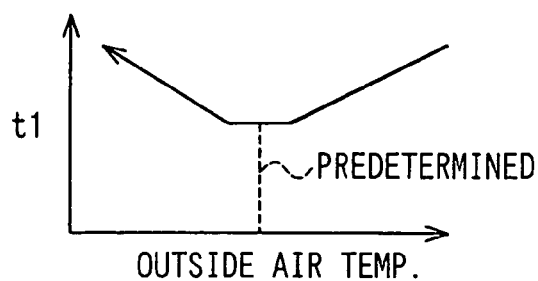
Figure 43B:
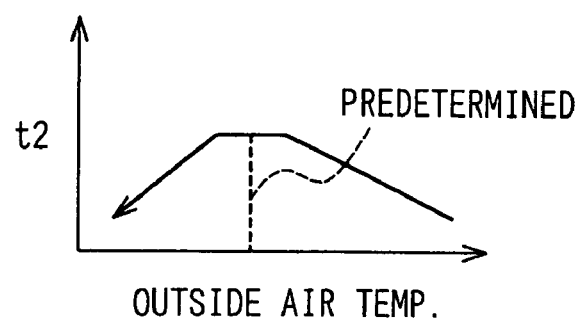

The first predetermined time period t1 may be set as shown in FIG. 42B, i.e., such that t1 increases when the outside air temperature decreases below a predetermined value. The second predetermined time t2 may be set as shown in FIG. 43B, i.e., such that t2 decreases when the outside air temperature decreases below a predetermined value. This provides improved windshield defogging during wintertime.

The first and second predetermined times t1 and t2 may be functions of variables corresponding to the cooling load on the refrigeration cycle unit 1103, rather than the outside air temperature.

Seventeenth Embodiment

FIGS. 46-48F show a seventeenth embodiment of the present invention. The basic configuration appears in FIG. 46. As compared to the sixteenth embodiment, the control unit 1303 is provided with an engine start request function for requesting the starting of the engine 9103 depending on the battery capacity C.

More specifically, the battery capacity C is calculated according to the signal from the current sensor 1403a. If the battery capacity C falls below a predetermined capacity C1, the motor 1213 is stopped. An engine start request signal is sent to an engine control unit 9113 for controlling the operation of the engine 9103. In response to this signal, the engine 9103 is started.

FIGS. 47 and 48A-48F are a flowchart and timing charts during the control on the motor 1213, respectively. As in the sixteenth embodiment, the basic controls are performed at steps S103 to S603. The battery capacity C is checked at step S703. More specifically, when the motor 1213 is operated while the engine 9103 stopped, the battery capacity C of the battery 1403 decreases. When the battery capacity falls below the predetermined capacity C1, which is established in advance, the motor 1213 is stopped at step S603, even if the elapsed operating time of the motor 1213 is less than the first predetermined time period t1. At step S803, the engine start request signal is sent to the engine control unit 9113 to start the engine 9103. The first compressor 1113 is thus driven with the engine 9103 as the driving source, which reliably prevents over-draining the battery while continuing the air conditioning. The battery 1403 is charged after the engine 9103 is started.

Eighteenth Embodiment

FIGS. 49A-49E show an eighteenth embodiment of the present invention. The eighteenth embodiment differs from the sixteenth embodiment in that after the motor 1213 is stopped, the engine 9103 is started depending on a cooling temperature. As in the seventeenth embodiment, the control unit 1303 has the engine start request function.

Initially, the evaporator 1143 serves as a location (predetermined location) to detect the representative cooling temperature in the cooling system 1003. Among the evaporator downstream air temperatures (hereinafter, evaporator temperatures) Te obtained by the evaporator temperature sensor 1143a, shown in FIG. 41, a maximum allowable temperature in terms of cooling performance is previously set as a first predetermined temperature T1.

Then, as shown in FIGS. 49A-49E, the engine 9103 is stopped, and the motor 1213 is operated after a lapse of the second predetermined time t2. The motor 1213 is stopped when its operating time reaches the first predetermined time period t1. Subsequently, if the engine 9103 is kept stopped for a relatively long time, the evaporator temperature Te goes up. When the evaporator temperature Te exceeds the first predetermined temperature T1, the engine 9103 is started as in the seventeenth embodiment.

Consequently, even if the stop time of the engine 9103 is long with respect to the first predetermined time period t1, the motor 1213 can be stopped after the first predetermined time period t1 to prevent a dead battery, while the first compressor 1113 is powered by the engine 9103 for cooling performance when necessary.

Nineteenth Embodiment

FIGS. 50A-52E show a nineteenth embodiment of the present invention. In the nineteenth embodiment, the motor 1213 is turned on and off and the engine is started depending on the evaporator temperature Te, which represents the degree of cooling.

Initially, first, second, and third predetermined temperatures T1, T2, and T3 of the evaporator are established in advance on a characteristic chart with respect to the outside air temperature as shown in FIG. 50A. The first predetermined temperature T1 is a maximum allowable temperature, in terms of cooling performance, the second predetermined temperature T2 is a minimum allowable temperature, and the third predetermined temperature T3 an intermediate value. The predetermined temperatures T1, T2, and T3 are stored in the control unit 1303.

Figure 51:
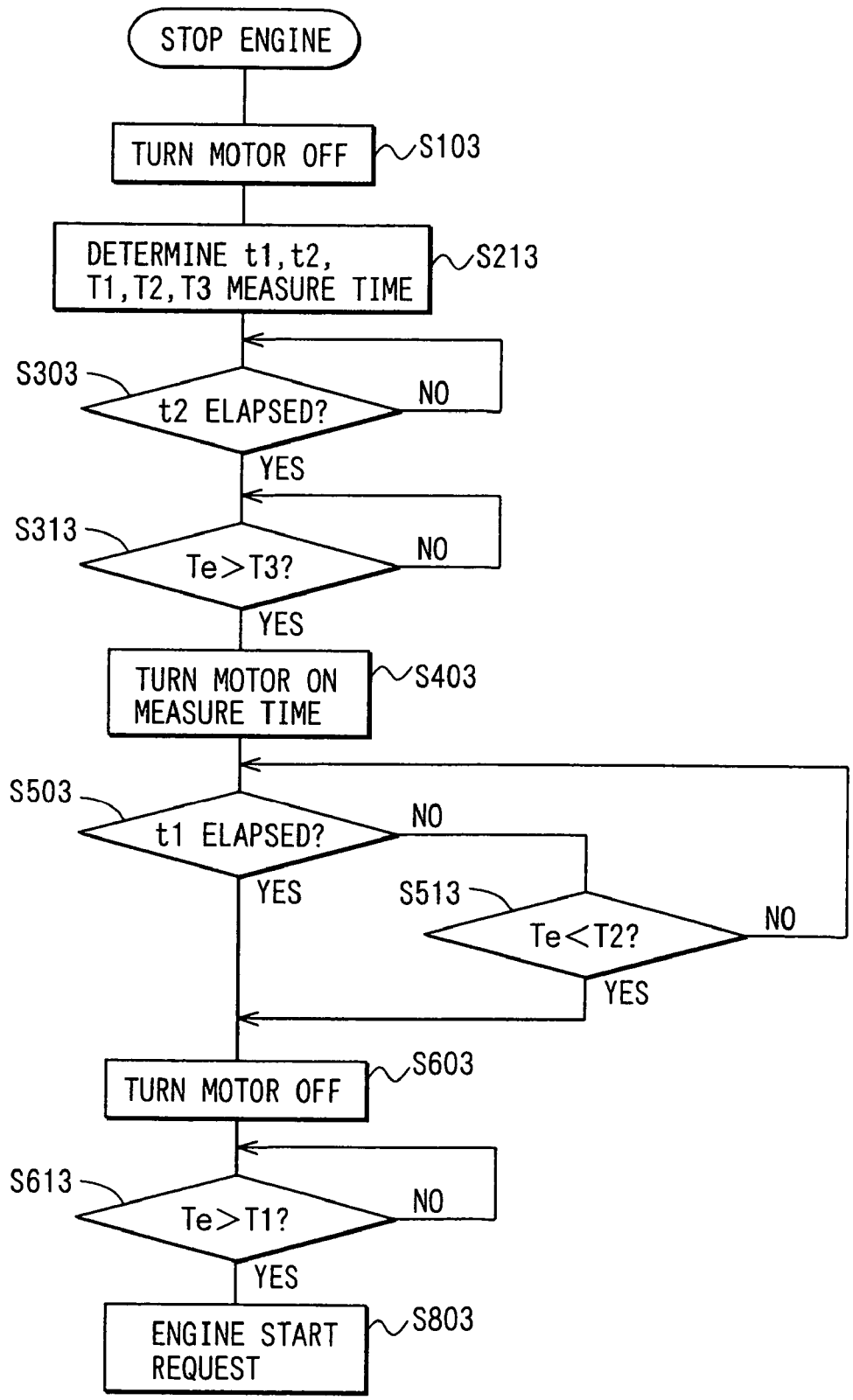
FIG. 51 is a flowchart showing the control procedure of a motor of a nineteenth embodiment.
Figure 52A:
FIGS. 52A-52E are timing charts showing vehicle speed, the engine speed, the discharge pressure, the ON/OFF state of the motor, and the evaporator temperature of the nineteenth embodiment, respectively.
Figure 52B:
Figure 52C:
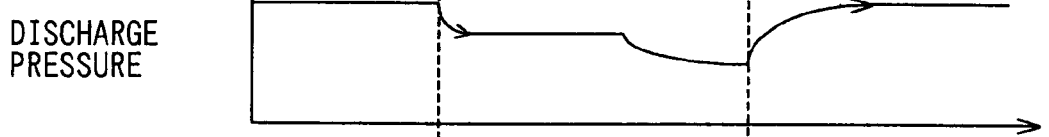
Figure 52D:
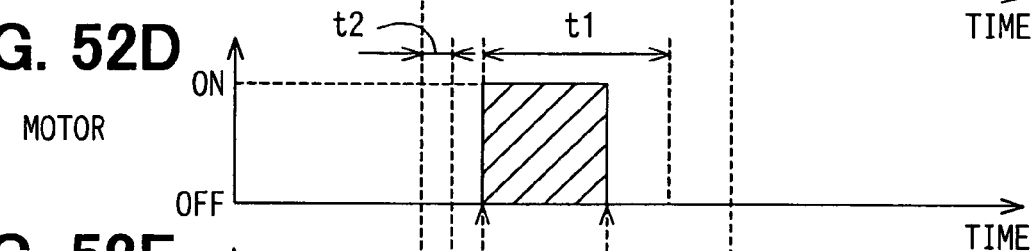
Figure 52E:
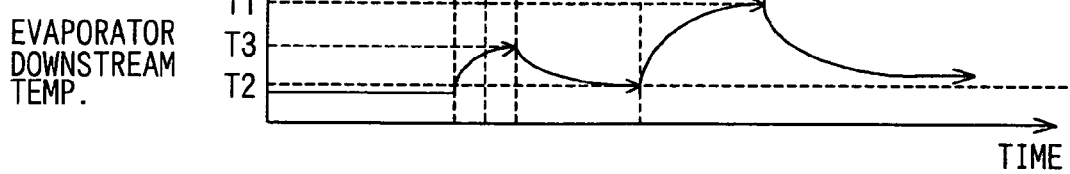

As shown in FIGS. 51-52E, the motor 1213 is turned on and off and the engine 9103 is started with the predetermined temperatures T1, T2, and T3 as criteria.

Figure 44:
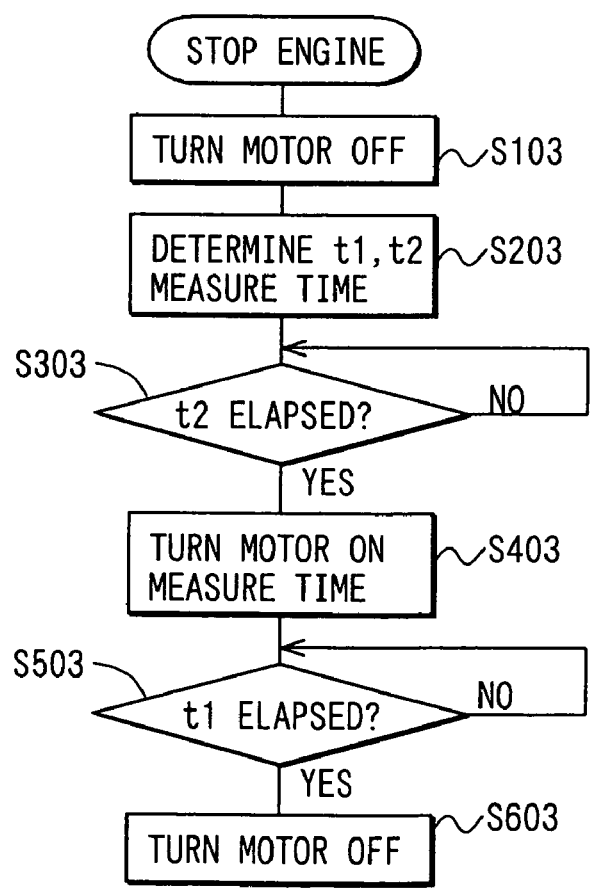
FIG. 44 is a flowchart showing the control procedure for the motor of FIG. 41.
Figure 47:
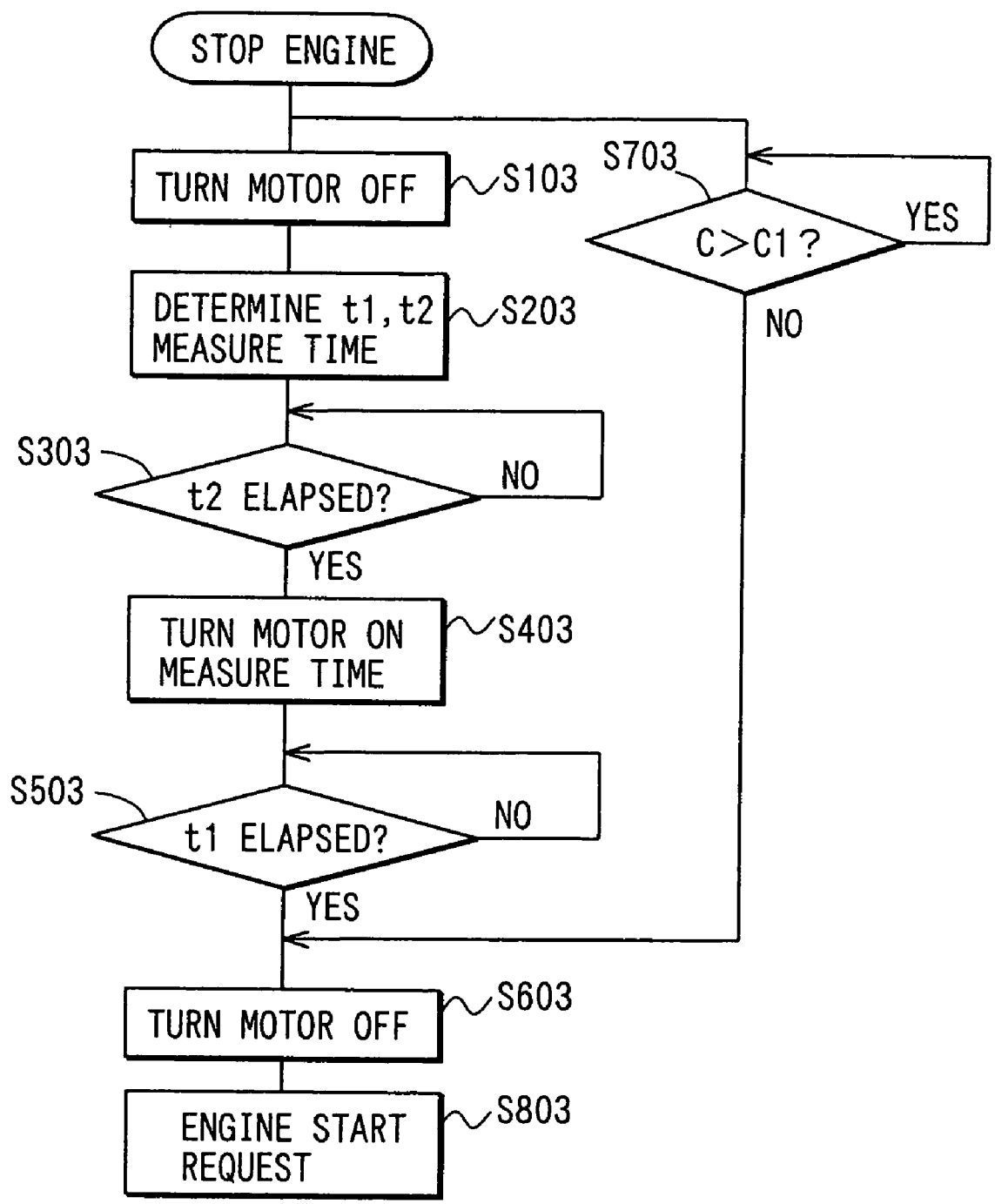
FIG. 47 is a flowchart showing the control procedure of the motor of FIG. 46.

FIG. 51 shows the same control flowchart as that of the sixteenth embodiment of FIG. 44, except in that step S203 is replaced with step S213 and except that steps S313, S513, and S613 are added. The control procedure will be described with particular emphasis on the added steps.

Initially, at step S213, the first to third predetermined temperatures T1, T2, and T3 and the first and second times t1 and t2 are determined from the graphs, which are established in advance.

Next, after the lapse of the second predetermined time t2 at step S303, the process moves to step S313 to determine whether the evaporator temperature Te exceeds the third predetermined temperature T3. If not, this step is repeated, suh that time elapses beyond the second predetermined time t2, and the evaporator temperature Te increases. When the evaporator temperature Te exceeds the third predetermined temperature T3, the motor 1213 is operated at step S403. That is, if a waiting time that elapses before the evaporator temperature Te exceeds the third predetermined temperature T3 is longer than the second predetermined time t2, the waiting time dominates the operation of the motor 1213.

The operation of the motor 1213 reduces the evaporator temperature Te. Before a lapse of the first predetermined time period t1, the process enters step S513 to determine whether or not the evaporator temperature Te has fallen below the second predetermined temperature T2. If the evaporator temperature Te has fallen below the second predetermined temperature T2, the motor 1213 is stopped at step S603 even if the operating time of the motor 1213 has not reached the first predetermined time period t1.

Then, the evaporator temperature Te increases again. At step S613, whether or not the evaporator temperature Te has exceeded the first predetermined temperature T1 is determined. If so, the engine 9103 is started.

Consequently, after the engine 9103 is stopped, the cooling performance up to the third predetermined temperature T3 can be guaranteed, while the motor 1213 is prevented from operating beyond the second predetermined time t2. This allows further conservation of energy.

The timing at which the motor 1213 is operated can be determined from the third predetermined temperature T3, which is easier than using the second predetermined time t2 for determining when to start the motor 1213.

In addition, if the operation of the motor 1213 produces a sufficient drop in the evaporator temperature Te at an earlier point, the motor 1213 is stopped accordingly. Thus, the power of the battery 1403 can be further conserved.

After the engine 9103 is started, the cooling performance is provided by the first compressor 1113.

In addition, the relationship of the first to third predetermined temperatures T1, T2, and T3 with respect to the outside air temperature may be set as shown in FIG. 50B, i.e., such that the predetermined temperatures decrease when the outside air temperature decreases below a predetermined value. This provides improved windshield defogging during wintertime.

Moreover, the first to third predetermined temperatures T1, T2, and T3 may be associated with variables corresponding to the cooling load on the refrigeration cycle unit 1103, rather than the outside air temperature.

Twentieth Embodiment

Figure 53:
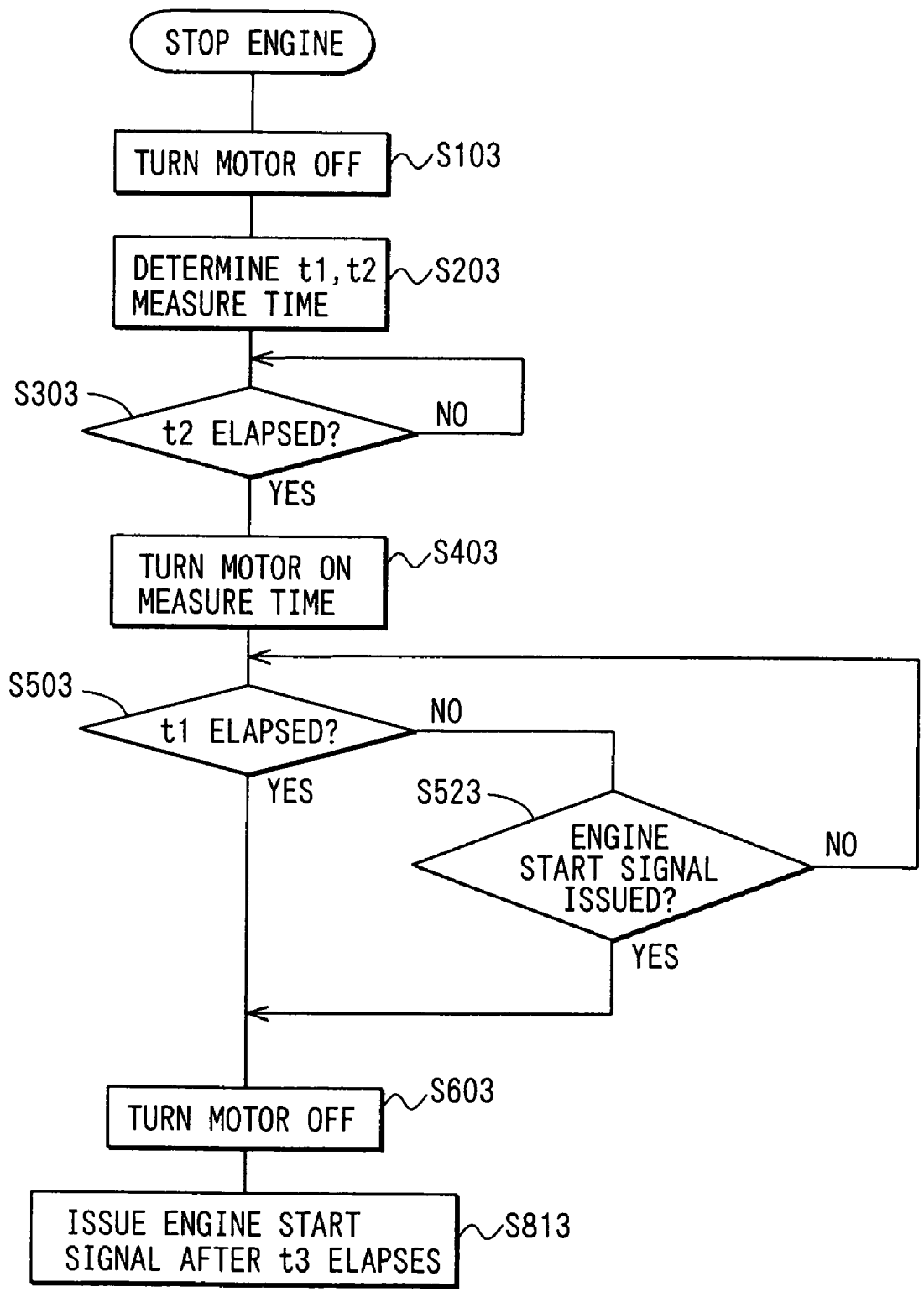
FIG. 53 is a flowchart showing the control procedure of a motor of a twentieth embodiment of the present invention.

FIGS. 53-54F show a twentieth embodiment of the present invention. The twentieth embodiment is one in which a third predetermined time period t3 is established, such that the starting of the engine 9103 is delayed by the third predetermined time t3 after the motor 1213 is stopped.

This delay time from the stoppage of the motor 1213 to the start of the engine 9103, or the third predetermined time t3, is stored in the control unit 1303. The third predetermined time t3 is set at or below 0.5 seconds. The control procedure is performed as shown in FIGS. 53-54F. (In FIG. 53, steps S103 to S503 are the same as in the sixteenth embodiment, and a detailed description of these steps is omitted.)

After the lapse of the second predetermined time period t2, the motor 1213 is operated. While the operating time is measured, whether a start signal for the engine 9103 has been issued is determined at step S523. That is, whether the engine control unit 9113, shown in FIG. 46, has issued an operation signal to an unillustrated starter, for starting the engine 9103, is determined.

If it is determined that the start signal of the engine 9103 has been generated before the lapse of the first predetermined time period t1, the motor 1213 is stopped at step S603. A start request for the engine 9103 is issued at step S813. In response to the start request, the starter is operated after a lapse of the third predetermined time t3, which is measured from the stoppage of the motor 1213, and the engine 9103 is started.

Consequently, the starter for starting the engine 9103 and the motor 1213 are prevented from concurrent operation. This reduces the voltage drop of the battery 1403, which prevents auxiliaries from malfunctioning.

Since the third predetermined time t3 is short (0.5 seconds or less), the engine 9103 can be started without an excessive time lag and occupants can start driving smoothly from a halt.

Twenty-first Embodiment

Figure 55A:
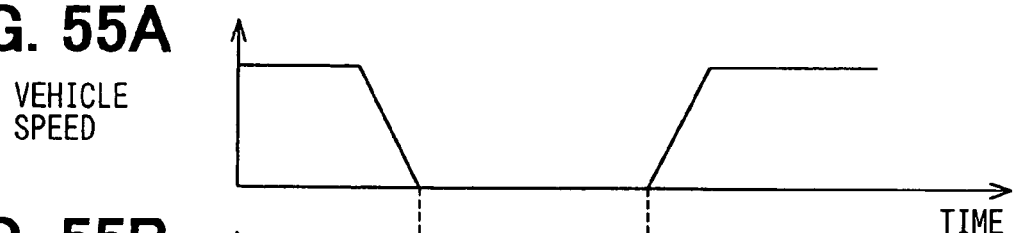
FIGS. 55A-55C are timing charts showing vehicle speed, the discharge pressure, and the ON/OFF state of the motor of a twenty-first embodiment of the present invention, respectively.
Figure 55B:
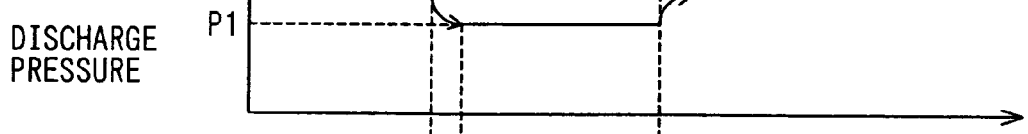
Figure 55C:
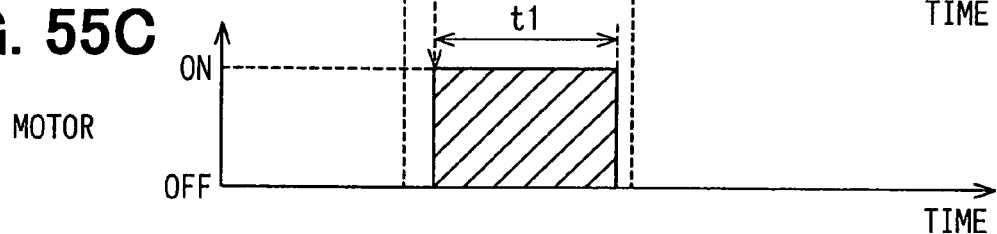
Figure 56A:
FIGS. 56A-56D are timing charts showing vehicle speed, the ON/OFF state of the compressor, the discharge pressure, and the ON/OFF state of the motor of a twenty-second embodiment of the present invention, respectively.
Figure 56B:
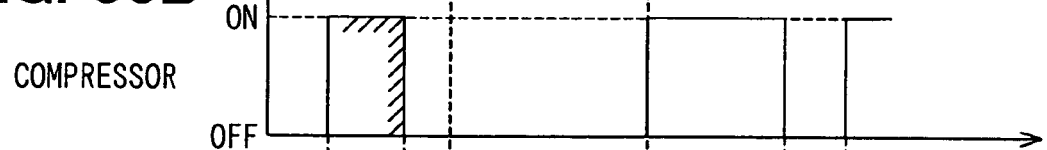
Figure 56C:
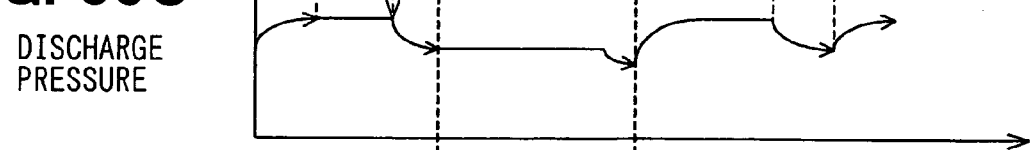
Figure 56D:
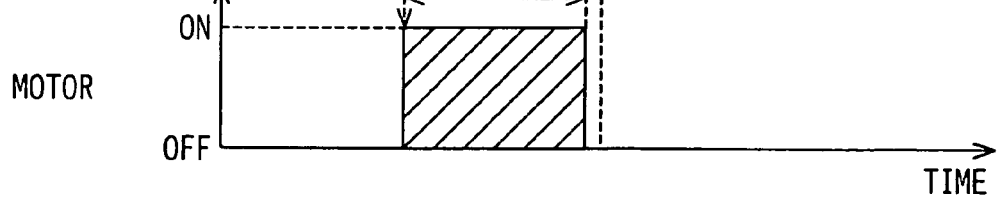
Figure 57A:
FIGS. 57A-57D are timing charts showing vehicle speed, the ON/OFF state of the compressor, the discharge pressure, and the ON/OFF state of the motor of an twenty-third embodiment of the present invention, respectively.
Figure 57B:
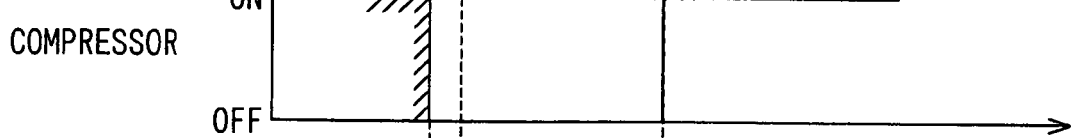
Figure 57C:
Figure 57D:
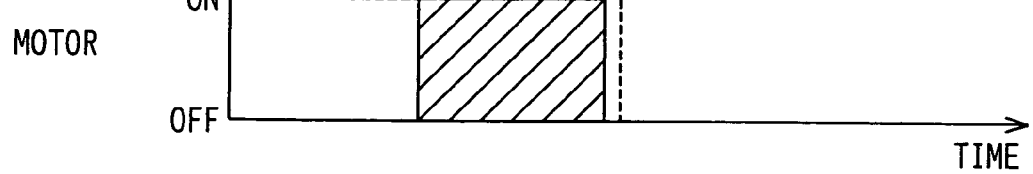
Figure 58A:
FIGS. 58A-58D are timing charts showing vehicle speed, the air flow rate of a fan, the discharge pressure, and the ON/OFF state of the motor of a twenty-fourth embodiment of the present invention, respectively.
Figure 58B:
Figure 58C:
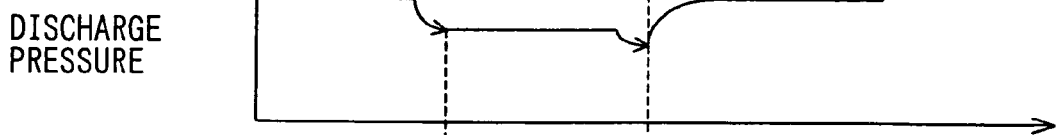
Figure 58D:
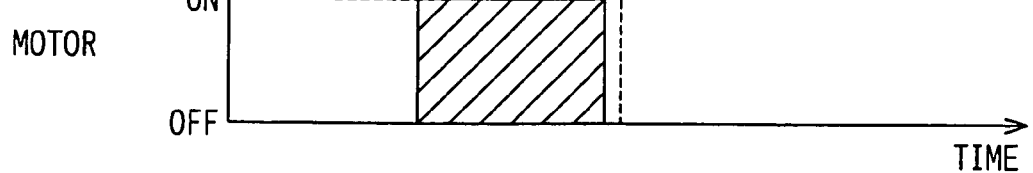
Figure 59A:
FIGS. 59A-59D are timing charts showing vehicle speed, the engine speed, the discharge pressure, and the ON/OFF state of the motor in a first pattern of a twenty-fifth embodiment of the present invention, respectively.
Figure 59B:
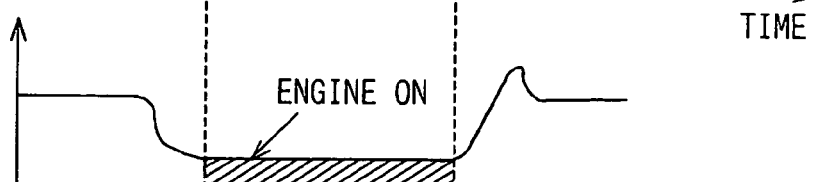
Figure 59C:
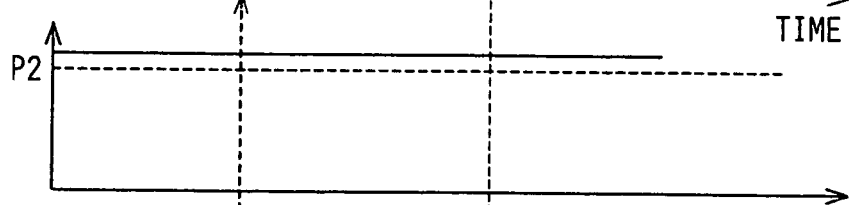
Figure 59D:
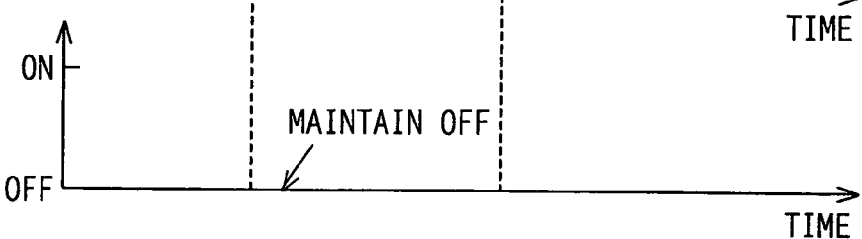
Figure 60A:
FIGS. 60A-60D are timing charts showing vehicle speed, the engine speed, the discharge pressure, and the ON/OFF state of the motor in a second pattern of the twenty-fifth embodiment, respectively.
Figure 60B:
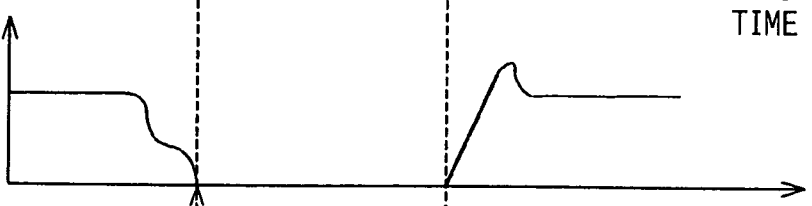
Figure 60C:
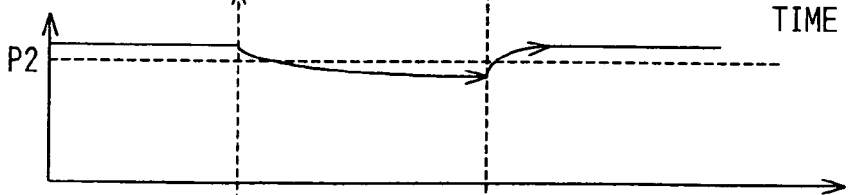
Figure 60D:
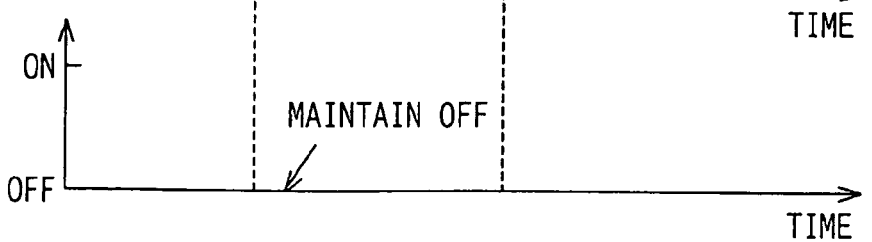

FIGS. 55A-55C show a twenty-first embodiment of the present invention. In the twenty-first embodiment, the motor 1213 is operated depending on the discharge pressure P of the first compressor 1113.

Here, the timing for operating the motor 1213 after the stoppage of the engine 9103 is determined from the discharge pressure P of the first compressor 1113. More specifically, a pressure value that is lower than a normal discharge pressure P of the first compressor 1113 and acceptable in terms of cooling performance is previously established as a first predetermined pressure P1. The motor 1213 is operated if the discharge pressure is less than the first predetermined pressure P1.

Consequently, the motor 1213 of the compressor 1223 can be activated at the reduced first predetermined pressure P1 so that the cooling performance is satisfactory while the compressor 1223, as in the sixteenth embodiment, consumes less power than when activated at the discharge pressure P produced when the engine 9103 is running. The motor 1213 therefore consumes relatively less energy. The rush current at the activation of the motor 1213 is reduced accordingly. As a result, it is possible to prevent the rush current from reducing the life of relevant parts and to limit the voltage drop of the battery 1403, which prevents auxiliaries from malfunctioning.

Twenty-Second Embodiment

FIGS. 56A-56D show a twenty-second embodiment of the present invention. In the twenty-second embodiment, the motor 1213 is operated when the discharge pressure P of the first compressor 1113 is controlled to a smaller value before the stoppage of the engine 9103, or in the present case, before the first compressor 1113 is turned off, when the engine 9103 is stopped.

Consequently, the second compressor 1223 can be activated at the dropped discharge pressure P, so that the second compressor 1223, as in the sixteenth embodiment, consumes less power than it would if activated at the discharge pressure P produced when the engine 9103 is running. The motor 1213 thus consumes less energy. The rush current at the activation of the motor 1213 can be reduced accordingly. As a result, it is possible to prevent the rush current from reducing the life of relevant parts and to suppress the voltage drop of the battery 1403, which prevents auxiliaries from malfunctioning.

The first compressor 1113 is not limited to a compressor that is controlled by being switched on and off but may be a variable displacement type compressor.

Twenty-Third Embodiment

FIGS. 57A-57D show an twenty-third embodiment of the present invention. In the twenty-third embodiment, the discharge pressure of the first compressor 1113 is lowered while the vehicle is decelerating and not yet stopped (for example, when the vehicle speed has fallen below a predetermined vehicle speed V1). The motor 1213 is operated after the engine 9103 is stopped. Specifically, the discharge pressure P is lowered by turning the first compressor 1113 off. This has the same effects as the twenty-second embodiment.

Twenty-Fourth Embodiment

FIGS. 58A-58D show a twenty-fourth embodiment of the present invention. The twenty-fourth embodiment differs from the twenty-third embodiment in that the discharge pressure P is lowered by increasing the air flow rate of the fan 1123a of the condenser 1123 shown in FIG. 41.

Since the forced cooling of the refrigerant in the condenser 1123 lowers the discharge pressure P before the operation of the motor 1213, the effects are the same as those of the twenty-second and twenty-third embodiments.

Twenty-Fifth Embodiment

FIGS. 59A-60D show a twenty-fifth embodiment of the present invention. In the twenty-fifth embodiment, the operation of the motor 1213 is precluded as an emergency measure when the cooling load on the refrigeration cycle unit 1103 before a stoppage of the engine 9103 is higher than a predetermined load.

Here, the discharge pressure P of the first compressor 1113 is used as a variable representative of the cooling load on the refrigeration cycle unit 1103. For a criterion, a second predetermined pressure P2 is established above the first predetermined pressure P1 of the twenty-first embodiment, shown in FIG. 55B.

Specifically, as shown in FIGS. 59A-59D, when the discharge pressure P before the stoppage of the engine 9103 exceeds the second predetermined pressure P2, the engine start request signal is input to the engine control unit 1303 to prevent stoppage of the engine 9103 even if the vehicle comes to a halt. The first compressor 1113 is kept operating (the motor 1213 does not operate). Moreover, as shown in FIGS. 60A-60D, even if the engine 9103 is stopped, the motor 1213 is kept from operating.

Consequently, when the discharge pressure P exceeds the second predetermined pressure P2 and the cooling load is extremely high, the motor 1213 is entirely precluded from operation as a safety measure. This prevents extreme power consumption by the motor 1213, which avoids overtaxing the battery.

As shown in FIGS. 59A-59D, when the engine 9103 is running, the cooling can be performed by the first compressor 1113.

The cooling load on the refrigeration cycle unit 1103 may be represented by other factors such as the passenger compartment temperature and the evaporator temperature Te.

Other Embodiments

Figure 61:
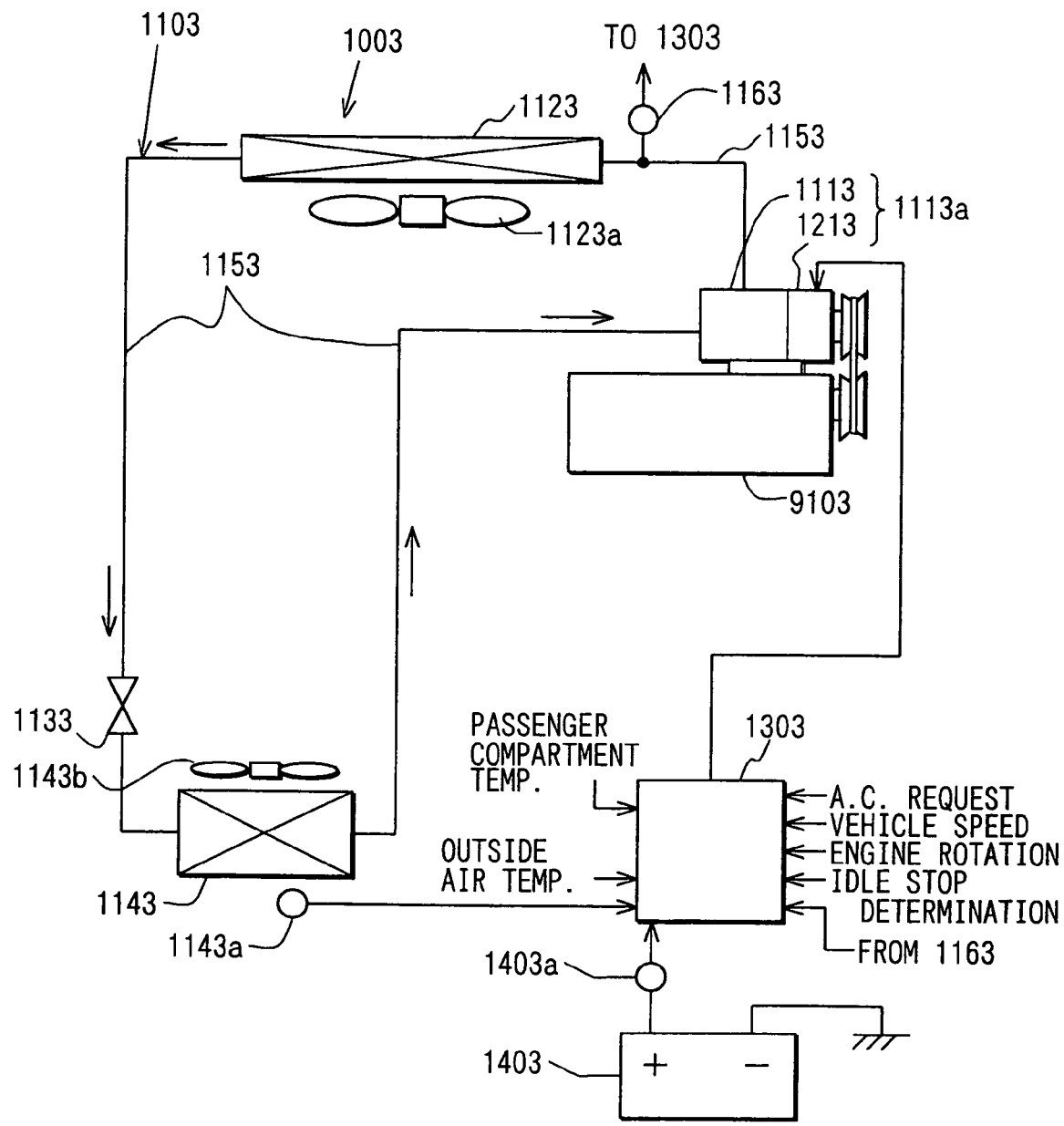
FIG. 61 is a schematic diagram showing the overall configuration of a further embodiment.

The illustrated embodiments have shown cases where the compressors consist of the first compressor 1113 and the second compressor 1223, which are driven by the engine 9103 and the motor 1213, respectively. However, the compressors are not so limited. As shown in FIG. 61, a so-called hybrid compressor 1113a, which is selectively powered by the engine 9103 and the motor 1213, may be used instead.

The invention claimed is:

1. A vehicle air-conditioning apparatus for use in a vehicle in which an engine for driving the vehicle is stopped when the vehicle comes to a temporary halt from a running state, the apparatus comprising:
   a cooling unit for cooling air by a refrigerating cycle comprising an engine driven compressor, a condenser, an expanding device and an evaporator;
   a heating unit for heating the air by using, as a heat source, cooling water for the engine circulated by an engine driven mechanical pump;
   an electric compressor-pump including an electric motor capable of switching rotating directions, a compression unit operatively connected with the motor for compressing a refrigerant in the refrigerating cycle as a substitute for the compressor, and a pump unit operatively connected with the motor for circulating the cooling water as a substitute for the mechanical pump; and a control unit for controlling the rotating directions of the motor so that the motor rotates in the first direction when the engine is stopped during operating the cooling unit, and rotates in the second direction when the engine is stopped during operating the heating unit, wherein the electric compressor-pump includes:

means, provided as a mechanical structure to enable or disable the compression unit and the pump in response to the rotating direction of the motor alone, for enabling the compression unit to compress the refrigerant when the motor rotates in the first direction, for disenabling the compression unit when the motor rotates in the second direction, and for enabling the pump unit to circulate the cooling water at least when the motor rotates in the second direction.

2. The vehicle air-conditioning apparatus according to claim 1, wherein the compression unit is connected with the refrigerating cycle in parallel with the engine driven compressor, and the pump unit is connected with a circuit of the cooling water in series with a heat exchanger to heat the air.

3. The vehicle air-conditioning apparatus according to claim 2, further comprising:

a circuit for switching current direction supplied to the motor in response to the control unit.

4. The vehicle air-conditioning apparatus according to claim 3, wherein the means enables the pump unit to circulate the cooling water when the motor rotates in the second direction, and disenables the pump unit when the motor rotates in the first direction.

5. The vehicle air-conditioning apparatus according to claim 3, wherein the means enables the pump unit to circulate the cooling water when the motor rotates in either the first direction or the second direction.

6. The vehicle air-conditioning apparatus according to claim 3, wherein the means is provided by a unidirectional clutch provided between the compression unit and the motor.

7. The vehicle air-conditioning apparatus according to claim 6, wherein the electric compressor-pump further includes:

a shaft sealing unit, provided at a position closer to the compression unit, for preventing leakage of the refrigerant.

8. The vehicle air-conditioning apparatus according to claim 3, wherein the means is provided by a rotary compression unit provided as the compression unit that performs compression only during rotation in the first direction.

9. The vehicle air-conditioning apparatus according to claim 3, wherein the means is provided by a releasing mechanism provided in the compression unit, the releasing mechanism opening a compression chamber during rotation in the second direction.

10. The vehicle air-conditioning apparatus according to claim 9, wherein the compression unit includes a scroll compressor, and the releasing mechanism is a radius compensating mechanism.

11. The vehicle air-conditioning apparatus according to claim 9, wherein the compression unit includes a scroll compressor having a fixed scroll and a movable scroll, and the releasing mechanism is provided by at least one of the fixed scroll and the movable scroll which is made of resin.

12. The vehicle air-conditioning apparatus according to claim 1, wherein the compression unit and the pump unit are located at opposite ends of a rotating shaft of the motor.

13. The vehicle air-conditioning apparatus according to claim 1, wherein the electric compressor-pump farther includes:

a shaft sealing unit for preventing leakage of the refrigerant and being located between the compression unit and the motor; and a magnetic coupling to couple the pump unit with the motor.

* * * * *